(12) United States Patent
Seenumani et al.

(10) Patent No.: US 10,916,146 B2
(45) Date of Patent: Feb. 9, 2021

(54) VEHICLE CONVOY CONTROL SYSTEM AND METHOD

(71) Applicant: General Electric Company, Schenectady, NY (US)

(72) Inventors: Gayathri Seenumani, Niskayuna, NY (US); Hullas Sehgal, Niskayuna, NY (US); James D. Brooks, Schenectady, NY (US); Harry Kirk Mathews, Jr., Niskayuna, NY (US); Olugbenga Anubi, Niskayuna, NY (US)

(73) Assignee: TRANSPORTATION IP HOLDINGS, LLC, Norwalk, CT (US)

(*) Notice: Subject to any disclaimer, the term of this patent is extended or adjusted under 35 U.S.C. 154(b) by 218 days.

(21) Appl. No.: 16/101,072

(22) Filed: Aug. 10, 2018

(65) Prior Publication Data
US 2018/0366005 A1 Dec. 20, 2018

Related U.S. Application Data

(63) Continuation of application No. 16/032,931, filed on Jul. 11, 2018, now Pat. No. 10,262,542, which is a (Continued)

(51) Int. Cl.
*G08G 1/00* (2006.01)
*B61L 27/04* (2006.01)
(Continued)

(52) U.S. Cl.
CPC .............. *G08G 1/22* (2013.01); *B61C 17/12* (2013.01); *B61L 15/0018* (2013.01);
(Continued)

(58) Field of Classification Search
CPC ... G08G 1/22; B61L 15/0036; B61L 15/0027; B61L 15/0072; B61L 27/04; B61L 15/0018; B61L 2201/00; B61C 17/12
See application file for complete search history.

(56) References Cited

U.S. PATENT DOCUMENTS 6,466,306 B1 * 10/2002 Davis ..................... G01S 11/12
356/4.03
7,860,639 B2 12/2010 Yang
(Continued)

FOREIGN PATENT DOCUMENTS

WO 2015047177 A1 4/2015

OTHER PUBLICATIONS

Alam et al., "Look-ahead cruise control for heavy duty vehicle platooning", 16th International IEEE Conference on Intelligent Transportation Systems (ITSC 2013), Netherlands, pp. 928-935, Oct. 6-9, 2013.
(Continued)

*Primary Examiner* — Russell Frejd
(74) *Attorney, Agent, or Firm* — Christopher R. Carroll; The Small Patent Law Group LLC

(57) ABSTRACT

A convoy management system and method determine determining an inter-vehicle spacing in a convoy formed from two or more vehicles traveling together along one or more routes. Controllers onboard the two or more vehicles are instructed to automatically change movement of at least one of the vehicles in the convoy to maintain the inter-vehicle spacing. The inter vehicle spacing is dynamically changed during movement of the convoy along the one or more routes.

18 Claims, 22 Drawing Sheets

Related U.S. Application Data continuation-in-part of application No. 15/583,123, filed on May 1, 2017, now Pat. No. 10,053,120, which is a continuation-in-part of application No. 14/798,678, filed on Jul. 14, 2015, now Pat. No. 9,669,811, which is a continuation-in-part of application No. 14/631,495, filed on Feb. 25, 2015, now Pat. No. 9,453,735, which is a continuation-in-part of application No. 14/319,885, filed on Jun. 30, 2014, now Pat. No. 9,002,547, which is a continuation-in-part of application No. 13/729,298, filed on Dec. 28, 2012, now Pat. No. 8,838,302.

(51) Int. Cl.
B61L 15/00 (2006.01)
B61C 17/12 (2006.01)

(52) U.S. Cl.
CPC ....... B61L 15/0027 (2013.01); B61L 15/0036 (2013.01); B61L 15/0072 (2013.01); B61L 27/04 (2013.01); B61L 2201/00 (2013.01)

(56) References Cited

U.S. PATENT DOCUMENTS

| | | | |
|---|---|---|---|
| 8,352,112 B2 | 1/2013 | Mudalige | |
| 9,786,182 B2* | 10/2017 | Calmettes | G05D 1/0293 |
| 2008/0059007 A1* | 3/2008 | Whittaker | G08G 1/22 |
| | | | 701/2 |
| 2010/0256852 A1* | 10/2010 | Mudalige | G08G 1/22 |
| | | | 701/24 |
| 2012/0176269 A1* | 7/2012 | Holton | H04K 3/94 |
| | | | 342/169 |
| 2013/0041576 A1 | 2/2013 | Switkes et al. | |
| 2013/0142385 A1* | 6/2013 | Mathieu | G02B 27/01 |
| | | | 382/103 |
| 2013/0297197 A1* | 11/2013 | Zhai | B60W 30/12 |
| | | | 701/408 |
| 2016/0054735 A1 | 2/2016 | Switkes et al. | |
| 2017/0242443 A1 | 8/2017 | Schuh et al. | |
| 2017/0293296 A1 | 10/2017 | Stenneth et al. | |
| 2017/0344023 A1 | 11/2017 | Laubinger et al. | |
| 2017/0349176 A1 | 12/2017 | Alden et al. | |
| 2018/0018605 A1 | 1/2018 | Light-Holets et al. | |
| 2018/0050697 A1 | 2/2018 | Kuszmaul et al. | |
| 2018/0144640 A1 | 5/2018 | Price et al. | |

OTHER PUBLICATIONS

Alam et al., "Heavy-Duty Vehicle Platooning for Sustainable Freight Transportation: A Cooperative Method to Enhance Safety and Efficiency", IEEE control systems, vol. 35, Issue: 6, pp. 34-56, Dec. 2015.

Department of Transportation, "Factors and Considerations for Establishing a Fuel Efficiency Regulatory Program for Commercial and Heavy-Duty Vehicles", National Highway & Traffic Safety Administration, Oct. 2010.

Houpt et al., "Optimal control of heavy-haul freight trains to save fuel", 9th International heavy Haul Conference, Jan. 2009.

Huang et al., "Speed trajectory planning at signalized intersections using sequential convex optimization", 2017 American Control Conference (ACC), Seattle, pp. 2992-2997, May 24-26, 2017.

Liang et al., "Heavy-Duty Vehicle Platoon Formation for Fuel Efficiency", IEEE Transactions on Intelligent Transportation Systems, vol. 17, Issue: 4, pp. 1051-1061, Apr. 2016.

Turri et al., "Cooperative look-ahead control for fuel-efficient and safe heavy-duty vehicle platooning", IEEE Transactions on Control Systems Technology, vol. 25, Issue:1, pp. 12-28, Jan. 2017.

* cited by examiner

| Sequence | k | (k+1) | (k+2) | (k+3) | (k+4) | (k+5) | (k+6) | (k+7) |
|---|---|---|---|---|---|---|---|---|
| 1 | X | | | | X | | | |
| 2 | X | | | | | X | | |
| 3 | X | | | | | | X | |
| 4 | X | | | | | | | X |
| 5 | | X | | | | X | | |
| 6 | | X | | | | | X | |
| 7 | | X | | | | | | X |
| 8 | | | X | | | | | |
| 9 | | | X | | | | X | |
| 10 | | | | X | | | | |
| 11 | | | | | X | | | |
| 12 | | | | | | X | | |
| 13 | | | | | | | X | |
| 14 | | | | | | | | X |

FIG. 11

VEHICLE CONVOY CONTROL SYSTEM AND METHOD

CROSS-REFERENCE TO RELATED APPLICATIONS

This application is a continuation-in-part of U.S. patent application Ser. No. 16/032,931 (now U.S. Pat. No. 10,262, 542), which was filed on 11 Jul. 2018 (the "'931 Application"), which is a continuation-in-part of U.S. patent application Ser. No. 15/583,123 (now U.S. Pat. No. 10,053,120), which was filed on 1 May 2017 (the "'123 Application"), which is a continuation-in-part of U.S. patent application Ser. No. 14/798,678 (now U.S. Pat. No. 9,669,811), which was filed on 14 Jul. 2015 (the "'678 Application"), which is a continuation-in-part of U.S. patent application Ser. No. 14/631,495 (now U.S. Pat. No. 9,453,735), which was filed on 25 Feb. 2015 (the "'495 Application"), which is a continuation-in-part of U.S. patent application Ser. No. 14/319,885 (now U.S. Pat. No. 9,002,547, filed on 30 Jun. 2014 (the "'885 Application"), which is a continuation-in-part of U.S. patent application Ser. No. 13/729,298 (now U.S. Pat. No. 8,838,302), filed on 28 Dec. 2012 (the "'298 Application"). The entire disclosures of the '678 Application, the '495 Application, the '885 Application, and the '298 Application are incorporated herein by reference.

FIELD

Embodiments of the subject matter disclosed herein relate to controlling operations of vehicle systems.

BACKGROUND

Some vehicles can travel in virtual groupings, called convoys or consists, as this may provide advantages to the grouped vehicles. Some of these vehicles may be grouped by physical connections. Others in a convoy or consist may be grouped logically by communicative couplings. While others may just have operators that happen to be traveling from the same destination or to the same ending location. These groupings may not be mutually exclusive, nor dependent on the type of vehicle involved in a given convoy.

It may be desirable to have systems and methods for identifying, forming, directing, or controlling these convoys or consists that differ from those systems and methods that are currently available.

BRIEF DESCRIPTION

In one embodiment, a method includes determining an inter-truck spacing in a convoy formed from two or more trucks traveling together along one or more routes, changing movement of at least one of the trucks in the convoy to maintain the inter-truck spacing, and dynamically changing the inter-truck spacing during movement of the convoy along the one or more routes.

In one embodiment, a convoy management system includes one or more processors configured to determine determining an inter-truck spacing in a convoy formed from two or more trucks traveling together along one or more routes. The one or more processors are configured to instruct controllers onboard the two or more trucks to automatically change movement of at least one of the trucks in the convoy to maintain the inter-truck spacing. The one or more processors are configured to dynamically change the inter-truck spacing during movement of the convoy along the one or more routes.

In one embodiment, a method includes determining inter-vehicle spacings in a convoy formed from two or more vehicle systems traveling together along one or more routes. The inter-vehicle spacings are based on forecasted forces to be imparted on the vehicle systems during travel of the convoy. The method also includes directing controllers of the vehicle systems to automatically change movement of the vehicle systems to maintain the inter-vehicle spacings in the convoy, directing the controllers of the vehicle systems to automatically change the movement of the vehicle systems to change an order of the vehicle systems in the convoy during the movement of the vehicle systems, and dynamically changing the inter-vehicle spacings during the movement of the convoy along the one or more routes.

BRIEF DESCRIPTION OF THE DRAWINGS

Reference is made to the accompanying drawings in which particular embodiments and further benefits of the invention are illustrated as described in more detail in the description below, in which:

FIG. 11 illustrates a table demonstrating possible sequences of changing the vehicle group assignments in the vehicle system according to one embodiment;

DETAILED DESCRIPTION

Figure 1:
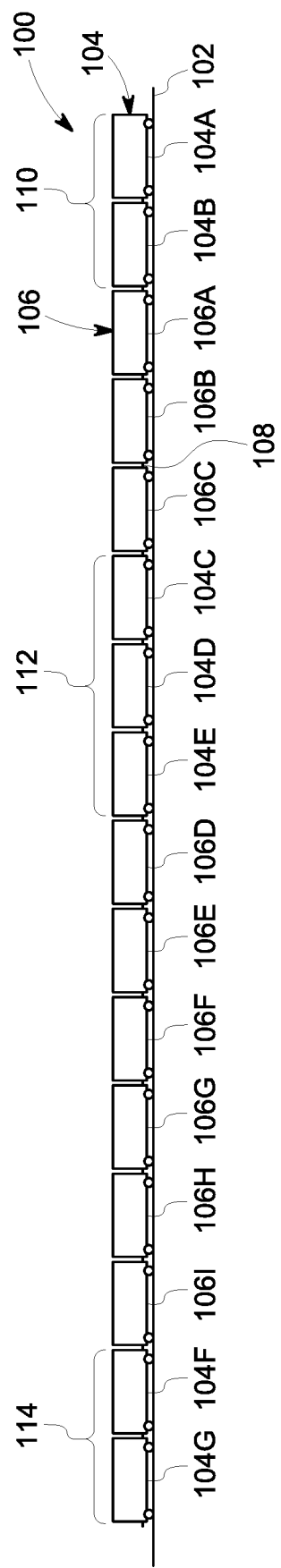
FIG. 1 illustrates a schematic diagram of one example of a vehicle system traveling along a route.

FIG. 1 illustrates a schematic diagram of one example of a vehicle system 100 traveling along a route 102. The vehicle system includes a single vehicle 104, or can include several vehicles 104, 106 operably coupled with each other. The vehicles may be mechanically coupled with each other, such as by couplers 108. Alternatively, the vehicles may be coupled with each other without being mechanically coupled with each other. For example, the vehicles may be aerodynamically or fluidly coupled with each other when the vehicles travel sufficiently close to each other that the drag forces imparted on one or more of the vehicles (e.g., from air, wind, water, or the like), is reduced on one or more other vehicles. Marine vessels may be fluidly or aerodynamically coupled when the vessels travel close enough together such that the drag on one or more vessels from the water is reduced relative to the marine vessels traveling farther apart. Automobiles (e.g., trucks) may be fluidly or aerodynamically coupled when the automobiles travel close enough together such that the drag on one or more automobiles is reduced relative to the automobiles traveling farther apart. Optionally, two or more vehicles can be logically coupled with each other (without being mechanically coupled with each other). The logic coupling can involve the vehicles communicating with each other to coordinate control of the vehicles with each other so that the vehicles can travel together as a larger system. For example, one vehicle may direct the movements of another vehicle, one or more vehicles may share sensor data (that is used to determine how to move the vehicles) with each other, one or more vehicles may share information of the movement of one or more vehicles with one or more other vehicles, or the like. Two vehicles may be directly connected with each other when no other vehicle is disposed between the directly connected vehicles. Two vehicles may be indirectly connected or interconnected with each other when one or more other vehicles are disposed between and connected with the interconnected vehicles.

The vehicles 104 (e.g., vehicles 104A-G) represent propulsion-generating vehicles, such as vehicles capable of generating propulsive force to propel the vehicle system 100 along the route 102. Examples of propulsion-generating vehicles 104 include locomotives, other off-highway vehicles (e.g., vehicles that are not designed for or permitted to travel on public roadways), automobiles (e.g., vehicles that are designed for traveling on public roadways), marine vessels, and the like. In one embodiment, the vehicles 104 represent locomotives and the vehicles 106 represent rail cars. The vehicles 104 may be fuel-powered vehicles (e.g., engines that consume fuel are used to generate propulsive force by creating electric current to power motors or to rotate axles and wheels), electric-powered vehicles (e.g., onboard or off board sources of electric current are used to power motors to generate propulsive force), and/or hybrid powered vehicles (e.g., vehicles that are powered by fuel-consuming engines and other sources of electric current). The vehicles 106 (e.g., vehicles 106A-I) represent non-propulsion-generating vehicles, such as rail cars or other units that are propelled along the route 102 by the propulsion-generating vehicles 104.

Optionally, one or more of the vehicles can be a combination of the vehicles 104, 106. For example, a vehicle system can include a single vehicle that both generates propulsion and carries cargo, such as a semi-truck and trailer combination. As another example, a vehicle system can include multiple vehicles with at least one or each of the vehicles being a combination of a propulsion-generating vehicle and a non-propulsion-generating vehicle.

The term "vehicle" as used herein can be defined as a mobile machine that transports at least one of a person, people, or a cargo. For instance, a vehicle can be, but is not limited to being, a rail car, an intermodal container, a locomotive, a marine vessel, mining equipment, construction equipment, an automobile, and the like. A "vehicle system" includes two or more vehicles that are interconnected with each other to travel along a route. For example, a vehicle system can include two or more vehicles that are directly connected to each other (e.g., by a coupler) or that are indirectly connected with each other (e.g., by one or more other vehicles and couplers). A vehicle system can be referred to as a consist, such as a rail vehicle consist.

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. "Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk. "Computer memory", as used herein, refers to a storage device configured to store digital data or information which can be retrieved by a computer or processing element. "Controller," "unit," and/or "module," as used herein, can to the logic circuitry and/or processing elements and associated software or program involved in controlling an energy storage system. The terms "signal", "data", and "information" may be used interchangeably herein and may refer to digital or analog forms.

At least one technical effect described herein includes generating command profiles and change indices for a trip of a vehicle system. The command profiles can dictate operational settings (e.g., throttle notch settings or other settings) of propulsion-generating vehicles in the vehicle system, and the change indices can dictate where and/or when assignments of the vehicles among different groups and/or fence positions in the vehicle system are to be changed. The command profiles and/or change indices may be generated before the vehicle system embarks on the trip, generated while the vehicle system is moving along a route during the trip, after completing the trip (e.g., to allow for comparison with how the operator controlled the vehicle system during the previous trip), or a combination thereof. The command profiles and/or change indices may be used to control which propulsion-generating vehicles in the vehicle system have the same or different operational settings (e.g., throttle notch settings) at different locations in the trip to control bunching of the vehicle system.

The propulsion-generating vehicles may be arranged in consists 110, 112, 114, as shown in FIG. 1. Each consist 110, 112, 114 may include the propulsion-generating vehicles 104 coupled with each other in the vehicle system 100. While each consist 110, 112, 114 is shown as including multiple propulsion-generating vehicles 104, one or more of the consists 110, 112, 114 may optionally include a single propulsion-generating vehicle 104. Additionally, while a vehicle system may be formed from multiple vehicles, optionally, a vehicle system may be formed from a single vehicle.

While the vehicle system 100 is shown in FIG. 1 as a train, alternatively, the vehicle system 100 may represent another vehicle system formed of vehicles other than locomotives (e.g., the propulsion-generating vehicles 104) and railcars (e.g., the non-propulsion generating vehicles 106). For example, the vehicle system 100 may represent several automobiles, marine vessels, off-highway vehicles other than rail vehicles, or the like, joined together to travel along the route 102.

In one embodiment, tractive efforts (e.g., power output, horsepower, speed, and the like) and/or braking efforts of the vehicle system 100 may be controlled to drive the vehicle system 100 along the route 102 from an origin location to a destination location. The tractive and/or braking efforts may be automatically controlled such that the tractive and/or braking efforts provided by the vehicles 104, 106 without operator intervention involved in changing these efforts. Alternatively or additionally, the vehicle system 100 may provide prompts and notices to an operator that direct the operator how to manually control the efforts of the vehicle system 100. For example, the system 100 may provide prompts to an operator to instruct the operator of which operational settings to use at a current time and/or which settings to use at upcoming times when the system 100 arrives at one or more upcoming locations. The operational settings (e.g., settings that control tractive effort, braking effort, etc.) of the propulsion-generating vehicles and/or non-propulsion-generating vehicles may be referred to herein as operational parameters.

The tractive efforts and braking efforts may be controlled by designating operational settings of the vehicle system 100 at one or more locations along the route 102. By way of example, these operational settings can include power settings (e.g., throttle notch settings) that control the power output from the propulsion-generating vehicles 104 and brake settings (e.g., dynamic brake settings) that control the braking efforts of the propulsion-generating vehicles 104 and/or the non-propulsion generating vehicles 106. The operational settings that are designated for a trip of the vehicle system 100 from a first location to a different, second location along the route 102 may be referred to as a trip plan. The designated operational settings can be expressed as a function of time elapsed during a trip along the route 102 and/or distance along the route 102 in the trip plan.

The designated operational settings can be computed to improve handling (e.g., control) of the vehicle system 100. For example, the designated operational settings can be determined to reduce the frequency at which throttle notch settings and/or brake settings are changed, to reduce abrupt jerking movements of the vehicle system 100 or segments of the vehicle system 100, to reduce forces exerted on the couplers 108, and the like.

In one embodiment, different propulsion-generating vehicles 104 may have different operational settings at the same location and/or time along the route 102. For example, the propulsion-generating vehicles 104 may be asynchronously controlled so that not all the vehicles 104 in the vehicle system 100 and/or in a single consist 110, 112, 114 are controlled according to the same throttle and/or brake settings. Alternatively, the propulsion-generating vehicles 104 may be assigned into different groups (e.g., the consists 110, 112, 114 or other groups) with virtual "fences" between the groups. A fence can demarcate a pair of groups of the propulsion-generating vehicles 104 on opposite sides of the fence. For example, if a fence is established between the consists 112 and 114, then the propulsion-generating vehicles 104C-E in the consist 112 may operate using a first designated throttle notch setting while the propulsion-generating vehicles 104F-G in the consist 114 may operate using a different, second designated throttle notch setting at the same time. Operation of the vehicle system 100 that involves two or more of the propulsion-generating vehicles 104 using different operational settings at the same time may be referred to as asynchronous distributed power operation in one embodiment.

Figure 2:
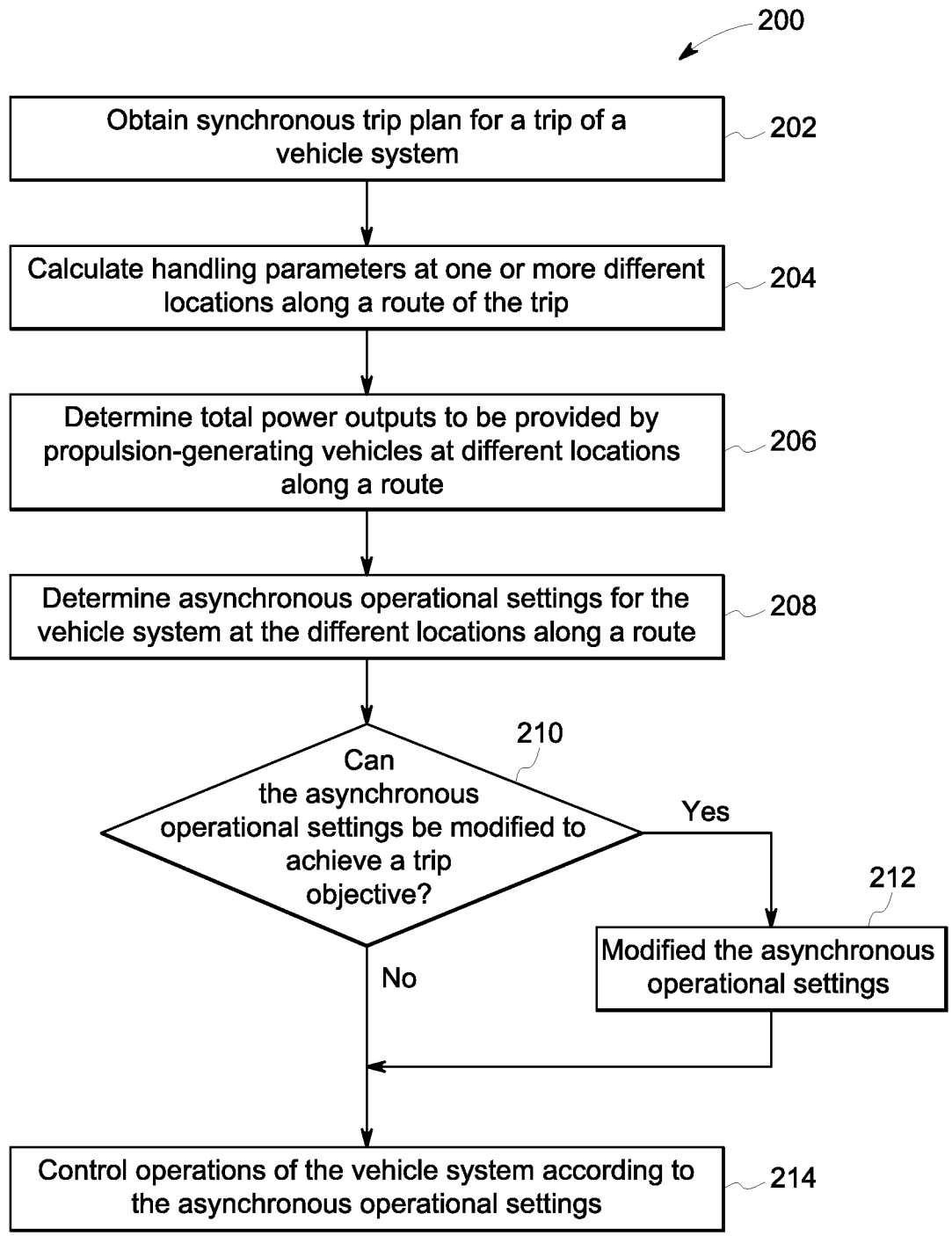
FIG. 2 is a flowchart of one embodiment of a method for operating the vehicle system shown in FIG. 1.
Figure 3:
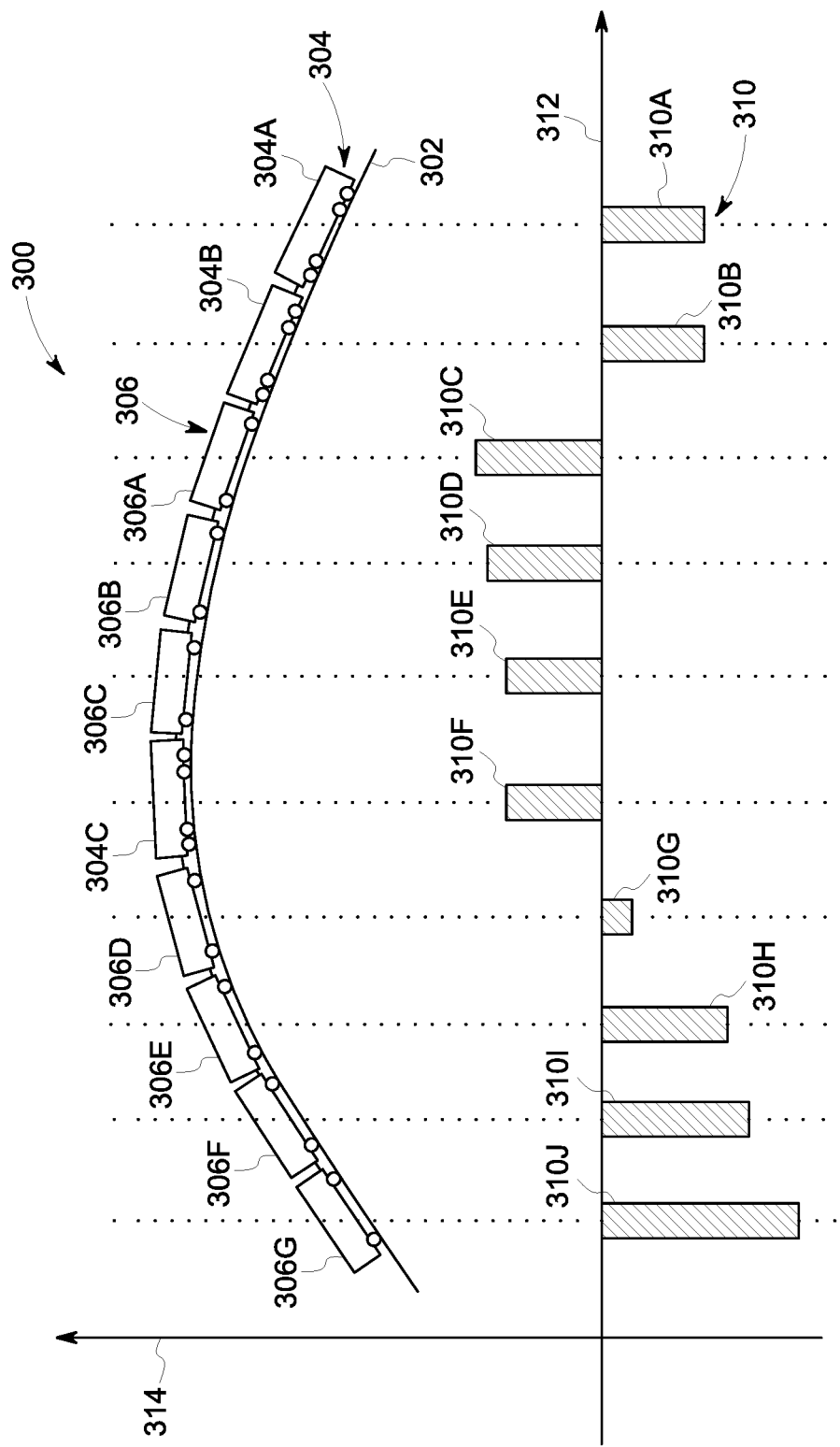
FIG. 3 illustrates coupler parameters that are estimated for a vehicle system to travel along a route in accordance with one example.
Figure 4:
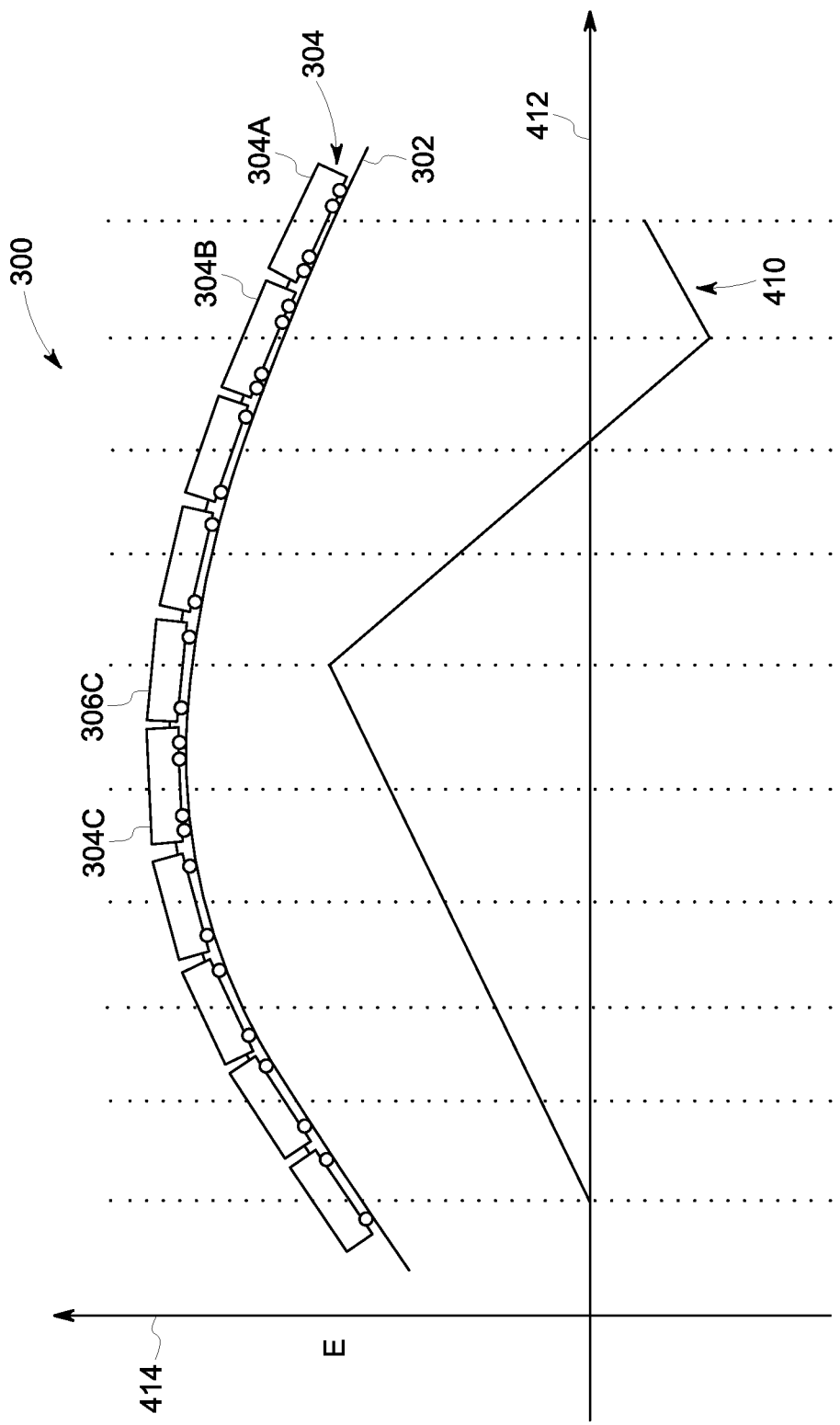
FIG. 4 illustrates terrain excitation parameters that are estimated for the vehicle system shown in FIG. 3 to travel along the route also shown in FIG. 3 in accordance with one example.

FIGS. 2 through 4 illustrate embodiments of how operations of the propulsion-generating vehicles 104 in the vehicle system 100 can be controlled to improve handling of the vehicle system 100 during a trip while achieving one or more trip objectives and while remaining within operating constraints on the trip. A trip objective can be a goal that the vehicle system 100 attempts to achieve by operating according to operational settings designated for the vehicle system 100. The trip objectives may include a reduction in fuel consumption, emission generation, and/or travel time relative to traveling with the same vehicle system 100 along the same route 102, but using different operational settings at one or more locations along the route 102. Another example of a trip objective can include fuel balancing, where the operational settings are determined to keep or maintain the amount of fuel stored onboard the different propulsion-generating vehicles to be the same or within a designated amount (e.g., 1%, 3%, 5%, 10%, or another value) over an entirety of the trip, over one or more segments of the trip, or the like. For example, different propulsion-generating vehicles may consume fuel at different rates and/or may have different amounts of fuel onboard prior to departure for a trip. The operational settings for the trip can be determined so that the different propulsion-generating vehicles carry the same or similar amounts of fuel. The operational settings can cause vehicles carrying more fuel to consume more fuel than those vehicles carrying less fuel to keep the distribution of fuel even across the vehicle system 100. For example, the vehicles carrying less fuel than other vehicles may be restricted to a smaller range of throttle notch settings than vehicles carrying more fuel. This can prevent the vehicles carrying less fuel from consuming more fuel than the vehicles carrying more fuel. Over time, the notch restrictions on the vehicles carrying less fuel can cause the balance of fuel carried by the vehicles in the vehicle system to become more even (e.g., the amount of fuel carried by the vehicles is within a designated amount or range of each other).

Another example of a trip objective can be a number of nodes in the vehicle system 100. A node can represent a vehicle or coupler in the vehicle system 100 that is disposed between a coupler in tension and a coupler in compression. For example, if the coupler 108 between the vehicles 104E and 106D is in compression while the coupler 108 between the vehicles 104C and 104D is in tension, then the coupler 108 between the vehicles 104D and 104E may represent a node of the vehicle system 100. A trip objective can be a reduction or elimination of nodes in the vehicle system 100 for an entire trip or one or more segments of the trip, or keeping the number of nodes in the vehicle system below a designated number. For example, if the number of nodes in the vehicle system 100 can be reduced by changing operational settings and/or fence positions at one or more locations along a trip, then the operational settings and/or fence positions can be changed to reduce the number of nodes.

The operating constraints may include speed limits (both lower limits on speed and upper limits on speed), power requirements (e.g., minimum requirements for power to propel the vehicle system 100 up an incline), time limitations on how long an operator may be working on the vehicle system 100, a system-wide schedule for the travel of multiple vehicle systems on or across the route 102, or the like. Other examples of operating constraints can include fuel consumption limits, where certain operational settings are not permitted for one or more propulsion-generating vehicles as these settings could cause the vehicles to consume more fuel or to consume fuel at a greater rate than desired. For example, a propulsion-generating vehicle may not be permitted to be assigned a notch setting that would cause the vehicle to consume more fuel than the vehicle is carrying and/or consume fuel at such a rate that the vehicle will not have sufficient fuel to complete a trip.

Another operating constraint can include engine derating. One or more engines of the propulsion-generating vehicles may be de-rated and unable to generate the horsepower or tractive effort associated with the rating of the engines. The decreased output or capability of these engines may be used to limit what operational settings are assigned to different vehicles to prevent the vehicles from having to operate the engines at levels that exceed the de-rated capabilities of the engines. This deration may be due to an onboard failure or as the result of a desired limit (e.g., to maintain a desired train horsepower per ton).

Another example of an operating constraint can include a notch delta penalty. Such a penalty can restrict how much and/or how quickly an operational setting of a vehicle can change. For example, a notch delta penalty may not allow the throttle notch setting for a propulsion-generating vehicle to change by more than three positions (e.g., throttle notch one to throttle notch four). Instead, the vehicle may be limited to changing throttle positions by three positions or less at a time.

Another example of an operating constraint can be a limitation on how frequently the group assignment is changed. For example, such a constraint may not permit the group assignment of the vehicle system 100 to change more frequently than a designated frequency or time period.

FIG. 2 is a flowchart of one embodiment of a method 200 for operating the vehicle system 100 shown in FIG. 1. The method 200 may be used in conjunction with the vehicle system 100. For example, the method 200 may be used to create a trip plan for the vehicle system 100 that designates operational settings to be used to asynchronously control the operations of the propulsion-generating vehicles 104 (shown in FIG. 1) during a trip along the route 102 (shown in FIG. 1) to improve handling of the vehicle system 100. Additionally or alternatively, the method 200 may be used to autonomously control the operations of the propulsion-generating vehicles 104 in an asynchronous manner during a trip along the route 102 to improve handling of the vehicle system 100. Additionally or alternatively, the method 200 may be used to direct an operator to manually control the operations of the propulsion-generating vehicles 104 in an asynchronous manner during a trip along the route 102 to improve handling of the vehicle system 100.

At 202, a synchronous trip plan for the trip is obtained. The trip plan may be synchronous in that the operational settings of the propulsion-generating vehicles 104 that are designated by the trip plan may be the same for the propulsion-generating vehicles 104 at the same locations. The trip plan may designate the operational settings of the vehicle system 100 to reduce fuel consumed, emissions generated, and the like, by the vehicle system 100 relative to the vehicle system 100 traveling along the route 102 in the trip using one or more different operational settings (e.g., according to manual control and/or another, different trip plan). One or more examples of trip plans (also referred to as mission plans or trip profiles) and how the trip plans are determined are provided in U.S. patent application Ser. No. 11/385,354 (referred to herein as the "'354 Application"), the entire disclosure of which is incorporated by reference.

In one embodiment, the synchronous trip plan can be created at 202 by collecting and using trip data, route data, and vehicle data. The trip data includes information representative of one or more constraints of the trip, such as a starting location, an ending location, one or more intermediate locations between the starting and ending locations, a scheduled time of arrival at one or more locations, weather conditions (e.g., direction and speed of wind) and the like. The route data includes information representative of the route 102, including grades, curvatures, speed limits, and the like. The vehicle data includes information representative of capabilities and/or limitations of the vehicle system 100, such as power outputs that can be provided by the vehicle system 100, tractive efforts provided by the propulsion-generating vehicles 104 at different throttle notch settings, braking efforts provided by the vehicles 104, 106 at different brake notch settings, and the like. The vehicle data also can include the size (e.g., mass, length, number of axles, weight distribution, or the like) of the vehicles 104 and/or 106 in the vehicle system 100. The trip plan can be computed from the beginning to the end of the trip and can designate speeds of the vehicle system 100, synchronous notch settings of the propulsion-generating vehicles 104, and synchronous brake settings of the propulsion-generating vehicles 104, 106 at locations along the route 102.

At 204, handling parameters are calculated at one or more different locations along the route 102. The handling parameters may be calculated prior to the vehicle system 100 embarking on the trip and/or during travel of the vehicle system 100 in the trip and prior to arriving at the one or more different locations. The handling parameters are estimates or measurements of one or more aspects of the vehicle system 100 and/or the route 102. Several examples of handling parameters are described below. The handling parameters can be representative of forces exerted on the couplers, energies stored in the couplers, relative velocities of neighboring vehicles of the vehicles in the vehicle system, natural forces exerted on one or more segments of the vehicle system between two or more of the propulsion-generating vehicles, distances between neighboring vehicles in the vehicle system, momentum of one or more vehicles and/or one or more groups of the vehicles, virtual forces exerted on one or more of the vehicles, or the like. The momentum may include changes in momentum, momentum transport, or the like.

One example of handling parameters is coupler parameters. Coupler parameters include one or combinations of estimates, calculations, measurements, and/or simulations of coupler forces and/or energies stored in the couplers 108 (shown in FIG. 1) of the vehicle system 100 at one or more locations along the route 102 for the trip. In one embodiment, the coupler forces and/or energies stored in the couplers 108 can be estimated from a model of the couplers 108. For example, the couplers 108 between the vehicles 104, 106 can be modeled as springs having spring constants k and a damper (e.g., the mass of the vehicles 104 and/or 106 to which the modeled spring is coupled). Due to the tractive efforts (e.g., power outputs) provided by the propulsion-generating vehicles 104, the states of the vehicle system 100 may undergo a transition and the forces exerted on the couplers 108 and/or the energies stored in the couplers 108 that result from this transition at different locations along the route 102 can be calculated (e.g., estimated or simulated) as a function of the tractive efforts provided by the propulsion-generating vehicles 104 at the different locations.

By way of example only, a first coupler 108 may be expected to become compressed due to the expected deceleration of a first leading propulsion-generating vehicle 104 and the expected acceleration of a first trailing propulsion-generating vehicle 104 that are caused by changes in the grade of the route 102 during travel according to the synchronous trip plan (e.g., when traversing a valley or low point in the route 102). Another, second coupler 108 may be expected to become stretched due to the expected acceleration of a second leading propulsion-generating vehicle 104 and the expected deceleration of a second trailing propulsion-generating vehicle 104 that are caused by changes in the grade of the route 102 during travel according to the synchronous trip plan (e.g., when traversing a peak or high point in the route 102). The first coupler 108 may be estimated to have a greater compressive force than the second coupler 108 in this example.

One or more relationships between the coupler forces and/or energies stored in the couplers 108 can be used to determine the coupler parameters. One example of a coupler parameter includes:

$$P_c = \sum_{j=1}^{nc} f_j^2 \qquad \text{(Equation \#1)}$$

where $P_c$ represents a coupler parameter, nc represents a number of the couplers 108 in the vehicle system 100 (e.g., the total number of couplers 108), and f represents the estimated or modeled coupler force. The coupler parameter ($P_c$) of Equation #1 may represent the sum of squares of all coupler forces between the first coupler 108 (e.g., when j=1) and the $n^{th}$ coupler 108 in the vehicle system 100. Another example of a coupler parameter includes the maximum coupler force of the couplers 108 at a location along the route 102.

Another example of a coupler parameter includes:

$$E = \sum_{j=1}^{nc} 0.5 \frac{f_j^2}{k_j} \qquad \text{(Equation \#2)}$$

where E represents another coupler parameter and k represents the spring constant of a modeled spring representative of the $j^{th}$ coupler 108. The coupler parameter (E) of Equation #2 may represent the total energy stored in the couplers 108 of j=1 through j=nc in the vehicle system 100 at a location along the route 102. Additionally or alternatively, the coupler parameter may include or represent an average of an absolute value of the coupler forces in the vehicle system 100. Additionally or alternatively, the coupler parameter may include or represent a sum, maximum, average, median, and the like of the absolute values of the coupler forces in the vehicle system 100 that are at least as large as a designated upper limit. The upper limit may be based on the location of the vehicle system 100 (e.g., the limit is based on the terrain being traveled over), vehicle data (e.g., the type of vehicles in the system 100), coupler data (e.g., the type, health, age, and the like, of the couplers in the system 100), and the like.

One or more of the coupler parameters described above and/or another coupler parameter that represents coupler force and/or energy stored in the couplers 108 may be determined for the vehicle system 100 at one or more locations along the route 102 during the trip. For example, prior to arriving at the locations, the coupler parameters may be calculated or estimated for those locations using the trip data, the vehicle data, and/or the route data.

FIG. 3 illustrates coupler parameters 310 (e.g., coupler parameters 310A-J) that are estimated for a vehicle system 300 to travel along a route 302 in accordance with one example. The vehicle system 300 may represent the vehicle system 100 (shown in FIG. 1) or a segment of the vehicle system 100. The vehicle system 300 includes propulsion-generating vehicles 304 (e.g., vehicles 304A-C), which can represent the propulsion-generating vehicles 104 (shown in FIG. 1) and non-propulsion generating vehicles 306 (e.g., vehicles 306A-G), which can represent the non-propulsion generating vehicles 106 (shown in FIG. 1). The vehicles 304, 306 are connected by couplers 108 (shown in FIG. 1). The route 302 may represent a portion of the route 102 (shown in FIG. 1).

The coupler parameters 310 are shown alongside a horizontal axis 312 that is representative of locations along the length of the vehicle system 300 and a vertical axis 314 that is representative of magnitudes of the coupler parameters 310. The size of the coupler parameters 310 indicates the relative sizes of the coupler forces and/or stored energies represented by the parameters 310. The coupler parameters 310 represent the coupler forces and/or energies of the couplers 108 joined to the respective vehicle 304, 306. For example, the coupler parameter 310A represents the coupler forces and/or stored energies of the coupler 108 connected to the vehicle 304A (or twice the coupler force and/or stored energy of the single coupler 108 connected to the vehicle 304A), the coupler parameter 310B represents the coupler forces and/or stored energies of the couplers 108 connected to the opposite ends of the vehicle 304B, the coupler parameter 310C represents the coupler forces and/or stored energies of the couplers 108 connected to the opposite ends of the vehicle 306A, and so on. Negative coupler parameters 310 (e.g., the parameters 310A-B and 310G-J extending below the horizontal axis 312) can represent couplers 108 undergoing compressive forces and positive coupler parameters 310 (e.g., the parameters 310C-F extending above the horizontal axis 312) can represent couplers 108 undergoing tensile forces.

The coupler parameters 310 can be estimated for travel over the route 302 prior to the vehicle system 300 actually traveling over the route 302 and using the synchronous trip plan established for travel over the route 302. The coupler parameters 310 may be calculated using one or more of the relationships described above, or in another manner that represents compression and/or tension in the couplers 108. In one embodiment, relatively large variances in the coupler parameters 310 can indicate poor handling of the vehicle system 300. For example, a trip plan that causes a vehicle system 300 to have relatively large, positive coupler parameters 310 and large, negative coupler parameters 310 may indicate that traveling according to the trip plan will result in poor handling of the vehicle system 300 relative to a trip plan that results in smaller positive coupler parameters 310 and/or smaller negative coupler parameters 310.

Returning to the discussion of the method 200 shown in FIG. 2, another example of handling parameters is terrain excitation parameters. Terrain excitation parameters represent grades of the route 102 (shown in FIG. 1) at the different locations, masses of one or more of the vehicles 104, 106 (shown in FIG. 1) in the vehicle system 100 (shown in FIG. 1) at the different locations, and/or tractive efforts that are to be provided by one or more of the propulsion-generating vehicles 104 at the different locations according to a trip plan (e.g., a synchronous trip plan).

A terrain index can represent the terrain under each vehicle 104, 106 as the vehicle system 100 travels along the route 102. The terrain index may have a static component (e.g., a DC or average or steady component) and a dynamic component (e.g., an AC or varying or oscillating component). The static component of the terrain index can be defined as:

$$\mu_i = -m_i g_i + T_i \qquad \text{(Equation \#3)}$$

where $u_i$ represents the static component of the terrain index beneath the $i^{th}$ vehicle 104, 106 in the vehicle system 100, $m_i$ represents the mass of the $i^{th}$ vehicle 104, 106, g represents the grade of the route 102 beneath the $i^{th}$ vehicle 104, 106, and $T_i$ represents a tractive effort and/or braking effort to be provided by the $i^{th}$ vehicle 104, 106 according to the trip plan (e.g., the synchronous trip plan), according to the currently implemented tractive effort and/or braking effort, and/or according to asynchronous brake settings used by the different vehicles (as described below). In one aspect, a distribution of weight or mass of the vehicles in the vehicle system may not be even. For example, the masses of the vehicles in one location or portion of the vehicle system may be larger than the masses of the vehicles in other locations or portions of the vehicle system. Alternatively, the masses of the vehicles may be even throughout the vehicle system, such as the masses of all vehicles 104, 106 being equal or within a designated range of one another, such as within 1%, 3%, 5%, 10%, or the like.

The dynamic component of the terrain index can be defined as:

$$\tilde{\mu}_i = -m_i g_i + T_i - \sum_{j=1}^{N} \mu_i \qquad \text{(Equation \#4)}$$

where $\tilde{\mu}_i$ represents the dynamic component of the terrain index and N represents the number of vehicles 104, 106 for which the terrain index is determined. In one embodiment, the coupler parameters 310 shown in FIG. 3 can represent the dynamic component of the terrain index for the vehicle system 300 instead of the coupler parameters of the vehicle system 300.

In one embodiment, the terrain excitation parameter may be based on the dynamic component of the terrain index. For example, the terrain excitation parameter may be a filtered dynamic component of the terrain index and represented by:

$$e(k) = \sum_{i=1}^{k} \tilde{\mu}_i a^{k-1} \qquad \text{(Equation \#5)}$$

$$e(i) = \tilde{\mu}_i a^{k-1} \qquad \text{(Equation \#6)}$$

where e(k) represents the terrain excitation parameter for the vehicle system 100 beneath the $k^{th}$ vehicle 104, 106, a represents a configurable or tunable constant referred to as a spatial decay rate of terrain input and having a value between 0 and 1, e(i) represents the terrain excitation parameter for the $i^{th}$ vehicle 104, 106 in the vehicle system 100, and m represents the number of vehicles 104, 106 in the vehicle system 100.

FIG. 4 illustrates terrain excitation parameters 410 that are estimated for the vehicle system 300 to travel along the route 302 in accordance with one example. The terrain excitation parameters 410 are shown alongside a horizontal axis 412 representative of locations along the length of the vehicle system 300 and a vertical axis 414 representative of magnitudes of the terrain excitation parameters 310.

As shown in FIG. 4, when the trip plan directs the propulsion-generating vehicles 304A-C to use the same braking efforts during traversal of the peak or apex in the route 302, the terrain excitation parameters 410 increase along the length of the vehicle system 300 and then decrease. For example, the terrain excitation parameters 410 corresponding to locations below the back end of the vehicle system 300 to beneath the non-propulsion generating vehicle 306C increase to a maximum, and then decrease to a minimum beneath the propulsion-generating vehicle 306B, before increasing again beneath the propulsion-generating vehicle 306A.

The terrain excitation parameters 410 can be estimated for travel over the route 302 prior to the vehicle system 300 traveling over the route 302 and using the synchronous trip plan established for travel over the route 302. The terrain excitation parameters 410 may be calculated using one or more of the relationships described above, or in another manner that represents compression and/or tension in the couplers 108. In one embodiment, relatively large terrain excitation parameters 410 (e.g., large positive and/or large negative values) can indicate poor handling of the vehicle system 300. For example, a trip plan that causes a vehicle system 300 to have relatively large maximum or minimum terrain excitation parameters 410 may indicate that traveling according to the trip plan will result in poor handling of the vehicle system 300 relative to a trip plan that results in smaller maximum or minimum terrain excitation parameters 410.

Returning to the discussion of the method 200 shown in FIG. 2, another example of handling parameters is node parameters. Node parameters represent a number of the nodes in the vehicle system 100 (shown in FIG. 1) and/or a rate of movement of the nodes in the vehicle system 100. A node can represent a location in the vehicle system 100 where an absolute value of force that is estimated to be exerted on a coupler 108 is less than a designated threshold. A rigid rope model of the vehicle system 100 may be used to identify the presence and/or locations of nodes in the vehicle system. In such a model, the couplers 108 are treated as having no slack and the vehicle system 100 is treated as traveling according to the trip plan (e.g., the synchronous trip plan). Locations where the couplers 108 are estimated to have relatively large compressive forces or relatively large tensile forces due to the tractive and/or braking efforts designated by the trip plan and due to the grades in the route 102 (shown in FIG. 1) are not identified as nodes. Other locations where the couplers 108 are estimated to have relatively small or no compressive or tensile forces are identified as nodes.

With respect to the example shown in FIG. 3, the coupler parameter 310G may represent the location of a node in the vehicle system 300. The number of nodes (e.g., one in the example of FIG. 3, but alternatively may be a larger number) can be a node parameter. Additionally or alternatively, the rate of movement of the nodes in the vehicle system can be a node parameter. For example, as the vehicle system moves up and down different grades of the route and/or using tractive and/or braking efforts designated by the synchronous trip plan, the locations of the nodes within the vehicle system may change (e.g., move to another coupler 108). This movement can be estimated as a speed or rate of movement, such as in units of number of couplers per second, number of vehicles per second, and the like.

Returning to the discussion of the method 200 shown in FIG. 2, another example of handling parameters is neighboring velocity parameters. The neighboring velocity parameters can represent differences in speed between neighboring vehicles 104 and/or 106 in the vehicle system 100 shown in FIG. 1. For example, speeds of the vehicles 104, 106 traveling according to a synchronous trip plan can be estimated based on the sizes (e.g., masses) of the vehicles 104, 106, the location of the vehicles 104, 106 in the vehicle system 100, the grade of the route 102, and the like. Because the couplers 108 between the vehicles 104, 106 are not entirely rigid bodies, there may be some differences in the speeds of the vehicles 104, 106 that are directly connected with each other.

For example, a leading propulsion-generating vehicle 104 that is accelerating according to a trip plan may at least temporarily travel faster than another, heavier propulsion-generating vehicle 104 that is directly coupled to the leading propulsion-generating vehicle 104 and/or than a non-propulsion generating vehicle 106 that is directly coupled to the leading propulsion-generating vehicle 104. As another example, when cresting a hill, a first vehicle 104 or 106 that is on the downward sloping side of the hill may be temporarily traveling faster than a second vehicle 104 or 106 that is directly connected to the first vehicle 104 or 106 and that is on the upward sloping side of the hill. In another example, when traversing a dip or low point in the route 102, a first vehicle 104 or 106 that is on the upward sloping side of the low point may be temporarily traveling slower than a second vehicle 104 or 106 that is directly connected to the first vehicle 104 or 106 and that is on the downward sloping side of the low point. The differences in speeds between the neighboring (e.g., adjacent) vehicles 104 and/or 106 can vary forces exerted on the couplers 108 to generate jerking movements that decrease the handling of the vehicle system 100.

Another example of handling parameters is momentum. The momentum can be the momentum of the vehicle system, one or more vehicles in the vehicle system, and/or one or more groups of vehicles in the vehicle system. Differences in momentum between different vehicles or groups of vehicles in the vehicle system can indicate reduced handling parameters and/or increased forces on couplers. For example, a larger momentum for a group of vehicles that includes the vehicles 104A-E and 106A-C and a smaller momentum for a group of vehicles that includes the vehicles 104F-G and 106D-I can indicate that the coupler 108 or couplers 108 between these vehicle groups may be experiencing relatively large forces (e.g., tensile forces) that result in reduced handling parameters of the vehicle system (e.g., relative to smaller momenta and/or smaller differences in momenta between the vehicle groups).

In one embodiment, the handling parameters may not be determined based on a synchronous trip plan. A synchronous trip plan may not be obtained at 202, but the handling parameters can be determined (e.g., estimated, calculated, or the like) based on one or more of the trip data, route data, and/or vehicle data. For example, without having a previously generated trip plan for an upcoming or current trip, one or more of the handling parameters described herein may be determined using grades of the route, curvatures of the route, speed limits of the route, weight of the vehicle system, or the like.

At 206, total power outputs that are to be provided by the vehicle system 100 are determined at the locations along the route 102. For example, the total power outputs that are to be provided, in the aggregate, by the propulsion-generating vehicles 104 in the vehicle system 100 may be determined for at least some, or all, the same locations at which the handling parameters are determined at 204.

In one embodiment, the total power outputs can be determined from the synchronous trip plan. For example, the synchronous trip plan may designate the total power outputs to be provided by the propulsion-generating vehicles 104 at the locations. Alternatively, the synchronous trip plan can designate the individual power outputs to be provided by each of the propulsion-generating vehicles 104 at the locations, and the total power outputs of the vehicle system 100 can be determined from the sum or other aggregate of these individual power outputs. In another embodiment, the total power outputs can be derived from other designated operational settings of the synchronous trip plan at the locations. For example, the total power outputs may be calculated from the designated speeds, accelerations, or other settings of the synchronous trip plan at the locations. The total power outputs may be determined before, during, or after the handling parameters are determined. Optionally, the total power output can be determined without a trip plan or synchronous trip plan. For example, based on the mass of the vehicle system, the locations of the propulsion-generating vehicles in the vehicle system, and the grades of the route, an estimate or calculation of the total power needed to propel the vehicle system along the route (e.g., to achieve the trip objective subject to operating constraints) may be made.

Alternatively, an operator of the vehicle system 100 can designate or input the total power output. The operator can provide the total power output so that the method 600 can determine the operational settings that result in providing the total power output provided by the operator.

At 208, asynchronous operational settings for the vehicle system 100 are determined. For example, the total power outputs can be divided among the propulsion-generating vehicles 104 in the vehicle system 100 at the locations and based on the handling parameters by determining different operational settings for different vehicles 104, 106 at these locations. The total power outputs of the synchronous trip plan may be divided among the propulsion-generating vehicles 104 by designating the same throttle and/or brake settings for each of the propulsion-generating vehicles 104. Using the handling parameters that are determined at the locations along the route 102, the same total power outputs at these locations can be divided among the propulsion-generating vehicles 104 by designating different throttle and/or brake settings for the propulsion-generating vehicles 104. For example, the synchronous trip plan may direct the seven propulsion-generating vehicles 104 to use the same throttle setting to generate a total power output of 15,000 horsepower at a location along the route 102. Optionally, the total power output may be determined without the aid of the synchronous trip plan, but may be determined using vehicle data, trip data, and/or route data. The 15,000 horsepower output may be asynchronously divided among the propulsion-generating vehicles 104 by assigning different throttle and/or brake settings to the different propulsion-generating vehicles 104. The propulsion-generating vehicles 104 may use the different operational settings to provide at least the 15,000 horsepower, but with improved handling of the vehicle system 100 relative to the synchronous trip plan and/or relative to using other operational settings.

In one embodiment, the asynchronous operational settings are determined based on the handling parameters for all the locations along the route 102 for which the handling parameters were estimated. Alternatively, the asynchronous operational settings may be determined for a subset of these locations, such as for the locations associated with handling parameters that exceed one or more designated thresholds. The handling parameters that exceed the thresholds may indicate locations or segments of the route 102 where handling of the vehicle system 100 may be more difficult than other locations or segments of the route 102.

The different operational settings of the propulsion-generating vehicles 104 may be designated for use by the vehicles 104 prior to embarking on the trip. For example, before the vehicle system 100 begins the trip (e.g., leaves a location of trip origin), the method 200 may be used to convert the same operational settings designated by the synchronous trip plan into the different (e.g., asynchronous) operational settings at one or more locations along the route 102. Then, when the vehicle system 100 arrives at or approaches the locations, the asynchronous operational settings may be used to control the propulsion-generating vehicles 104 (e.g., autonomously or by directing an operator to manually implement the asynchronous operational settings).

Alternatively, the method 200 may be used to convert the operational settings of the synchronous trip plan into the asynchronous operational settings in real time. By "real time," it is meant that, in one embodiment, the operational settings of the synchronous trip plan that are associated with one or more locations along the route 102 (e.g., for implementation by the propulsion-generating vehicles 104 at those locations) can be converted into the asynchronous operational settings after the vehicle system 100 has begun traveling on the route 102 for the trip, but before or just as the vehicle system 100 arrives at the one or more locations. The vehicle system 100 may convert the operational settings on an as-needed basis, such as by converting the operational settings of the synchronous trip plan for a closer first location, and then converting the operational settings of the synchronous trip plan for a farther second location after passing the first location.

With respect to using the handling parameters to convert the operational settings of the synchronous trip plan into asynchronous operational settings, the method 200 may include (e.g., at 208) determining different operational settings for at least two or more of the propulsion-generating vehicles 104 at a location along the route 102 to change one or more of the handling parameters, such as to one or more designated values or limits. For example, the method 200 may include attempting to reduce or minimize one or more of the handling parameters by changing the operational settings from the synchronous trip plan. By "minimize," it is meant that the value of one or more of the handling parameters is reduced relative to the handling parameters as determined (e.g., estimated or simulated) from the synchronous trip plan, but not necessarily reduced to the absolute lowest value possible. "Minimizing" also can mean reducing the value to at least a designated limit, but not necessarily the smallest possible value. By way of example only, minimizing the handling parameters can include reducing one or more coupler parameters, terrain excitation parameters, node parameters, and/or neighboring velocity parameters relative to the corresponding coupler parameters, terrain excitation parameters, node parameters, and/or neighboring velocity parameters that are estimated using the synchronous trip plan, but not necessarily to a value of zero.

The designated limits to which the handling parameters are changed may be based on vehicle data and/or route data. For example, the limits may be expressed as a function of the terrain over which the vehicle system travels. As a result, the limits can be different at different locations along the route. As another example, the limits may be expressed as a function of the vehicle size (e.g., weight, weight distribution, length, and the like), the type of vehicle (e.g., the power output capability of the system or vehicle 104), the type of coupler (e.g., the strength, age, and/or health of the couplers), and the like. Optionally, the designated limits may change value, such as to account for hysteresis or other impacts on the values of the handling parameters over time.

The handling parameters that are estimated or simulated using the synchronous operational settings may be referred to as synchronous handling parameters and the handling parameters that are estimated or simulated using asynchronous operational settings may be referred to as asynchronous handling parameters. The handling parameters can be reduced by estimating or simulating the synchronous handling parameters, changing the synchronous operational settings to asynchronous operational settings (while keeping the total power output of the vehicle system 100 at least as large as the total power output that would be obtained using the synchronous operational settings), estimating or simulating the asynchronous handling parameters, and comparing the synchronous handling parameters with the asynchronous handling parameters. Several iterations of this process may be performed so that several potential asynchronous handling parameters and associated asynchronous operational settings are determined. Then, the asynchronous operational settings associated with one or more asynchronous handling parameters that are reduced relative to the synchronous handling parameters may be selected for use at the associated location along the route 102. Additionally or alternatively, a history of handling parameters using synchronous and/or asynchronous operational settings and handling parameters (e.g., as measured and/or estimated) from previous trips of the vehicle system 100 along the route 102 may be used to determine the asynchronous operational settings associated with reduced handling parameters.

In one embodiment, the asynchronous operational settings are directly determined without using a synchronous trip plan (e.g., without using the synchronous operational settings or by basing the asynchronous operational settings on previously generated synchronous operational settings). For example, instead of first obtaining or determining a synchronous trip plan and then determining the asynchronous operational settings from the synchronous trip plan, the asynchronous operational settings may be determined directly from data such as vehicle data and/or route data. In one example, the asynchronous operational settings may be determined by determining one or more solutions to an optimization problem represented by (and referred to as Equation #7):

$$\min_{u_1(x),\ldots,u_n(x)} \alpha(x) \times f(u_1, \ldots, u_n) + \beta(x) \times \text{fuel}(u_1, \ldots, u_n) + \gamma(x) \sum_{i=1}^{n} (u_i - u_{is})^2$$

where $u_i(x), \ldots, u_n(x)$ represent tractive efforts (e.g., power outputs) of the propulsion-generating vehicles 104 numbered 1 through n in the vehicle system 100 that are to be determined by changing the synchronous operational settings (where n represents the number of vehicles 104 having operational settings that are to be modified). For example, $u_i(x), \ldots, u_n(x)$ may represent the variables in the above Equation #7 that are to be solved for and used to determine the asynchronous operational settings. The variable $u_i(x)$ represents the tractive effort provided by the $i^{th}$ propulsion-generating vehicle 104 in the vehicle system 100 at the location (x) using asynchronous operational settings while the variable $u_{is}(x)$ represents the tractive effort provided by the $i^{th}$ propulsion-generating vehicle 104 in the vehicle system 100 at the location (x) using synchronous operational settings. When the tractive efforts $u_i(x), \ldots, u_n(x)$ are determined, then the operational settings that are associated with the tractive efforts $u_i(x), \ldots, u_n(x)$ may be determined (e.g., by identifying which throttle and/or brake settings provides the associated efforts $u_i(x), \ldots, u_n(x)$). Optionally, the variables $u_i(x), \ldots, u_n(x)$ can include or represent the braking efforts provided by the vehicles 104 and/or 106 of the vehicle system 100. The variable x represents a location or distance along the route 102, and may change for different locations for which the tractive efforts $u_i(x), \ldots, u_n(x)$ are being determined.

The function f( ) can represent a function that captures (e.g., mathematically represents) handling of the vehicle system 100, and is referred to as a vehicle handling function. While the vehicle handling function is shown in Equation #7 as being dependent on the tractive efforts $u_i(x), \ldots, u_n(x)$ of the propulsion-generating vehicles 104, the vehicle handling function may additionally or alternatively be dependent on one or more other factors, such as terrain (e.g., grade and/or curvature of the route 102), a make-up of the vehicle system 100 (e.g., the distribution of weight, propulsion-generating vehicles 104, and/or non-propulsion generating vehicles 106 in the vehicle system 100), and/or speeds of the vehicle system 100 using the synchronous operational settings.

The function fuel( ) can represent a function that captures (e.g., mathematically represents) how much fuel is consumed by the vehicle system 100 (e.g., by the propulsion-generating vehicles 104) when the tractive efforts $u_1(x), \ldots, u_n(x)$ are generated by the propulsion-generating vehicles 104 at the respective locations (x) along the route 102.

The variables $\alpha$, $\beta$, and $\gamma$ in Equation #7 can represent tuning parameters that may be manually or autonomously changed to control the relative weights of different terms in the equation. The variable $\alpha(x)$ can represent a tuning parameter that is based on the total variation or other variation in the grade of the route 102 beneath the vehicle system 100 at a location (x) along the route 102. For example, the variable a(x) can represent roughness of the route 102, which can be defined as:

$$\alpha(x) = \sum_{i=1}^{n-1} |g_i - g_{i+1}| \qquad \text{(Equation #8)}$$

where $g_i$ represents the grade of the route 102 underneath the $i^{th}$ vehicle 104 or 106 at the location or distance (x). Optionally, the grade can be scaled by mass of the vehicles 104, 106 in the above Equation #8. In one embodiment, one or more of the variables $\alpha$, $\beta$, and $\gamma$ may be based on vehicle data and/or route data. For example, $\alpha$, $\beta$, and/or $\gamma$ may be expressed as a function of the type of vehicles in the vehicle system, the age and/or health of the vehicles, the tractive and/or braking output capabilities of the vehicles, the size of the vehicle system, and the like. As another example, $\alpha$, $\beta$, and/or $\gamma$ may be expressed as a function of the location of the vehicle system and/or the terrain over which the vehicle system is currently located. As another example, $\alpha$, $\beta$, and/or $\gamma$ may be expressed as a function of the type, age, and/or health of couplers in the vehicle system.

The variables $\alpha$, $\beta$, and $\gamma$ may have values that change to alter the relative importance (e.g., weight) in the equation on handling of the vehicle system 100, fuel consumption of the vehicle system 100, and how far or close the asynchronous operational settings should remain to the synchronous operational settings (e.g., the degree of change in the operational settings that can occur). In one example, the values of the variables $\alpha$, $\beta$, and $\gamma$ may be $\alpha(x)=1$, $\beta(x)=0$, and $\gamma(x)=0$, which can result in only the handling performance of the vehicle system 100 being improved, while the impact of changing the operational settings on fuel consumption and the difference between the synchronous and asynchronous operational settings are essentially ignored.

The values of the variables $\alpha$, $\beta$, and $\gamma$ may change based on distance (x) along the route 102. For example, if $\alpha(x)$ is represented by Equation #8, then the values of $\beta(x)$ and $\gamma(x)$ to be nonzero constants can cause more emphasis to be placed on the vehicle handling function in Equation #7 in locations where the terrain beneath the route 102 is relatively more difficult (e.g., variations in the grade are more severe and/or more frequent).

As described above, different values of tractive efforts $u_i(x), \ldots, u_n(x)$ may be inserted into Equation #7 to identify tractive efforts $u_i(x), \ldots, u_n(x)$ (e.g., and associated asynchronous operational settings) that reduce one or more of the handling parameters relative to the synchronous operational settings at one or more locations (x) along the route 102. In one embodiment, the potential values of the tractive efforts $u_u(x), \ldots, u_n(x)$ may be limited based on constraints, such as upper and lower magnitude limits and rate bounds (e.g., limitations on how quickly the tractive efforts can change with respect to distance).

Also as described above, because the variable $u_i(x)$ represents the tractive effort provided by the $i^{th}$ propulsion-generating vehicle 104 in the vehicle system 100 at the location (x) using asynchronous operational settings and the variable $u_{is}(x)$ represents the tractive effort provided by the $i^{th}$ propulsion-generating vehicle 104 in the vehicle system 100 at the location (x) using synchronous operational settings, then a constraint that may applied to Equation #7 may be that the values of $u_i(x)$ may need to satisfy the following so that the total effort or total power output of the vehicle system 100 is not decreased by changing from the synchronous operational settings associated with $u_{is}(x)$ to the asynchronous operational settings associated with $u_i(x)$:

$$\sum_{i=1}^{n} u_i(x) = \sum_{i=1}^{n} u_{is}(x) \qquad \text{(Equation \#9)}$$

The vehicle handling function f( ) can be determined by attempting to reduce or minimize one or more of the handling parameters using different asynchronous operational settings (that result in different tractive efforts $u_i(x), \ldots, u_n(x)$ being provided by the propulsion-generating vehicles 104) at one or more locations along the route 102. With respect to the coupler parameters, one or more functions representative of coupler forces or energy stored in the couplers 108 may be used to reduce or minimize the coupler parameters. These functions may be applied to the couplers 108 over the entire vehicle system 100, within a segment of the vehicle system 100, and/or between the first leading propulsion-generating vehicle 104A and the last trailing propulsion-generating vehicle 104G. By way of example only, these functions may include a sum of squares of the forces that are estimated to be exerted on the couplers 108, the maximum value of the forces exerted on the couplers 108 and/or energies stored in the couplers 108, the minimum value of the forces exerted on the couplers 108 and/or energies stored in the couplers 108, the maximum absolute value of the forces exerted on the couplers 108 and/or energies stored in the couplers 108, the sum of the forces exerted on the couplers 108 and/or energies stored in the couplers 108, the absolute sum of the forces exerted on the couplers 108 and/or energies stored in the couplers 108, and the like. Equations 1 and 2 above represent a couple of examples of such functions.

With respect to the terrain excitation parameters, one or more functions representative of the terrain excitation parameters may be used to reduce or minimize the terrain excitation parameters. For example, different combinations of tractive efforts $u_i(x), \ldots, u_n(x)$ may be used in attempts to determine which combination results in a function of the terrain excitation parameters being reduced or minimized. One example of such a function includes:

$$f(\mu) = \sum_{k=1}^{N} e(k)^2 \qquad \text{(Equation \#10)}$$

where $e(k)^2$ represents the square of the terrain excitation parameter for the $k^{th}$ vehicle 104, 106 in the vehicle system 100 including N vehicles 104, 106. The sum of the squares may be determined for the entire vehicle system 100, within a segment of the vehicle system 100, and/or between the first leading propulsion-generating vehicle 104A and the last trailing propulsion-generating vehicle 104G.

Another example of a function of the terrain excitation parameters includes:

$$f(\mu) = k \, |\overset{max}{e(k)}| \qquad \text{(Equation \#11)}$$

Such a function determines the maximum terrain excitation parameter and may be used to identify the largest terrain excitation parameter in the entire vehicle system 100, within a segment of the vehicle system 100, and/or between the first leading propulsion-generating vehicle 104A and the last trailing propulsion-generating vehicle 104G.

Another example of a function of the terrain excitation parameters includes:

$$f(\mu) = \Sigma |e(k)| \qquad \text{(Equation \#12)}$$

Such a function determines the sum of the terrain excitation parameters and may be used to identify the sum of the terrain excitation parameters in the entire vehicle system 100, within a segment of the vehicle system 100, and/or between the first leading propulsion-generating vehicle 104A and the last trailing propulsion-generating vehicle 104G.

With respect to the node parameters, different combinations of tractive efforts $u_i(x), \ldots, u_n(x)$ may be used in attempts to determine which combination results in the number of nodes being reduced or minimized and/or which combination results in the rate of movement of one or more nodes being reduced or minimized.

With respect to the neighboring velocity parameters, one or more functions representative of the neighboring velocity parameters may be used to reduce or minimize the neighboring velocity parameters. For example, different combinations of tractive efforts $u_i(x), \ldots, u_n(x)$ may be used in attempts to determine which combination results in a function of the neighboring velocity parameters being reduced or minimized. One example of such a function includes:

$$f(v) = \sum_{i=1}^{N-1} (v_i - v_{i+1})^2 \qquad \text{(Equation \#13)}$$

where $v_i$ represents the velocity of the $i^{th}$ vehicle 104 or 106 in the vehicle system 100 having N vehicles 104, 106 and the term $(v_i - v_{i+1})$ represents the difference in velocities of neighboring vehicles 104 and/or 106.

Another example of a function of the neighboring velocity parameters includes:

$$f(v) = |\overset{max}{v_i - v_{i+1}}| \qquad \text{(Equation \#14)}$$

Such a function determines the maximum difference in velocities of the neighboring vehicles 104 and/or 106 and may be used to identify the neighboring velocity parameter in the entire vehicle system 100, within a segment of the vehicle system 100, and/or between the first leading propulsion-generating vehicle 104A and the last trailing propulsion-generating vehicle 104G.

With respect to momentum being used as a handling parameter, the tractive efforts and/or braking efforts (e.g., operational settings) may be determined for one or more locations along the route 102 may be determined in order to cause the vehicle system 100 and/or one or more vehicles 104, 106 to slow down (relative to a current or previous speed) so that the momentum of the vehicle system 100 and/or one or more groups of vehicles 104, 106 to decrease (relative to a current or previous momentum). For example, the operational settings may be determined to cause the momentum of one group of the vehicles 104, 106 to decrease to a designated momentum, such as the momentum of another group of the vehicles 104, 106 in the same vehicle system 100, to within a designated range of the momentum of the other group of the vehicles 104, 106 (e.g., within 1%, 3%, 5%, 10%, or another range), or another value. Alternatively, the operational settings may be determined to cause the momentum of one group of the vehicles 104, 106 to increase to a designated momentum, such as the momentum of another group of the vehicles 104, 106 in the same vehicle system 100, to within a designated range of the momentum of the other group of the vehicles 104, 106 (e.g., within 1%, 3%, 5%, 10%, or another range), or another value. Designating the operational settings to cause the momentum of different vehicles 104, 106 or vehicle groups in the same vehicle system 100 to be the same or within a designated range of each other can reduce the forces exerted on couplers between the vehicles 104, 106 and/or vehicle groups and/or can eliminate or reduce nodes in the vehicle system, and thereby improve handling parameters of the vehicle system.

When the tractive efforts and/or braking efforts $u_i(x), \ldots, u_n(x)$ are identified at one or more locations along the route 102 that reduce the handling parameters relative to the synchronous operational settings, the asynchronous operational settings that correspond to the identified the tractive efforts and/or braking efforts $u_i(x), \ldots, u_n(x)$ are determined. For example, the throttle settings and/or brake settings that are needed for each of the propulsion-generating vehicles 104 to provide the identified tractive efforts and/or braking efforts $u_i(x), \ldots, u_n(x)$ are determined, such as from a table, listing, previously determined relationship between the efforts and the settings, or the like. Flow of the method 200 then proceeds to 210.

At 210, a determination is made as to whether one or more of the asynchronous operational settings can be modified to achieve or improve upon a trip objective. As described above, a trip objective can include a reduction in fuel consumption, emission generation, and/or travel time. If one or more of the asynchronous operational settings can be changed to reduce fuel consumption, emission generation, and/or travel time (relative to not changing the asynchronous operational settings) while avoiding significant decreases in the improvement in vehicle handling (that is achieved by using the asynchronous operational settings), then the asynchronous operational settings may be modified. On the other hand, if changing the asynchronous operational settings would not result in achieving or improving upon a trip objective, then the asynchronous operational settings may not be changed.

Figure 5:
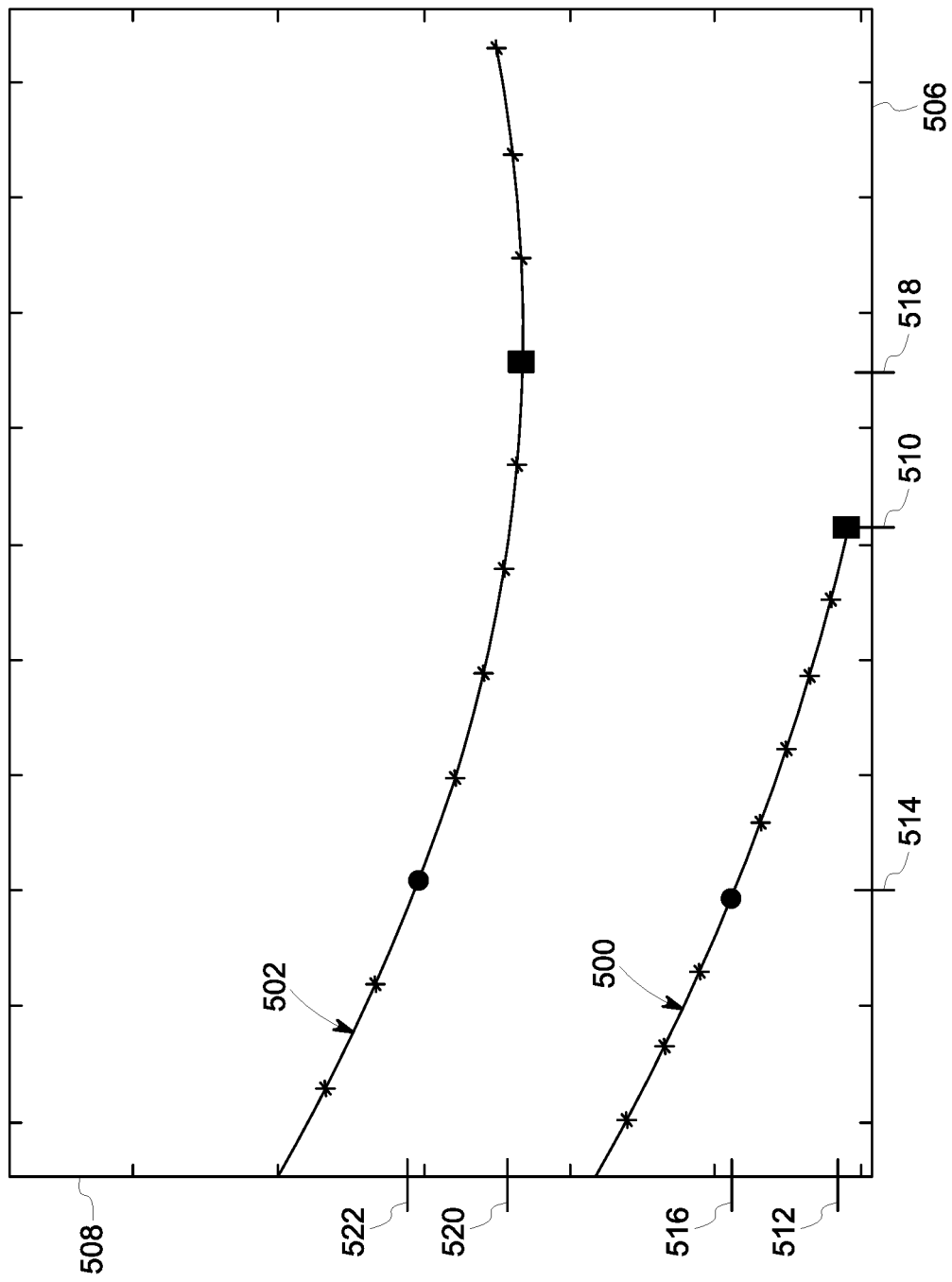
FIG. 5 illustrates two relationships between different asynchronous operational settings and a handling parameter at two different locations along the route shown in FIG. 1 in accordance with one example.

FIG. 5 illustrates two relationships 500, 502 between different asynchronous operational settings and a handling parameter at two different locations along the route 102 (shown in FIG. 1) in accordance with one example. The relationships 500, 502 may each represent how a handling parameter (e.g., a coupler parameter representative of an amount of energy stored in one or more, or all, of the couplers 108 in the vehicle system 100 shown in FIG. 1) varies at each the two different locations if the operational setting (e.g., a throttle setting for a propulsion-generating vehicle 104) is changed. The relationships 500, 502 are shown alongside a horizontal axis 506 representative of the operational parameter and a vertical axis 508 representative of the handling parameter.

For example, the relationship 500 may represent how the handling parameter is expected to change if the operational setting is changed at a first location along the route 102. As shown in FIG. 5, a previous synchronous operational setting may be changed to an asynchronous operational setting at a first value 510 to cause the handling parameter to be minimized or otherwise reduced to a lower value 512 at the first location along the route 102. Changing the first value 510 of the asynchronous operational setting to a second value 514 may achieve or improve upon a trip objective, such as by reducing the throttle setting to reduce the amount of fuel consumed by the vehicle system 100. This change, however, also causes the handling parameter to be increased from the lower value 512 to an upper value 516.

The determination of whether to decrease the operational setting to the value 514 may be based on one or more thresholds. For example, if this change in operational setting results in a reduction in fuel consumption and/or a reduction in the amount of emissions generated that is greater than one or more designated threshold amounts, and the change does not result in the handling parameter increasing by more than a designated threshold amount from the lower value 512 to the upper value 516 and/or cause the vehicle system 100 to travel slower than a designated speed or produce less than a designated total power output, then the change may be implemented. If, however, the change results in a reduction in fuel consumption and/or emissions generation that is smaller than a threshold amount, the handling parameter increasing by more than a threshold amount, and/or the vehicle system 100 to travel slower than a designated speed and/or produce less than a designated total power, then the change may not be made to the previously identified asynchronous operational setting.

As another example, the relationship 502 may represent how the handling parameter is expected to change if the operational setting is changed at a different, second location along the route 102. As shown in FIG. 5, a previous synchronous operational setting may be changed to an asynchronous operational setting at a third value 518 to cause the handling parameter to be minimized or otherwise reduced to a lower value 520 at the second location along the route 102. As shown by the relationship 502, increasing or decreasing the operational setting will cause the handling parameter to increase. Increasing the operational setting may not be permitted as doing so may cause the vehicle system 100 to consume excess fuel and/or generate increased emissions. Therefore, the operational setting may be decreased. In one embodiment, the operational setting may be decreased until the handling parameter is increased by no more than a threshold amount or by no more than a designated threshold value. For example, the operational setting may be decreased until the lower value 520 of the handling parameter is increased to an upper limit 522 on the handling parameter.

Returning to the description of the method 200 shown in FIG. 2, at 210, if the asynchronous operational setting can be modified at one or more locations along the route 102 to achieve or improve upon a trip objective, then flow of the method 200 may proceed to 212. Otherwise, the method 200 may proceed to 214.

At 212, the asynchronous operational settings are modified at one or more locations along the route 102. For example, after determining the asynchronous operational settings and determining that the asynchronous operational settings can be changed to achieve or improve upon a trip objective, the asynchronous operational settings that can be changed are modified. As a result, the modified asynchronous operational settings that are so determined can provide at least the total power output that is dictated by the synchronous trip plan at various locations along the route 102, but also improve upon the handling of the vehicle system 100 relative to the synchronous trip plan and achieve one or more trip objectives relative to the synchronous trip plan.

At 214, the asynchronous operational settings (e.g., the asynchronous operational settings that were modified or that were not modified) are used to asynchronously control operations of the vehicle system 100. For example, the asynchronous operational settings can be used to autonomously control operations of the propulsion-generating vehicles 104 along the route 102. Alternatively, the asynchronous operational settings can be used to direct an operator to manually control operations of the propulsion-generating vehicles 104 along the route 102 according to the asynchronous operational settings.

Figure 6:
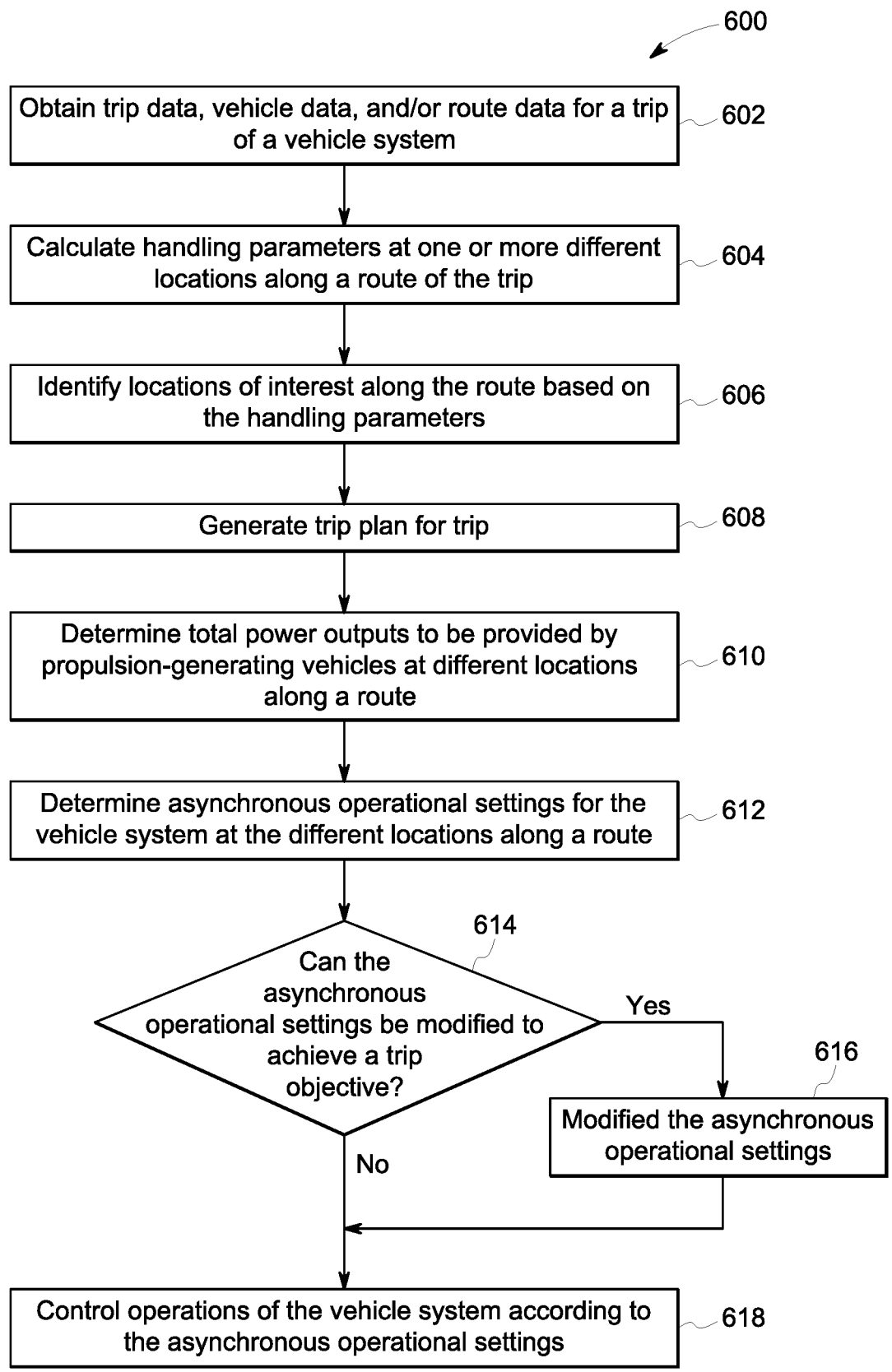
FIG. 6 is a flowchart of another embodiment of a method for operating the vehicle system shown in FIG. 1.

FIG. 6 is a flowchart of another embodiment of a method 600 for operating the vehicle system 100 shown in FIG. 1. The method 600 may be used in conjunction with the vehicle system 100. For example, the method 600 may be used to identify asynchronous operational settings for the vehicle system 100 when no synchronous trip plan is available or is not used to derive the asynchronous operational settings.

At 602, trip data representative of a trip to be traveled or currently being traveled by the vehicle system 100, vehicle data representative of the vehicle system 100, and/or route data representative of the route 102 of the trip are obtained. The data may be obtained from one or more memory devices disposed onboard and/or off-board of the vehicle system 100, such as from a dispatch facility.

At 604, handling parameters are calculated at one or more different locations along the route 102 of the trip. For example, one or more of the handling parameters described above can be estimated from a simulation of travel of the vehicle system 100 and/or from previous trips of the same or similar vehicle system 100 along the route 102. In one embodiment, the terrain excitation parameter is estimated for travel of the vehicle system 100 over the route 102. If throttle and/or brake settings are needed to determine the handling parameters, then default values, historical values (e.g., settings used during a previous trip over the route 102), and/or other values may be used to estimate the handling parameters.

At 606, one or more locations of interest along the route 102 are identified based on the handling parameters. A location of interest may represent a section of the route 102 that may be relatively difficult or complex to control operations of the vehicle system 100 while providing improved handling relative to one or more other sections of the route 102. For example, a section of the route 102 having undulating terrain may be more difficult or complex to control the vehicle system 100 over with improved handling relative to the vehicle system 100 traveling over a relatively flat section of the route 102. In one embodiment, the locations of interest are identified when the handling parameters that are calculated at 604 exceed one or more designated thresholds. For example, the locations along the route 102 where the handling parameters are calculated to be relatively large may be identified as locations of interest.

At 608, a trip plan is created for the trip along the route 102. For example, a trip plan having synchronous operational settings for the propulsion-generating vehicles 104 at various locations along the route 102 may be created. As described above, in one embodiment, the trip plan may be created using one or more embodiments of the subject matter described in the '354 Application. The trip plan may be created using the trip data, vehicle data, and/or route data and may reduce fuel consumed, emissions generated, and/or travel time for the trip relative to the vehicle system 100 traveling along the route 102 for the trip according to another, different trip plan having different synchronous operational settings.

In one embodiment, the trip plan may be created subject to one or more constraints placed on the operational settings used at the locations of interest. For example, a reduced speed limit (e.g., relative to a government or landowner-mandated speed limit) may be applied to the locations of interest and/or a minimum speed limit that the vehicle system 100 is required to maintain may be applied to the locations of interest. Alternatively or additionally, limitations on how often throttle and/or brake settings can be changed in the locations of interest can be placed on the trip plan. Other limitations on movements and/or control of the vehicle system 100 may be applied as well. The trip plan may then be created so that the synchronous operational settings of the trip plan abide by these restrictions on the locations of interest. For example, the trip plan may be created so that the vehicle system 100 is not directed to travel faster than upper speed limits or slower than minimum speed limits at the associated locations of interest. Other examples of constraints are described above, such as engine derating, notch delta penalties, limitations on how frequently group assignments can change, limitations on nodes, etc.

At 610, total power outputs that are to be provided by the vehicle system 100 are determined at the locations along the route 102. For example, similar to 206 of the method 200 shown in FIG. 2, the total power outputs that are to be provided, in the aggregate, by the propulsion-generating vehicles 104 in the vehicle system 100 may be determined for at least some, or all, the same locations at which the handling parameters are determined at 204. Alternatively, an operator of the vehicle system 100 can designate or input the total power output directly via throttle position. The operator can provide the total power output so that the method 600 can determine the operational settings that result in providing the total power output provided by the operator.

At 612, asynchronous operational settings for the vehicle system 100 are determined. For example, similar to 208 of the method 200, the total power outputs can be divided among the propulsion-generating vehicles 104 in the vehicle system 100 at the locations and based on the handling parameters by determining different operational settings for different vehicles 104, 106 at these locations. The total power outputs of the synchronous trip plan may be divided among the propulsion-generating vehicles 104 by designating the same throttle and/or brake settings for each of the propulsion-generating vehicles 104. Using the handling parameters that are determined at the locations along the route 102, the same total power outputs at these locations can be divided among the propulsion-generating vehicles 104 by designating different throttle and/or brake settings for the propulsion-generating vehicles 104.

At 614, a determination is made as to whether one or more of the asynchronous operational settings can be modified to achieve or improve upon a trip objective. For example, similar to 210 of the method 200, if one or more of the asynchronous operational settings can be changed to reduce fuel consumption, emission generation, and/or travel time (relative to not changing the asynchronous operational settings) while avoiding significant decreases in the improvement in vehicle handling (that is achieved by using the asynchronous operational settings), then the asynchronous operational settings may be modified. On the other hand, if changing the asynchronous operational settings would not result in achieving or improving upon a trip objective, then the asynchronous operational settings may not be changed. If the asynchronous operational setting can be modified at one or more locations along the route 102 to achieve or improve upon a trip objective, then flow of the method 600 may proceed to 616. Otherwise, the method 600 may proceed to 614.

At 616, the asynchronous operational settings are modified at one or more locations along the route 102. For example, similar to 212 of the method 200, after determining the asynchronous operational settings and determining that the asynchronous operational settings can be changed to achieve or improve upon a trip objective, the asynchronous operational settings that can be changed are modified. As a result, the modified asynchronous operational settings that are so determined can provide at least the total power output that is dictated by the synchronous trip plan at various locations along the route 102, but also improve upon the handling of the vehicle system 100 relative to the synchronous trip plan and achieve one or more trip objectives relative to the synchronous trip plan.

At 618, the asynchronous operational settings are used to asynchronously control operations of the vehicle system 100. For example, similar to 214 of the method 200, the asynchronous operational settings can be used to autonomously control operations of the propulsion-generating vehicles 104 along the route 102. Alternatively, the asynchronous operational settings can be used to direct an operator to manually control operations of the propulsion-generating vehicles 104 along the route 102 according to the asynchronous operational settings.

In another embodiment, instead of determining the asynchronous operational settings from a synchronous trip plan and/or determining the asynchronous operational settings at the locations associated with larger handling parameters, a trip plan may be created to "optimize" (e.g., improve) the handling of the vehicle system 100 and one or more trip objectives. For example, a trip plan may be created from the trip data, vehicle data, route data, and/or handling parameters, with the trip plan decreasing the handling parameters at locations along the route 102 while also reducing fuel efficiency, reducing the generation of emissions, and/or reducing travel time of the trip, as described herein. For example, the trip plan may be created a single time with the objectives of improving both handling and improving one or more objectives of the trip.

Figure 7:
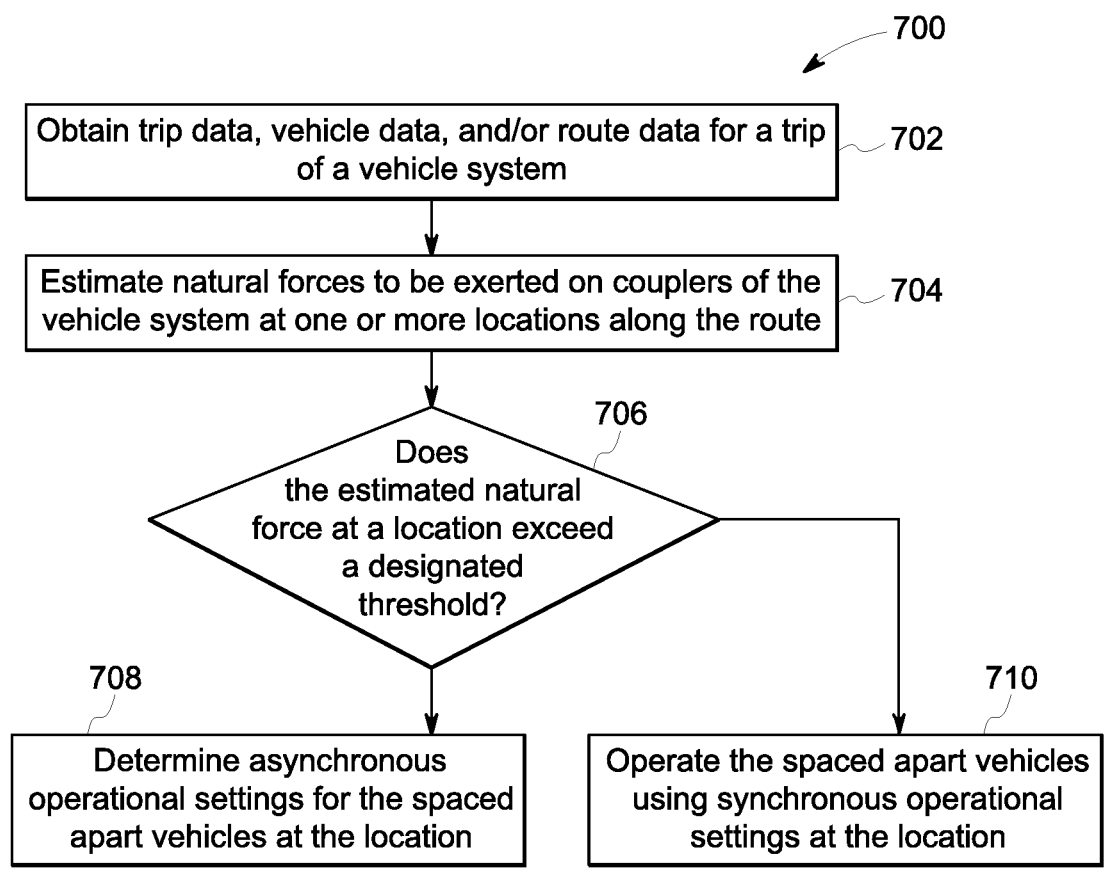
FIG. 7 is a flowchart of another embodiment of a method for operating the vehicle system shown in FIG. 1.

FIG. 7 is a flowchart of another embodiment of a method 700 for operating the vehicle system 100 shown in FIG. 1. The method 700 may be used in conjunction with the vehicle system 100. For example, the method 700 may be used to identify asynchronous operational settings for the vehicle system 100 when no synchronous trip plan is available or is not used to derive the asynchronous operational settings.

At 702, trip data representative of a trip to be traveled or currently being traveled by the vehicle system 100, vehicle data representative of the vehicle system 100, and/or route data representative of the route 102 of the trip are obtained. The data may be obtained from one or more memory devices disposed onboard and/or off-board of the vehicle system 100, such as from a dispatch facility. A trip plan formed from synchronous operational settings for the propulsion-generating vehicles 104 may be created from the trip data, vehicle data, and/or route data, as described above, or received from an off-board source. Alternatively, the route data alone may be obtained at 702.

At 704, natural forces that are to be exerted on the vehicle system 100 during travel along the route 102 during the trip are estimated. The natural forces exerted on the vehicle system 100 may be handling parameters that are used to determine operational settings for the propulsion-generating vehicles 104 and to improve the handling of the vehicle system 100. The natural forces include the forces exerted on the couplers 108 (e.g., as predicted by a rigid rope model of the vehicle system 100 when only the gravitational forces on the vehicle system 100 are considered). These estimated natural forces may be dependent on the terrain and may be independent of the propulsion-generating vehicles 104 (e.g., independent of the tractive efforts generated by the vehicles 104), drag forces, air-brake forces, and/or other operational parameters. The natural forces may be estimated for one or more couplers 108 disposed between propulsion-generating vehicles 104 in the vehicle system 100. In one embodiment, the natural forces are determined for a segment of the vehicle system 100 that includes one or more non-propulsion generating vehicles 106 that are disposed between and that interconnect two or more propulsion-generating vehicles 104. Alternatively or additionally, the natural forces may be determined for the entire vehicle system 100 and/or for multiple segments of the vehicle system 100.

The natural forces exerted on couplers 108 may be estimated using route data that is representative of the route 102 (e.g., curvature and/or grade), and/or vehicle data that is representative of the size (e.g., mass) of the vehicle system 100 and/or a segment of the vehicle system 100:

$$F_{i-1} - F_i = m_i g_i + m_i \dot{v} \qquad \text{(Equation \#15)}$$

where $F_i$ represents the natural force exerted on the $i^{th}$ coupler 108 in the vehicle system 100, $F_{i-1}$ represents the natural force exerted on the $(i-1)^{th}$ coupler 108 in the vehicle system 100, $m_i$ represents the mass of the $i^{th}$ vehicle 104 or 106, $g_i$ represents the mean, average, or effective grade of the route 102 beneath the vehicle system 100, and $\dot{v}$ represents the acceleration of the vehicle system 100. The acceleration ($\dot{v}$) may be the acceleration that is caused by gravitational force and can be represented as:

$$\dot{v} = \frac{\sum_{i=1}^{N} m_i g_i}{\sum_{i=1}^{N} m_i} \qquad \text{(Equation \#16)}$$

As a result, the natural force exerted on the $i^{th}$ coupler 108 may be defined as:

$$F_i = \sum_{j=1}^{i} m_j g_j + m_j \dot{v} \qquad \text{(Equation \#17)}$$

If the natural force is positive at a coupler 108 (e.g., greater than zero), the natural force can indicate that gravity tends to stretch the coupler 108. Conversely, if the natural force is negative at the coupler 108 (e.g., less than zero), the natural force can indicate that gravity tends to compress the coupler 108. The estimated natural forces can be used to determine a differential power (or effort) between the propulsion-generating vehicles 104 on opposite sides of the coupler 108 (but not necessarily directly connected to the coupler 108).

In one embodiment, the natural forces are used to determine a bunching power for the propulsion-generating vehicles 104 that are on opposite sides of the coupler 108. The bunching power can represent the total differential power output with respect to a synchronous power output that is to be generated by these propulsion-generating vehicles 104. For example, the bunching power can represent a total difference between the power output of the vehicles (as calculated using one or more methods described herein) and the power output of the vehicles if the vehicles were using synchronous operational settings. As one example, the bunching power can be expressed as:

$$B = \begin{cases} K(p-n) & \text{if } |p-n| > t \\ 0 & \text{otherwise} \end{cases} \quad \text{(Equation \#18)}$$

where k represents a spring constant of the spring model of the coupler 108, p represents a positive natural force (e.g., the maximum positive natural force) exerted on the coupler 108, n represents an absolute value of a negative natural force (e.g., the maximum absolute negative natural force) exerted on the coupler 108, B represents an estimated bunching effort or power, and t represents a designated threshold.

As a result, if the positive natural force p is larger than the threshold t plus the absolute negative natural force n, then the estimated bunching effort or power B is proportional to the difference between the positive natural force and the absolute value of the negative natural force. If the absolute negative natural force n is larger than the threshold t plus the positive natural force p, then the estimated bunching effort or power B is proportional to the difference between the positive natural force and the absolute value of the negative natural force. Otherwise, the estimated bunching effort or power B is set to zero.

When the natural force on a coupler 108 is larger than the natural compressive force on the coupler 108, the bunching effort B is positive, which can indicate that the vehicle system 100 can be compressed to compensate for the gravity stretching the vehicle system 100. Similarly, when the natural compressive force is larger than the natural stretch force on the coupler 108, the bunching effort B is negative, which can indicate that the vehicle system 100 can be stretched to compensate for the natural forces.

At 706, a determination is made as to whether the estimated natural force on one or more couplers 108 exceeds a designated threshold. For example, the natural force that is estimated to be exerted on a coupler 108 at a location along the route 102 may be compared to a threshold. If the natural force exceeds a designated threshold, then the natural force may be sufficiently large to warrant designating different operational settings (e.g., asynchronous operational settings) for the propulsion-generating vehicles 104 disposed on opposite sides of the coupler 108 to compensate for the natural force. Such relatively large natural forces may decrease handling of the vehicle system 100 and may be undesirable for the control of the vehicle system 100. If the estimated natural force indicates that the coupler 108 may experience a relatively large tensile force at a location along the route 102, then the operational settings of the propulsion-generating vehicles 104 may be designated to compress the coupler 108. Alternatively, if the estimated natural force indicates that the coupler 108 may experience a relatively large compressive force at a location along the route 102, then the operational settings of the propulsion-generating vehicles 104 may be designated to stretch the coupler 108. As a result, flow of the method 700 may proceed to 708.

On the other hand, if the estimated natural force does not exceed the threshold, then the natural force may not be sufficiently large to warrant designating asynchronous operational settings for the propulsion-generating vehicles 104 disposed on opposite sides of the coupler 108 to compensate for the natural force. For example, if the estimated natural force indicates that the coupler 108 may experience a relatively small tensile or compressive force, then the natural force may not significantly impact the handling of the vehicle system 100 in a negative or undesirable manner. As a result, flow of the method 700 may proceed to 710.

At 708, asynchronous operational settings for the propulsion-generating vehicles 104 disposed on opposite sides of the coupler 108 are determined. The asynchronous operational settings may be based on the bunching effort or horsepower. For example, the asynchronous operational settings may be determined so that the total (e.g., aggregate) power output that is to be generated by the propulsion-generating vehicles 104 on opposite sides of the coupler 108 is the bunching effort or horsepower. The bunching effort or horsepower may be the effort (B) determined above using Equation #18 or another effort or horsepower that reduces the estimated natural force on the coupler 108. The asynchronous operational settings may be used to control operations of the propulsion-generating vehicles 104, such as by automatically implementing the asynchronous operational settings or by directing an operator of the vehicle system 100 to manually implement the asynchronous operational settings at the location associated with the estimated natural force on the coupler 108.

At 710, the propulsion-generating vehicles 104 disposed on opposite sides of the coupler 108 for which the natural force is estimated are controlled using synchronous (e.g., the same) operational setting, such as the same throttle settings. For example, because the estimated natural force may be relatively small, the synchronous operational settings of a trip plan may be used for the propulsion-generating vehicles 104 instead of changing the operational settings to asynchronous operational settings.

Figure 8:
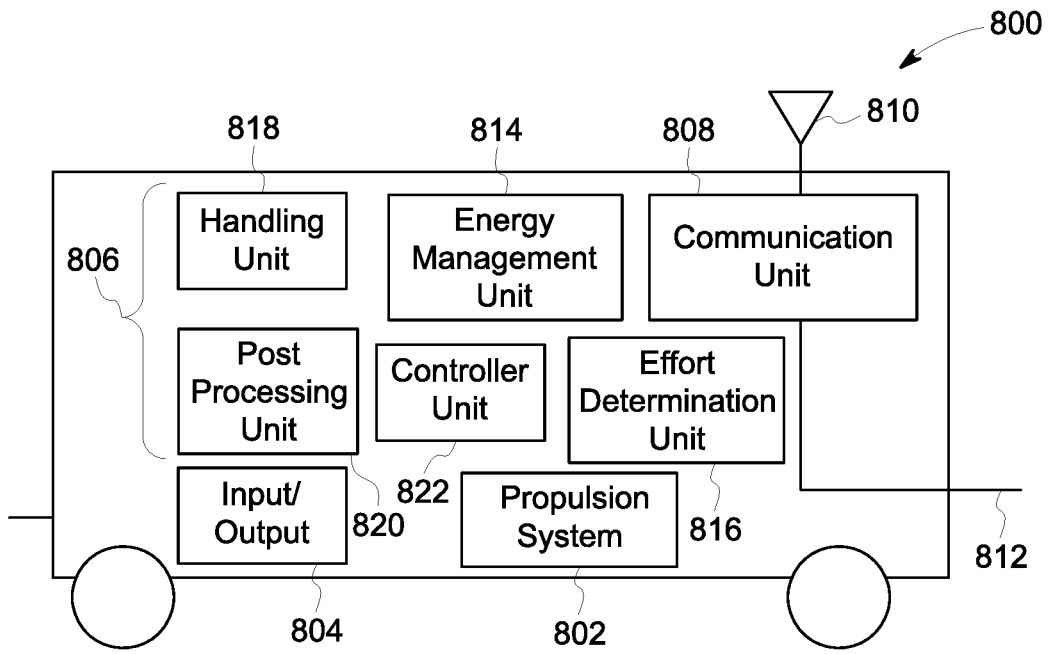
FIG. 8 is a schematic diagram of one embodiment of a propulsion-generating vehicle.

FIG. 8 is a schematic diagram of one embodiment of a propulsion-generating vehicle 800. The propulsion-generating vehicle 800 may represent one or more of the propulsion-generating vehicles 104 shown in FIG. 1. The propulsion-generating vehicle 800 includes a propulsion system 802, which can include one or more engines, motors, brakes, batteries, cooling systems (e.g., radiators, fans, etc.), and the like, that operate to generate power output to propel the vehicle 800. One or more input and/or output devices 804 ("Input/Output 804" in FIG. 8), such as keyboards, throttles, switches, buttons, pedals, microphones, speakers, displays, and the like, may be used by an operator to provide input and/or monitor output of one or more systems of the vehicle 800.

The propulsion-generating vehicle 800 includes an onboard control system 806 that controls operations of the propulsion-generating vehicle 800. For example, the control system 806 may determine the asynchronous operational settings for the vehicle 800 and at least one other propulsion-generating vehicle in the same vehicle system. Alternatively, the control system 806 may entirely or partially be disposed off-board the vehicle 800, such as at a dispatch facility or other facility. The vehicle system 100 (shown in FIG. 1) that may include the propulsion-generating vehicle 800 may include only a single vehicle 800 having the control system 806 that receives or determines the asynchronous operational settings described herein. Alternatively, the vehicle system 100 may have multiple vehicles 800 with the control systems 806 that receive or determine the asynchronous operational settings.

Other propulsion-generating vehicles in the vehicle system 100 may be controlled based on the asynchronous operational settings that are communicated from the propulsion-generating vehicle 800 that has the control system 806 to control the operations of the other propulsion-generating vehicles. Alternatively, several propulsion-generating vehicles 800 in the vehicle system 100 may include the control systems 806 and assigned priorities among the control systems 806 may be used to determine which control system 806 controls operations of the propulsion-generating vehicles 800.

The control system 806 is communicatively coupled with a communication unit 808. The communication unit 808 communicates with one or more off-board locations, such as another vehicle (e.g., another propulsion-generating vehicle in the same vehicle system 100, a dispatch facility, another vehicle system, or the like). The communication unit 808 can communicate via wired and/or wireless connections (e.g., via radio frequency). The communication unit 808 can include a wireless antenna 810 and associated circuitry and software to communicate wirelessly. Additionally or alternatively, the communication unit 808 may be connected with a wired connection 812, such as one or more buses, cables, and the like, that connect the communication unit 808 with another vehicle in the vehicle system or consist (e.g., a trainline, multiple unit cable, electronically controlled pneumatic brake line, or the like). The communication unit 808 can be used to communicate (e.g., transmit and/or receive) a variety of information described herein. For example, the communication unit 808 can receive the trip plan having synchronous operational settings, trip data, route data, vehicle data, operational settings from another propulsion-generating vehicle 800 and/or another control unit 806, and/or other information that is used to determine the handling parameters and asynchronous operational settings described herein. The communication unit 808 can transmit asynchronous operational settings, such as the asynchronous operational settings determined by the control system 806 and/or received from an off-board source, to one or more other propulsion-generating vehicles in the vehicle system 100. These transmitted asynchronous operational settings are used to direct the operations of the other propulsion-generating vehicles.

The control system 806 includes units that perform various operations. The control system 806 and one or more of the units may represent a hardware and/or software system that operates to perform one or more functions described herein. For example, the control system 806 and/or the illustrated units may include one or more computer processor(s), controller(s), or other logic-based device(s) that perform operations based on instructions stored on a tangible and non-transitory computer readable storage medium. Alternatively, the control system 806 and/or the units may include one or more hard-wired devices that perform operations based on hard-wired logic of the devices. The control system 806 and/or the units shown in FIG. 8 may represent the hardware that operates based on software or hardwired instructions, the software that directs hardware to perform the operations, or a combination thereof.

In the illustrated embodiment, the control system 806 includes an energy management unit 814 that receives input to create a trip plan. For example, the energy management unit 814 may receive trip data, vehicle data, and/or route data to create a trip plan having synchronous operational settings. As described above, such a trip plan may be used to determine asynchronous operational settings to improve the handling of the vehicle system 100 and/or to identify locations of interest along the route 102 where the asynchronous operational settings are to be determined to improve handling. Additionally or alternatively, the energy management unit 814 may create the trip plan with asynchronous operational settings, and may do so by attempting to reduce one or more of the handling parameters while also reducing the fuel consumed by the vehicle system 100, the emissions generated by the vehicle system 100, and/or the travel time to complete the trip. For example, the energy management unit 814 may determine the asynchronous operational settings for the propulsion-generating vehicles 104, 800 of the vehicle system 100 at one or more locations along the route 102 to reduce the handling parameters, fuel consumed, emissions generated, and/or travel time relative to another trip plan for the same trip and same vehicle system 100 that includes synchronous operational settings at one or more of the locations. Optionally, the energy management unit 814 that determines the synchronous and/or asynchronous trip plan may be disposed off-board of the vehicle 800 and may communicate the trip plan to the control system 806.

An effort determination unit 816 examines the trip plan to determine the total power output demanded from the propulsion-generating vehicles 104, 800 in the vehicle system 100 by the trip plan at one or more locations along the route 102. For example, the effort determination unit 816 can identify the estimated or anticipated power outputs of each of the propulsion-generating vehicles based on the designated operational settings (e.g., throttle notch positions) in the trip plan and then sum these power outputs to determine the total power output to be provided by the vehicle system 100.

A handling unit 818 calculates one or more handling parameters described above. The handling unit 818 can estimate the values of the handling parameters at one or more locations along the route 102, as described above. The handling unit 818 can determine these handling parameters using the operational settings designated by the trip plan, also as described above. In one aspect, the handling unit 818 can determine the handling parameters when different sets of asynchronous brake settings are used to determine which set of asynchronous brake settings reduce the handling parameters, as described herein.

A post processing unit 820 determines the asynchronous operational settings (e.g., asynchronous throttle settings, asynchronous brake settings, etc.) for two or more of the propulsion-generating vehicles in the vehicle system. For example, the post processing unit 820 can examine the total power outputs derived from the trip plan by the effort determination unit 816 and the handling parameters estimated by the handling unit 818. The post processing unit 820 may then determine asynchronous operational settings that improve handling of the vehicle system 100 (e.g., by reducing one or more of the handling parameters) while providing the total power outputs of the vehicle system 100, as described above. The post processing unit 820 may optionally determine if the asynchronous operational settings can be modified to achieve or improve upon one or more trip objectives, such as handling parameters, fuel consumption, travel time, emissions generation, and the like.

A controller unit 822 forms instructions that are based on the asynchronous operational settings to control movement of the propulsion-generating vehicle 800 and/or one or more other propulsion-generating vehicles in the vehicle system 100. For example, the controller unit 822 can create one or more data signals or packets that represent the asynchronous operational settings determined by the post processing unit 820. These instructions may be communicated to the propulsion system 802 of the vehicle 800 and/or to similar propulsion systems of other propulsion-generating vehicles in the same vehicle system 100 to autonomously control movements of the propulsion-generating vehicles. The propulsion systems that receive the instructions may automatically implement the throttle and/or brake settings dictated by the asynchronous operational settings. Optionally, the instructions may be communicated to the one or more output devices 804 of the vehicle 800 and/or one or more similar output devices on other propulsion-generating vehicles in the vehicle system 100 to direct one or more operators on how to manually change throttle and/or brake settings of the propulsion-generating vehicles according to the asynchronous operational settings.

In one embodiment, the controller unit 822 may determine the actual speed of the propulsion-generating vehicle 800 and/or one or more other propulsion-generating vehicles in the vehicle system 100. For example, the controller unit 822 may receive or measure data from the propulsion system 802 that represents the actual speed of the propulsion-generating vehicle 800. This data may be obtained from a speed sensor that is included in the propulsion system 802. Additionally or alternatively, the controller unit 822 may receive similar data from other propulsion-generating vehicles in the vehicle system 100.

The controller unit 822 can compare the actual speed of the propulsion-generating vehicle 800, the other propulsion-generating vehicles, and/or the vehicle system 100 (e.g., which may be represented by the actual speeds of one or more of the propulsion-generating vehicles) to a speed that is designated by a trip plan (e.g., a synchronous or asynchronous trip plan). If the actual speed differs from the designated speed, the controller unit 822 may identify a change in throttle settings and/or brake settings for one or more of the propulsion-generating vehicles in the vehicle system 100 that can be used to reduce or eliminate the difference between the actual and designated speeds. The controller unit 822 may direct (e.g., by transmitting instructions) to one or more of the propulsion-generating vehicles to change the respective throttle settings and/or brake settings to reduce or eliminate the difference between the actual and designated speeds. The controller unit 822 may also determine a corresponding change in the throttle settings and/or brake settings of one or more other propulsion-generating vehicles to maintain improved handling of the vehicle system 100. For example, if a group bunching effort is being maintained between two or more propulsion-generating vehicles or consists of propulsion-generating vehicles, then a change in the throttle settings of one vehicle or consist to cause the actual speed to match the designated speed may require a change in the throttle settings of another vehicle or consist to maintain the group bunching effort. The controller unit 822 can identify this change in the settings of the other vehicle or consist and communicate the change to the other vehicle or consist for implementation.

Although connections between the components in FIG. 8 are not shown, two or more (or all) of the illustrated components may be connected by one or more wired and/or wireless connections, such as cables, busses, wires, wireless networks, and the like.

In one embodiment, a method (e.g., for determining operational settings for a vehicle system having multiple vehicles connected with each other by couplers to travel along a route) includes identifying total power outputs to be provided by propulsion-generating vehicles of the vehicles in the vehicle system. The total power outputs are determined for different locations of the vehicle system along the route. The method also includes calculating handling parameters of the vehicle system at one or more of the different locations along the route. The handling parameters are representative of at least one of forces exerted the couplers, energies stored in the couplers, relative velocities of neighboring vehicles of the vehicles in the vehicle system, or natural forces exerted on one or more segments of the vehicle system between two or more of the propulsion-generating vehicles. The method also includes determining asynchronous operational settings for the propulsion-generating vehicles at the different locations along the route. The asynchronous operational settings represent different operational settings for the propulsion-generating vehicles that cause the propulsion-generating vehicles to provide at least the total power outputs at the respective different locations while changing the handling parameters of the vehicle system to one or more designated values at the different locations along the route. The method further includes communicating the asynchronous operational settings to the propulsion-generating vehicles to cause the propulsion-generating vehicles to implement the asynchronous operational settings at the different locations.

In another aspect, the asynchronous operational settings are determined by identifying the different operational settings for the propulsion-generating vehicles that reduce the handling parameters relative to different handling parameters associated with using synchronous operational settings for the propulsion-generating vehicles at the respective different locations to provide the total power outputs at the respective different locations.

In another aspect, the handling parameters include coupler parameters representative of at least one of the forces exerted on the couplers or the energies stored in the couplers.

In another aspect, the handling parameters include terrain excitation parameters representative of at least one of grades of the route at the respective different locations, masses of one or more of the vehicles in the vehicle system at the respective different locations, or tractive efforts provided by one or more of the propulsion-generating vehicles at the respective different locations.

In another aspect, identifying one or more nodes in the vehicle system, the one or more nodes representative of an estimated force exerted on a coupler that has an absolute value that is less than a designated threshold. The handling parameters include node parameters representative of at least one of a number of the nodes in the vehicle system or a rate of movement of the nodes in the vehicle system.

In another aspect, the handling parameters include neighboring velocity parameters representative of the relative velocities of neighboring vehicles of the vehicles in the vehicle system and determined by identifying estimated differences in estimated speed between the neighboring vehicles in the vehicle system.

In another aspect, the method includes modifying the asynchronous operational settings to reduce at least one of an amount of fuel to be consumed by the vehicle system, an amount of emissions to be generated by the vehicle system, or a travel time of the vehicle system for the trip while maintaining a resulting increase in the handling parameters below a designated threshold.

In another aspect, the handling parameters include the natural forces that are representative of one or more tensile or compressive forces exerted on the one or more segments of the vehicle system from a gravitational force.

In another aspect, the total power outputs to be provided by propulsion-generating vehicles are identified from a synchronous trip plan that designates synchronous operational settings for the propulsion-generating vehicles at the locations. When the vehicle system travels along the route according to the synchronous trip plan causes the vehicle system to reduce at least one of fuel consumed, emissions generated, or travel time relative to another, different trip plan that designates one or more other, different synchronous operational settings.

In another aspect, the method also includes at least one of autonomously implementing the asynchronous operational settings at the different locations or communicating the asynchronous operational settings for the vehicle system at one or more of a current location or an upcoming location to an operator of the vehicle system for the operator to manually implement the asynchronous operational settings.

In another aspect, the method also includes modifying the one or more designated values to which the handling parameters are changed based on at least one of a terrain of the route, a mass distribution of the vehicle system, a type of the vehicle system, or a type of the couplers in the vehicle system.

In one embodiment, a system (e.g., a control system for a vehicle system) includes an effort determination unit configured to identify total power outputs to be provided by a vehicle system that includes multiple vehicles connected with each other by couplers to travel along a route. The effort determination unit also is configured to identify the total power outputs to be provided by propulsion-generating vehicles of the vehicles in the vehicle system at different locations of the vehicle system along the route. The system includes a handling unit configured to calculate handling parameters of the vehicle system at one or more of the different locations along the route. The handling parameters are representative of at least one of forces exerted the couplers, energies stored in the couplers, relative velocities of neighboring vehicles of the vehicles in the vehicle system, or natural forces exerted on one or more segments of the vehicle system between two or more of the propulsion-generating vehicles. The system includes a processing unit configured to determine asynchronous operational settings for the propulsion-generating vehicles at the different locations along the route. The asynchronous operational settings represent different operational settings for the propulsion-generating vehicles that cause the propulsion-generating vehicles to provide at least the total power outputs at the respective different locations while changing the handling parameters of the vehicle system to one or more designated values at the different locations along the route. The asynchronous operational settings are configured to be communicated to the propulsion-generating vehicles to cause the propulsion-generating vehicles to implement the asynchronous operational settings at the different locations.

In another aspect, the processing unit is configured to identify the different operational settings for the propulsion-generating vehicles that reduce the handling parameters relative to different handling parameters associated with using synchronous operational settings for the propulsion-generating vehicles at the respective different locations to provide the total power outputs at the respective different locations.

In another aspect, the handling parameters include coupler parameters representative of at least one of the forces exerted on the couplers or the energies stored in the couplers.

In another aspect, the handling parameters include terrain excitation parameters based on at least one of grades of the route at the respective different locations, masses of one or more of the vehicles in the vehicle system at the respective different locations, or tractive efforts provided by one or more of the propulsion-generating vehicles at the respective different locations.

In another aspect, the handling unit is configured to identify one or more nodes in the vehicle system. The one or more nodes are representative of an estimated force exerted on a coupler that has an absolute value that is less than a designated threshold. The handling parameters include node parameters representative of at least one of a number of the nodes in the vehicle system or a rate of movement of the nodes in the vehicle system.

In another aspect, the handling parameters include neighboring velocity parameters representative of the relative velocities of neighboring vehicles of the vehicles in the vehicle system and determined by identifying estimated differences in estimated speed between the neighboring vehicles in the vehicle system.

In another aspect, the processing unit is configured to modify the asynchronous operational settings to reduce at least one of an amount of fuel to be consumed by the vehicle system, an amount of emissions to be generated by the vehicle system, or a travel time of the vehicle system for the trip while maintaining a resulting increase in the handling parameters below a designated threshold.

In one embodiment, a method (e.g., for determining operational settings for a vehicle system having two or more propulsion-generating vehicles coupled with each other by one or more non-propulsion generating vehicles) includes obtaining route data and vehicle data. The route data is representative of one or more grades of a route at one or more locations along the route that is to be traveled by the vehicle system. The vehicle data is representative of a size of the one or more non-propulsion generating vehicles disposed between the propulsion-generating vehicles. The method also includes calculating one or more estimated natural forces that are to be exerted on couplers connected with the one or more non-propulsion generating vehicles of the vehicle system at the one or more locations along the route. The one or more estimated natural forces are based on the size of the one or more non-propulsion generating vehicles and the one or more grades of the route at the one or more locations along the route. The method also includes determining asynchronous operational settings to be implemented by the two or more propulsion-generating vehicles at the one or more locations along the route. Implementing the asynchronous operational settings by the two or more propulsion-generating vehicles reduces one or more actual natural forces that are actually exerted on the couplers to forces that are smaller than the one or more estimated natural forces when the vehicle system travels over the one or more locations along the route.

In another aspect, when the one or more estimated natural forces are tensile forces, the asynchronous operational settings instruct the two or more propulsion-generating vehicles to implement at least one of different throttle settings or different brake settings to compress the couplers connected with the non-propulsion generating vehicles.

In another aspect, when the one or more estimated natural forces are compressive forces, the asynchronous operational settings instruct the two or more propulsion-generating vehicles to implement at least one of different throttle settings or different brake settings to stretch the couplers connected with the non-propulsion generating vehicles.

In one embodiment, a method (e.g., for determining operational settings of a vehicle system) includes obtaining route data and vehicle data. The route data is representative of one or more grades of a route at one or more locations along the route that is to be traveled by a vehicle system having two or more propulsion-generating vehicles coupled with each other by one or more non-propulsion generating vehicles. The vehicle data is representative of a size of the one or more non-propulsion generating vehicles disposed between the propulsion-generating vehicles. The method also includes calculating handling parameters of the vehicle system at one or more different locations along the route based on the route data and the vehicle data. The handling parameters are representative of at least one of forces expected to be exerted the couplers, energies expected to be stored in the couplers, expected relative velocities of neighboring vehicles of the vehicles in the vehicle system, or expected natural forces exerted on one or more segments of the vehicle system between two or more of the propulsion-generating vehicles. The method further includes determining asynchronous operational settings to be implemented by the two or more propulsion-generating vehicles at the one or more locations along the route based on the handling parameters. The asynchronous operational settings are determined by identifying a combination of the asynchronous operational settings at the different locations along the route that result in the handling parameters being decreased to one or more designated limits.

Additional inventive subject matter described herein relates to ways of determining the asynchronous operational settings described above for a current or upcoming trip of a vehicle system. Specifically, methods of computing power and/or brake settings (also called notches) to propulsion-generating vehicles in the vehicle system to obtain improved train handling (relative to operating the vehicle system in another manner) are disclosed. In one aspect, the vehicle system is operated as a distributed power (DP) vehicle system. The vehicle system includes propulsion-generating vehicles placed at different locations in the vehicle system, and operating these propulsion-generating vehicles using different operational settings (e.g., different notches) at the same time. As described above, the propulsion-generating vehicles can be divided into groups in the vehicle system. In one example, these groups may be identified by placing one or more virtual "fences" between the different groups of propulsion-generating vehicles. A fence can be used to demarcate different groups of propulsion-generating vehicles, which can be referred to as consists. The propulsion-generating vehicles in the different groups are allowed (but not required) to have different operational settings (e.g., notches). For example, the vehicles in the same group can have the same operational setting, or notch, at a given time.

In one embodiment, the system and method described herein uses model predictive control (MPC) to determine the time and/or location along a route being traveled by the vehicle system to change which vehicles are included in the different groups to improve handling parameters of the vehicle system while satisfying other constraints (e.g., limitations on the frequency of changes in which vehicles are in which groups, bunching horsepower at the time of movement, and the like). MPC can include calculating or estimating handling parameters for the vehicle system at different locations and/or times along a route for an upcoming portion of a trip. These handling parameters may be calculated or estimated multiple times for the same location of the vehicle system and/or time along the trip, with different handling parameters calculated for different vehicle groups and/or fence positions. The handling parameters are predicted for an upcoming trip (e.g., prior to the vehicle system beginning to move for the trip) and/or for an upcoming segment of the trip (e.g., while the vehicle system is moving during the trip). Different sequences of changes to the vehicle groups and/or fence positions may be examined and compared with each other to identify the sequence or sequences that improve (e.g., increase or reduce, as appropriate) the handling parameters the most, more than one or more other sequences (but not necessarily all other sequences), or by at least a designated threshold amount.

In another embodiment, the times and/or locations where changes in which vehicles are included in which groups (also referred to as movement points or change points) can be found by examining an entire planned trip of the vehicle system. Alternatively, other techniques can be used.

In another embodiment, the movement points or change points are determined by using a "categorize and merge" technique. In this technique, each movement point is categorized as either TBD (e.g., the fence position can be in any location in the vehicle system or the vehicles may be in any group) or a selected position (e.g., a specific fence position in the vehicle system or the vehicles are in specific groups). The category TBD is selected when the group assignments of the vehicles do not differ significantly from each other in benefit. Otherwise, the group assignments of the vehicles with the most significant benefit, or that has a more significant benefit than one or more other groups of the vehicles, is selected. Then, an iterative searching technique is used to merge or split TBD segments into selected group assignments of the vehicles to satisfy the constraints. As used herein, the term "group assignments" refers to a state of the vehicles, such as an identification of which vehicles are included in which groups at a given or selected time.

The subject matter described herein solves a problem of ensuring improved automatic handling of the vehicle system in several manners, including by making use of asynchronous distributed power operation (e.g., by allowing different propulsion-generating vehicles in a vehicle system to have different power settings). Additionally, the subject matter changes which vehicles are included in which groups within the vehicle system to further improve train handling. The change in which vehicles are included in which groups can be performed by moving locations of the virtual fences. While some vehicle systems have been using empirical "rules of thumb" and heuristics to control vehicle systems and keep the vehicle systems bunched so that slack action in the vehicle system does not run out, these rules usually lack physical or mathematical justification. Moreover, these rules rapidly become complicated to use for a human operator (even more so if the number of groups or fences increases), who must control speed, brakes, and other variables in addition to modulating multiple notches to obtain acceptable handling of the vehicle system. Additionally, it can be difficult for an operator to determine deviations from a synchronous plan, based on the distribution of weight in the vehicle system, terrain properties, and speed.

Figure 9:
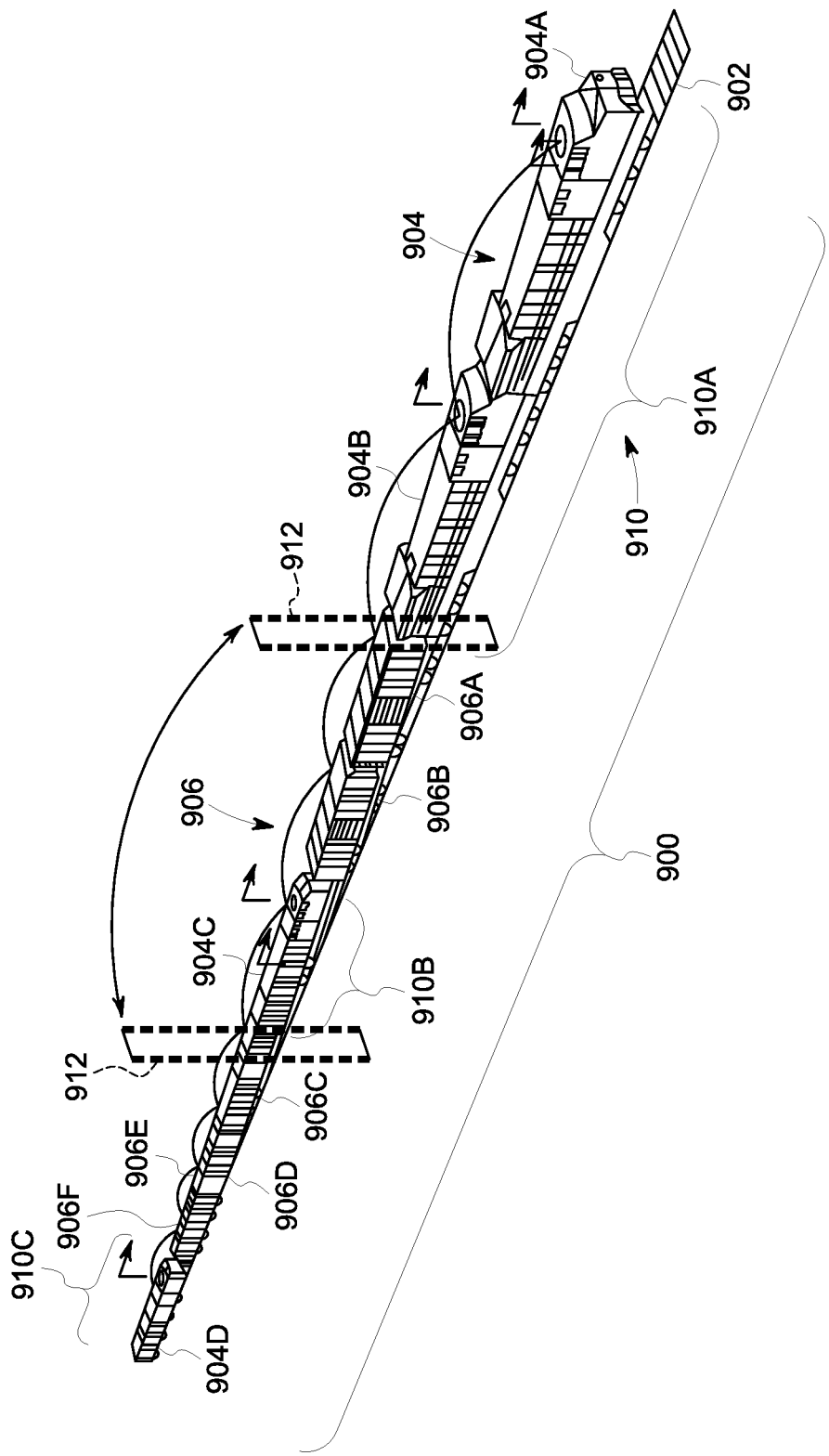
FIG. 9 is a schematic illustration of another embodiment of a vehicle system.

FIG. 9 is a schematic illustration of another embodiment of a vehicle system 900. The vehicle system 900 can include several vehicles 904, 906 that are mechanically and/or logically connected with each other to travel along a route 902. Alternatively, the vehicle system 900 may include a single vehicle. As described above, the vehicle system may include a single combined vehicle or multiple combined vehicles, where a combined vehicle is a combination of a propulsion-generating vehicle and a non-propulsion-generating vehicle. The vehicles 904 (e.g., the vehicles 904A-D) represent propulsion-generating vehicles, such as vehicles that generate tractive effort or power to propel the vehicle system along the route 902. In an embodiment, the propulsion-generating vehicles can represent rail vehicles such as locomotives, but alternatively can represent another type of vehicle. The vehicles 906 (e.g., the vehicles 906A-F) represent non-propulsion generating vehicles, such as vehicles that do not generate tractive effort or power. In an embodiment, the non-propulsion generating vehicles can represent rail cars or another type of vehicle. The route can be a body, surface, or medium on which the vehicle system travels, such as a track formed from one or more rails, or another type of route. The number and arrangement of the vehicles 904, 906 is provided as one example, and other numbers and/or arrangements of the propulsion-generating vehicles and/or the non-propulsion generating vehicles may be used.

The vehicle system can include several vehicle consists 910 (e.g., consists 910A-C) formed from one or more propulsion-generating vehicles. Alternatively, the vehicle system can include a single vehicle consist. In the illustrated example, a lead consist 910A includes the propulsion-generating vehicles 904A, 904B, a middle consist 910B includes the propulsion-generating vehicle 904C, and a remote consist 910C includes the propulsion-generating vehicle 904D. Optionally, a larger or fewer number of propulsion-generating vehicles may be included in one or more of the consists and/or a larger or fewer number of consists may be included in the vehicle system. The consists may be separated from each other by one or more non-propulsion generating vehicles.

A virtual fence 912 is shown in different locations in the vehicle system in FIG. 9. In a first position, the virtual fence is between the lead consist and the middle consist. In a different, second position, the virtual fence is between the middle consist and the remote consist. The fence can move between these or other locations in the vehicle system as the vehicle system travels along the route. As the fence is moved, the propulsion-generating vehicles and/or the non-propulsion-generating vehicles can be included in (e.g., assigned to) different groups, with the vehicles in the same group using the same operational settings, such as the same throttle notch settings, same brake settings, or the like. For example, in a group of propulsion-generating vehicles, the propulsion-generating vehicles may use the same throttle notch settings. In a group of non-propulsion-generating vehicles and/or propulsion-generating vehicles, the same brake settings may be used. Different vehicles may be assigned to different groups without physically moving or changing the relative positions of the vehicles in the vehicle system. For example, a single virtual fence 912 may change positions between the two positions shown in FIG. 9. Without moving any vehicle in the vehicle system, different vehicles may be assigned to different groups. For example, when the fence 912 is between the vehicles 904B and 906A, then the vehicles 904A, 904B can be assigned to one group while the vehicles 904C, 904D are assigned to a different group. Moving the fence 912 to another position (e.g., between the vehicles 904C and 906C can cause the vehicles 904A, 904B, and 904C to be assigned to one group and the vehicle 904D to be assigned to a different group without changing the location or order of the vehicles 904A-E within the vehicle system 100.

The fence can move between the positions of consists, and not the positions of the propulsion-generating vehicles within a consist, and the propulsion-generating vehicles on opposite sides of the fence can operate using different control signals. When the fence moves from time to time, the configuration of the groups changes, which can result in the change of the tractive effort generated along the length of the vehicle system, as well as the forces within the vehicle system.

While only a single fence is shown in FIG. 9, alternatively, the vehicle system may operate using plural different fences. The description herein should not be construed to be limited to using only a single fence. Plural different fences may be used. Optionally, the vehicle system may operate using different numbers of fences at different times and/or locations along the route. The number of permitted fences or their possible locations may be referred to as a fence restriction or a group assignment restriction, and can indicate how many fences and/or vehicle groups are allowed at an associated time and/or location along the route or where they may be placed (e.g., inter- and/or intra-consist). The number of permitted fences and/or vehicle groups may be change as a function of time, location, and/or operator input. For example, different numbers of fences and/or vehicle groupings may be permitted at different times during a trip, at different locations along a route, and/or as selected by an operator of the vehicle system. For example, during a first time period and/or during movement over a first segment of the route, the vehicle system may operate using a single fence, during a different, second time period and/or during movement over a different, second segment of the route, the vehicle system may operate using two or more fences. Alternatively, the vehicle system may not use any virtual fences, but instead may operate by associating the propulsion-generating vehicles with different groups at different times and/or locations along the route.

For example, when the fence is located at a lead-middle position (e.g., between the lead consist and the middle consist), the middle and remote consists are grouped together and operate using the same control signals. The propulsion-generating vehicles 904C, 904D may then use the same throttle notch settings as each other, while the propulsion-generating vehicles 904A, 904B can use the same throttle notch settings as each other. But, the throttle notch settings of the propulsion-generating vehicles 904C, 904D may be different from the throttle notch settings of the propulsion-generating vehicles 904A, 904B. When the fence is located at a middle-remote position (e.g., between the middle consist and the remote consist), the lead and middle consists are grouped together and operate at the same control signals. As a result, the propulsion-generating vehicles 904A-C can then use the same throttle notch settings as each other, while the propulsion-generating vehicle 904D can use the same or a different throttle notch setting.

A trip plan for the vehicle system can be created to designate operational settings of the propulsion-generating vehicles as a function of time and/or distance along the route. For example, the trip plan can designate speeds of the vehicle system as a function of one or more of time and/or distance along the route. This trip plan may include or be associated with command profiles that designate operational settings of the propulsion-generating vehicles. For example, the command profiles can dictate the throttle notch positions or other settings of the propulsion-generating vehicles as a function of time and/or distance along the route. The trip plan may include or be associated with change indices that dictate locations of the vehicle system along the route and/or times at which the groups in which the propulsion-generating vehicles are included changes. Optionally, the trip plan may include or be associated with change indices that dictate positions of the fence in the vehicle system at different locations along the route and/or times at which the position of the fence is to change.

The command profiles and/or change indices may be created by considering handling parameters of the vehicle system, such as in-system forces (e.g., coupler forces, or the like) or other handling parameters described above. Controlling these handling parameters (e.g., keeping the parameters within designated limits) contributes to safe running of the vehicle system and to limiting maintenance cost. For example, the larger the in-system forces are, the more likely it is that couplers between the vehicles frequently experience fatigue. The fatigue has a large impact of the life of a coupler, and the break of a coupler will cause safety concerns and increased cost of maintenance.

The command profiles and change indices may be created by modeling the vehicle system as a "rope model," which considers the vehicle system as a cascade of connected mass points, with each connection between vehicles being modeled as a rigid connection without any dynamic action of the connection. This model is based on information about the make-up of the vehicle system and the positions of the vehicles in the vehicle system, so that the model can be used to estimate the handling parameters. Optionally, another model may be used, such as a lumped mass model, a dynamic model, or another model.

By changing which vehicles are included in the different groups and/or moving the fence during the trip, the handling parameters are further addressed with the freedom to change the group assignments of the vehicles. The handling parameters are expected to improve relative to not changing which vehicles are included in which groups and/or relative to not moving the fence, especially in terrain where the grade changes. For example, when the vehicle system is crossing a hill, the groups of the vehicles can change and/or the fence can be moved to dictate which vehicles use the same settings so that, after the lead consist passes the top of the hill, the lead consist can begin braking and motoring may be applied in the remote consist. After the middle consist passes the top of the hill, a braking signal can be applied to the middle consist while still providing a motoring signal to the remote consist.

Figure 10:
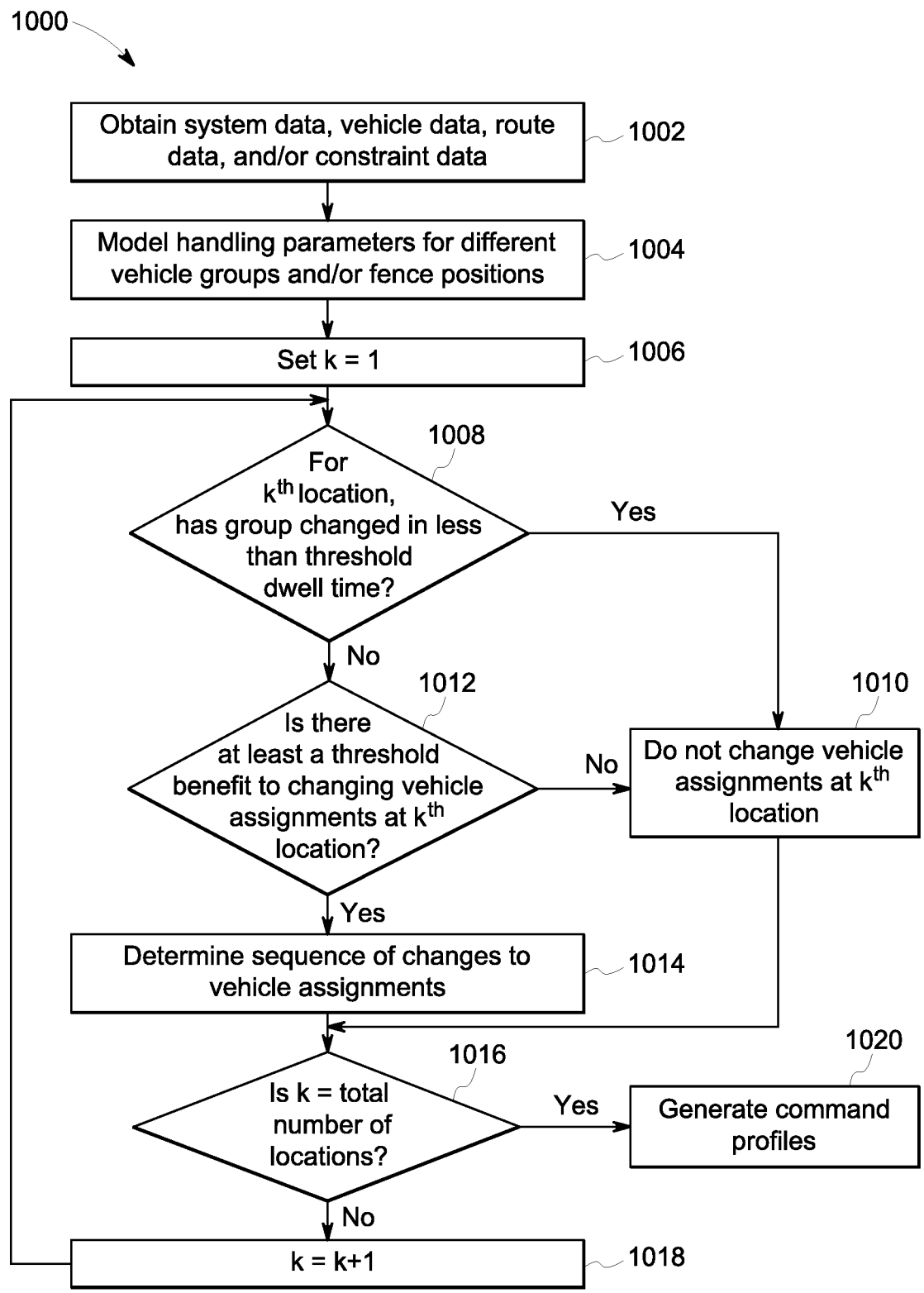
FIG. 10 illustrates a flowchart of a method for determining command profiles and/or change indices that dynamically change group assignments of the vehicles and/or fence positions in the vehicle systems shown herein according to one embodiment.

FIG. 10 illustrates a flowchart of a method 1000 for determining command profiles and/or change indices that dynamically change group assignments of the vehicles and/or fence positions in the vehicle systems shown herein according to one embodiment. The method 1000 can be used to generate command profiles and/or change indices for use in controlling operations of the vehicle system.

At 1002, data used to determine command profiles are obtained. This data can include system data, which represents characteristics of the vehicle system. For example, the system data can include a size of the vehicle system (e.g., length, mass, weight, etc.), an arrangement or locations of the propulsion-generating vehicles and/or non-propulsion-generating vehicles in the vehicle system (e.g., where the vehicles are located in the vehicle system), or the like. The data that is obtained may include vehicle data, which represents characteristics of the vehicles. For example, the vehicle data can include the horsepower (HP) that the vehicles can produce, the braking efforts that the vehicles can produce, and the like. The data that is obtained may include route data, such as the layout of the route that is to be traveled upon. The layout of the route can include grades, curvatures, and the like, of the route.

The data that is obtained can include constraint data, such as information representative of limitations on how the vehicle system is controlled. These limitations can include restrictions on how often or frequently the group assignments of the vehicles are changed, how often of frequently the fence is moved within the vehicle system, limitations on how many throttle notch positions and/or brake settings the vehicles can use, limitations on how large of a change between notch positions or settings and/or brake settings can be used, limitations on how many fences can be used to assign the vehicles to different groups, or the like.

For example, the notch setting represents the tractive effort that each vehicle 104 can produce. In rail vehicles, the notch setting may extend from −8 to 8, where −8 represents maximum braking effort and 8 represent the maximum motoring effort. These notch settings may be limited to values of −8 to 8. Also, the notch command, or control sign, may not be allowed to change simultaneously. The notch command may be permitted to only change a single notch (e.g., from −8 to −7) in a designated time period (e.g., three seconds). Other data that may be obtained can include a trip plan that designates operational settings of the vehicle system as a function of time and/or distance along the route. As described herein, this trip plan can dictate speeds or other settings of the vehicle system as a function of time and/or distance.

Additional constraints can include fuel consumption limits, where certain operational settings are not permitted for one or more propulsion-generating vehicles as these settings could cause the vehicles to consume more fuel or to consume fuel at a greater rate than desired. For example, a propulsion-generating vehicle may not be permitted to be assigned a notch setting that would cause the vehicle to consume more fuel than the vehicle is carrying and/or consume fuel at a such a rate that the vehicle will not have sufficient fuel to complete a trip.

Another operating constraint can include engine derating. One or more engines of the propulsion-generating vehicles may be de-rated and unable to generate the horsepower or tractive effort associated with the rating of the engines. The decreased output or capability of these engines may be used to limit what operational settings are assigned to different vehicles to prevent the vehicles from having to operate the engines at levels that exceed the de-rated capabilities of the engines.

Another example of an operating constraint can include a notch delta penalty. Such a penalty can restrict how much and/or how quickly an operational setting of a vehicle is allowed to change. For example, a notch delta penalty may not allow the throttle notch setting for a propulsion-generating vehicle to change by more than three positions (e.g., throttle notch one to throttle notch four). Instead, the vehicle may be limited to changing throttle positions by three positions or less at a time.

Another example of an operating constraint can be a limitation on how frequently a position of a virtual fence is changed. For example, such a constraint may not permit a location of a fence in the vehicle system 100 to change more frequently than a designated frequency or time period.

Another example of an operating constraint can be a limitation on a number of fences that can be included in the vehicle system. For example, different locations or segments of the route being traveled upon or that are to be traveled upon may have restrictions on the number of groups to which the vehicles can be assigned. Segments of the route having undulations, curves, or the like, may be restricted to fewer fences or vehicle groups than segments of the route having fewer undulations, curves, or the like.

At 1004, handling parameters are determined for different groups of the vehicles and/or different fence positions. In one embodiment, a rope model can be used to estimate the expected forces exerted on couplers between the vehicles in the vehicle system when the vehicles are associated with different vehicle group assignments and/or the fence is at different positions at one or more locations along the route. The rope model can assume that the vehicle system includes mass points (which represent the vehicles) connected with connections, such as couplers, spacings between aerodynamically and/or fluidly coupled vehicles, or the like. The connection may be assumed to be rigid without dynamic movements.

The handling parameters can be determined based on at least some of the data obtained at 1002. As one example, the handling parameters can be based on a trip plan for the vehicle system. The trip plan can designate operational settings of the vehicle system as a function of time and/or distance along the route. For example, the trip plan can dictate speeds at which the vehicle system is to travel at different times and/or locations along the route. Optionally, the trip plan can dictate other settings of the vehicle system.

As one example that is not intended to limit all embodiments of the subject matter described herein, coupler forces may be calculated as the handling parameters. Alternatively, one or more other handling parameters may be calculated, estimated, sensed, or the like. To estimate the coupler forces as handling parameters, other forces on the connected vehicles can be examined. A vehicle may be subject to internal forces from neighboring vehicles, gravity forces, aerodynamic forces, traction forces, and the like. One of these forces includes drag on a vehicle. The total drag on a moving vehicle can be expressed by the sum of aerodynamic and mechanical forces as follows:

$$f = a + bv + cv^2 \quad \text{(Equation \#19)}$$

where f represents total drag on the vehicle, v represents the speed of the vehicle, and a, b, and c are constants determined by experiments (and usually referred to as David coefficient parameters).

Another force that may be exerted on the vehicle can include a resistance force. The resistance force can be based on the location of the vehicle along the route, and may be expressed as follows:

$$f_p = f_g + f_c \quad \text{(Equation \#20)}$$

where $f_p$ represents the resistance force, $f_g$ represents a gravity force, and $f_c$ represents a curvature resistance force. The gravity force ($f_g$) may be expressed as follows:

$$f_g = mg \sin \theta \quad \text{(Equation \#21)}$$

where m represents the mass of the vehicle, g represents the gravitational force, and θ represents the angle at which the vehicle is tilting or moving. The curvature resistance force ($f_c$) represents the force exerted on the vehicle by the vehicle moving along a curved section of the route. Because the layout of the route may be known, this curvature resistance force ($f_c$) may be previously measured, calculated, or estimated. In one aspect, a distribution of weight or mass of the vehicles in the vehicle system may not be even. For example, the masses of the vehicles in one location or portion of the vehicle system may be larger than the masses of the vehicles in other locations or portions of the vehicle system. Alternatively, the masses of the vehicles may be even throughout the vehicle system, such as the masses of all vehicles 904, 906 being equal or within a designated range of one another, such as within 1%, 3%, 5%, 10%, or the like.

The model of the vehicle system may be described by one or more (or all) of the following expressions:

$$m_i \dot{v}_i = u_i + f_{i-1} - f_i - f_{\alpha_i} - f_{pi}, \; i = 1, 2, \ldots, n \quad \text{(Equation \#22)}$$

$$\dot{x}_j = v_j - v_{j+1}, \; j = 1, 2, \ldots n-1 \quad \text{(Equation \#23)}$$

where $m_i$ represents the mass of the $i^{th}$ vehicle in a vehicle system including n vehicles, $v_i$ represents the speed of $i^{th}$ vehicle, $f_{\alpha_i}$ represents the aerodynamic force exerted on the $i^{th}$ vehicle, $f_{pi}$ represents the force exerted on the $i^{th}$ vehicle due to the grade and curvature of the route where the $i^{th}$ vehicle is moving, $f_i$ represents the forces between the $i^{th}$ and $(i+1)^{th}$ vehicles, $u_i$ represents the force that the $i^{th}$ vehicle generates (e.g., which may be zero for a non-propulsion generating vehicle or the tractive effort generated by a propulsion-generating vehicle). $x_j$ represents the difference in velocities between the $j^{th}$ vehicle and the neighboring $(j+1)^{th}$ vehicle.

One objective of the model can be to reduce in-system forces, as well as the fuel consumption and/or emission generation of the vehicle system. In one embodiment, a speed profile that is generated to reduce fuel consumption and/or emission generation may be obtained, and the in-system forces on the vehicles may be modeled using the speeds designated by such a profile. In scheduling the open loop controller, it is assumed that the desired speed is reached and held. The objective of the model can be expressed as:

$$J = \sum_{i=1}^{n} f_i^2 \quad \text{(Equation \#24)}$$

where J represents a cost function representative of in-system forces of the vehicle system and $f_i$ represents the coupler force of the $i^{th}$ vehicle. Different notch settings can be examined for different locations along the route to calculate different values of the cost function (J), subject to the constraints described above.

The cost function (J) can be used to identify the groups of the vehicles and/or the positions of the fence within the vehicle system at different locations along the route and/or times of the trip. As used herein, the term "potential change point" refers to a location along the route and/or time during a trip of the vehicle system where the handling parameters are determined, or the groups of vehicles and/or fence positions may change. The potential change points of a trip may represent designated, periodic locations, such as every kilometer, every few kilometers, very few fractions of a kilometer, or other distance, along a route. Optionally, the potential change points can represent designated, periodic times, such as every second, minute, hour, or the like. In one aspect, the potential change points may be defined by an operator, and/or may not be periodic in location.

The vehicle group assignments and/or fence positions may not change at every potential change point. The vehicle system may travel through several potential change points without changing the vehicle group assignments or fence positions. As used herein, the phrase "potential change point along the route" may represent a geographic location or an elapsed time during a trip. In one embodiment, group assignments of the vehicles and/or a position of a fence are chosen where the cost function (J) has a minimum value among all possible group assignments of the vehicles and/or positions of the fence at a location along the route, or where the cost function (J) has a lower value than one or more other group assignments of the vehicles and/or positions of the fence at the potential change points along the route. This can be described as a control problem that is expressed as follows:

$$\min_s J(s) = \min_s \sum_{i=1}^{n} f_i^2(s) \ s = 1, 2, \ldots, v \quad \text{(Equation \#25)}$$

where s represents possible positions of the fence, which also can dictate which vehicles are in which groups. For example, the vehicles between two fences, between a fence and a leading end of the vehicle system, or the vehicles between a fence and a trailing end of the vehicle system may be included in a group. As a result, the position of the fence in the vehicle system and/or the group assignments of the vehicles at different potential change points of the vehicle system along the route can be determined based on the in-system forces, as described above.

In one embodiment, the handling parameters that are calculated may be normalized and/or bunching power (e.g., horsepower) metrics may be calculated. With respect to normalizing the in-system forces (e.g., the coupler forces), these calculated forces may be normalized by multiplying or dividing the forces by a factor. In one embodiment, these forces may be normalized using the following expression:

$$J_{force}(k, i) = \frac{J_{IDP}(k, i) - \min_i(J_{IDP}(k, i))}{thresh} \quad \text{(Equation \#26)}$$

where $J_{force}(k, i)$ represents a normalized value of an in-system force (e.g., a coupler force) that is calculated as being exerted on a coupler at position of the fence that is at the $i^{th}$ vehicle at a potential change point along the route defined by the $k^{th}$ potential change point, $J_{IDP}(k, i)$ represents a combination of the calculated in-system forces, thresh represents a designated constant value, and $\min_i(J_{IDP}(k, i))$ represents a minimum value of the in-system forces calculated for all positions of the fence or all group assignments of the vehicles at all potential change points. The k potential change points along the route can represent designated potential change points along the route or during the trip. These potential change points optionally can be referred to as "mesh points." Alternatively, $\min_i(J_{IDP}(k, i))$ can represent a value of the in-system forces that is less than one or more, but not all, of the in-system forces calculated for possible positions of the fence and/or all group assignments of the vehicles at possible potential change points. In one aspect, $J_{IDP}(k, i)$ can represent a sum of squared coupler forces that are calculated for a position of the fence that is at the $i^{th}$ vehicle at a potential change point along the route defined by the $k^{th}$ potential change point. Optionally, $J_{IDP}(k,$ i) can represent another combination of these forces. In another embodiment, the in-system forces can be normalized in another manner, such as by dividing the calculated forces by a maximum calculated force, a minimum calculated force, a designated value, another calculated force, or the like.

Optionally, bunching power metrics can be calculated. The bunching power metrics can represent the amount of tractive effort or power that is calculated as being generated by different groups of the propulsion-generating vehicles at different positions of the fence at the different potential change points. In one embodiment, the bunching power metrics can be calculated using the following expression:

$$J_{bunch}(k, i) = \frac{HP_{bunching}(k, i)}{\max(abs(THP))} \quad \text{(Equation \#27)}$$

where $J_{bunch}(k, i)$ represents the bunching power metric for the vehicle system 100 when the fence 112 is at a position at the $i^{th}$ vehicle and the vehicle system 100 is at the $k^{th}$ potential change point, $HP_{bunch}(k, i)$ represents the differential combined power output (e.g., the difference in power on opposite sides of the fence) generated by the propulsion-generating vehicles when the fence is at a position at the $i^{th}$ vehicle and the vehicle system is at the $k^{th}$ potential change point, and max(abs(THP)) represents the maximum value of the total power (e.g., horsepower) that can be generated by the propulsion-generating vehicles in the vehicle system. Optionally, max(abs(THP)) can represent another value that is not the maximum value of the total power (e.g., horsepower) that can be generated by the propulsion-generating vehicles in the vehicle system.

Alternatively, the handling parameters may be determined in another manner. As described above, the handling parameters optionally can include coupler parameters, terrain excitation parameters, node parameters, neighboring velocity parameters, or based on natural forces. In one aspect, the handling parameters may be determined without having grade information about the route being traveled upon or that is to be traveled upon. In such a situation, the handling parameters can be determined by measuring forces exerted on the couplers (e.g., using a force sensor connected with a coupler or to the vehicles connected by the coupler), by measuring separation distances between neighboring vehicles (e.g., with decreasing separation distances indicating that a coupler between the vehicles may be transitioning from a tension or slack state to a compressed state and with increasing separation distances indicating that a coupler between the vehicles may be transitioning from a compressed or slack state to a state of tension). Optionally, the handling parameters can be determined based on energy differences. For example, the total energy of the vehicle system may be a combination of kinetic energy and potential energy. The potential energies of the vehicle system at various locations can be estimated or determined, such as based on the altitude at which the vehicle system is located as obtained from a global positioning system (GPS) receiver. The kinetic energy can be estimated or determined based on the speed at which the vehicle system is moving. The combined kinetic and potential energies can be determined for different vehicles in the vehicle system. If the combined kinetic and potential energies at one or more vehicles changes over time, then the differences between the total energies of the vehicle system can indicate changing energies stored in or exerted upon couplers connected to the vehicle(s) as forces. These changing energies or coupler forces can be used as the handling parameters for the various vehicles.

With the handling parameters (e.g., coupler forces) being calculated or determined for different positions of the fence at different potential change points along the route at 1004, the method 1000 can proceed to 1006. At 1006, a value of a variable k is set to 1. This variable k can have different values to represent different potential change points along the route. For example, if the route includes 100 different potential change points (e.g., mesh points), then the variable k can change in value from one to 100. Alternatively, this variable can have other values. The method 1000 can proceed by changing the values of k to examine the calculated in-system forces and/or bunching power metrics at different potential change points along the route. As described below, the method 1000 may determine to change or move a position of the fence (or otherwise change which vehicles are assigned to which groups) at one or more of these potential change points as the method 1000 examines the handling parameters.

At 1008, a determination is made as to whether the vehicles in one or more of the groups and/or the position of one or more fences was last changed within a designated period of time. For example, the method 1000 can examine previous potential change points and the times at which the vehicle system is expected to travel through these potential change points (e.g., using a designated speed of a previously determined trip plan or speed profile) to determine if the group assignments of the vehicles and/or the position of one or more fences in the vehicle system changed in less than a threshold dwell time period ago. If the vehicle group assignments and/or fence position was changed relatively recently (e.g., in less than the threshold dwell time period), then the group assignments may remain the same and/or the position of the one or more fences may not be moved again to avoid changing the group assignments and/or fence positions too quickly.

For example, the dwell time period may be set to one minute to ensure that the vehicle group assignments and/or fence positions do not change more than once per minute. Alternatively, another dwell time period may be used. If the vehicle group assignments and/or fence positions changed recently within this dwell time period, then flow of the method 1000 can proceed to 1010. On the other hand, if it has been a longer than the threshold dwell time period since the vehicle group assignments and/or fence positions were last changed, then the vehicle group assignments and/or fence positions may be able to be changed again. As a result, flow of the method 1000 can proceed to 1012.

At 1010, the vehicle group assignments and/or fence positions are not changed when the vehicle system is at the $k^{th}$ potential change point along the route. For example, the method 1000 may have determined to change the vehicle group assignments and/or fence positions too recently to safely allow for the vehicle group assignments and/or fence positions to be changed again at the $k^{th}$ potential change point. Flow of the method 1000 can proceed from 1010 toward 1016, as described below.

At 1012, a determination is made as to whether there is at least a threshold benefit to changing the vehicle group assignments (e.g., by moving the fence positions) when the vehicle system is at the $k^{th}$ potential change point along the route. The handling parameters are calculated, estimated, or sensed can be examined to determine if changing the vehicle group assignments at the $k^{th}$ potential change point results in an improvement in the vehicle handling parameters that is at least as large as the threshold benefit (where the threshold benefit represents a magnitude of the handling parameters). As one example, the coupler forces that are estimated as the handling parameters if the position of the fence is moved at the $k^{th}$ potential change point and the coupler forces that are estimated as occurring during an upcoming period of time in the trip (e.g., twice the time of the threshold dwell period of time or another time period) are examined.

If changing the vehicle group assignments at the $k^{th}$ potential change point results in the handling parameters improving over this upcoming period of time by at least the amount of the threshold benefit, then changing the vehicle group assignments at the $k^{th}$ potential change point may be desirable. For example, if changing the vehicle group assignments results in a calculation of the coupling forces decreasing by at least a designated, non-zero threshold amount, then changing the vehicle group assignments occurs. Optionally, the handling parameters may be examined to determine if changing the vehicle group assignments results in a calculated increase of the handling parameters by at least a threshold benefit amount. As a result, flow of the method 1000 can proceed to 1012.

On the other hand, if changing the vehicle group assignments at the $k^{th}$ potential change point does not result in the handling parameters improving over the upcoming period of time by at least the amount of the threshold benefit, then changing the vehicle group assignments at the $k^{th}$ potential change point may not be desirable. For example, the reduction in the coupler forces may be sufficiently small that keeping the current position of the fence may be desired over moving the fence. As a result, flow of the method 1000 can proceed to 1010. At 1010, the vehicle group assignments at the $k^{th}$ potential change point may remain the same. For example, the fence can remain at the same position as the $(k-1)^{th}$ potential change point (or may not move if the value of k is one).

At 1014, a sequence of changes in the vehicle group assignments is determined for when the vehicle system is at the $k^{th}$ potential change point. For example, a sequence of movements of the position of the fence can be determined for when the vehicle system is at the $k^{th}$ potential change point. The method 1000 can determine this order at 1014.

A sequence of changes in the vehicle group assignments can be represented as different groups of the vehicles at different potential change points of the vehicle system along the route. The groups can be different at different potential change points by assigning the vehicles to different groups, without physically moving or changing the positions of the vehicles within the vehicle system. For example, a sequence may include a first group of the vehicles (e.g., the vehicles 904A, 904B in a first group and the vehicles 904C, 904D in a second group) when the vehicle system is at a first potential change point along the route; followed by a different, second group of the vehicles (e.g., the vehicle 904A in the first group, the vehicles 904B, 904C in the second group, and the vehicle 904D in a third group) when the vehicle system is at a different, second potential change point along the route; followed by a different, third group of the vehicles (e.g., the vehicles 904A, 904B, 904C in the first group and the vehicle 904D in the second group) when the vehicle system is at a different, third potential change point along the route; and so on. Optionally, the sequence of changes in the vehicle group assignments can be represented by a sequence of changes in fence positions. With respect to the preceding example, such a sequence may include a first fence between the vehicle 904B and the vehicle 904C when the vehicle system is at the first potential change point along the route; the first fence between the vehicle 904A and the vehicle 904B, and a second fence between the vehicle 904C and the vehicle 904D when the vehicle system is at the second potential change point along the route.

Alternatively, the groups can be different at different potential change points by physically moving one or more of the vehicles so that the positions of the vehicles change within the vehicle system. For example, a sequence may include the vehicles 904A, 904B in a first group and the vehicles 904C, 904D in a second group when the vehicle system is at a first potential change point along the route; followed by a different grouping of the vehicles that results from switching the positions of the vehicles 904B and 904C such that the vehicles 904A, 904C are in one group and the vehicles 904B, 904D are in another group.

Optionally, the groups can be different at different potential change points by adding one or more vehicles to the vehicle system and/or removing one or more vehicles from the vehicle system. For example, a sequence may include the vehicles 904A, 904B in a first group and the vehicles 904C, 904D in a second group when the vehicle system is at a first potential change point along the route. At a subsequent second potential change point, a vehicle may be added to the vehicle system (e.g., a helper vehicle or helper locomotive) and assigned to a group that includes one or more of the vehicles 904. At another, third potential change point, the vehicle that was added at the second potential change point may be removed from the vehicle system and/or another vehicle may be added to the vehicle system. At another, fourth potential change point, one or more of the vehicles 904 may be removed from the vehicle system.

In one embodiment, the assignments of the vehicles to different groups can change at different potential change points by separating the vehicle system into two or more smaller vehicle systems. Due to a segment of the route having several undulations and/or curves (or another reason), the handling parameters of the vehicle system may be improved by separating the vehicle system into two or more separate vehicle systems that travel over the segment of the route as separate, non-connected vehicle systems and then combine back together to form the original vehicle system after traveling over the segment of the route. The handling parameters may be improved when separating the vehicle system into smaller vehicle systems relative to the larger vehicle system traveling over the segment of the route without dividing the vehicle system into the smaller vehicle systems. As one example, prior to reaching a first potential change point, the vehicle system 900 may travel with the vehicles 904A-D and 906A-F being mechanically interconnected with each other such that the vehicle system 900 moves as a unit. Upon reaching the first potential change point, it may be determined that the handling parameters of the vehicle system 900 can be improved by separating the vehicles 904A, 904B, 906A, and 906B from the vehicles 904C, 906C, 906D, 906E, 906F, and 904D such that two smaller vehicle systems are formed. The first smaller vehicle system can be formed by the vehicles 904A, 904B, 906A, and 906B and the second smaller vehicle system can be formed by the vehicles 904C, 906C, 906D, 906E, 906F, and 904D. Alternatively, three or more smaller vehicle systems can be formed. The separate, smaller vehicle systems can travel along the route to a subsequent potential change point, where it may be determined that the handling parameters of the smaller vehicle systems can be improved by re-combining the smaller vehicle systems into the larger vehicle system 900 (and/or assigning the vehicles 904 to different groups). The smaller vehicle systems may then be re-combined into the larger vehicle system 900.

In one embodiment, the method 1000 can employ an "exhaustive search" technique to identify the sequence of changes to the vehicle group assignments. This technique can involve estimating the vehicle handling parameters (e.g., coupler forces or other parameters) for all different permutations of the possible sequences of changes in the vehicle group assignments (e.g., changes in the positions of the fence) during an upcoming designated period of time (e.g., twice the threshold dwell time period or another time period). The sequence of changes in the vehicle group assignments that results in estimated handling parameters improving (e.g., decreasing or increasing, as appropriate) by the most or more than one or more other sequences may be identified as a selected sequence. For example, the sequence of changes in the fence positions that results in the estimated coupler forces being less than all other sequences or that are less than at least a designated number of other sequences may be identified as the selected sequence.

In another embodiment, the method 1000 can employ a "dynamic programming" technique to identify the selected sequence of changes to the vehicle group assignments. This technique can involve estimating the handling parameters for many, but less than all, different permutations of the possible sequences of changes in the group assignments of the vehicles during the upcoming designated period of time. In contrast to the "exhaustive search" technique, the "dynamic programming" technique may not examine certain designated sequences of changes in the vehicle group assignments. The "dynamic programming" technique may exclude certain sequences of changes from consideration that are previously identified as undesirable or non-optimal sequences of changes. These sequences may be identified by an operator of a system that performs the method 1000, may be identified by previous generations of command profiles for the vehicle system, or may be identified in another manner. Among the sequences that are examined in the "dynamic programming" technique, the sequence of changes in the vehicle group assignments that results in estimated handling parameters that are less or larger than other sequences (as appropriate) or that are less than or greater than (as appropriate) at least a designated number of other sequences may be identified as the selected sequence. Some of the sequences that may not be examined may include those sequences that result in changes in fence positions that occur more frequently than a designated limit or exceed the fence restrictions, changes in operational settings of one or more vehicles that are larger than one or more designated limits, changes in the fence positions and/or operational settings that previously were identified as causing an undesired change in handling parameters, or the like.

In another embodiment, the method 1000 can employ a "complete trip dynamic programming" technique to identify the selected sequence of changes to the vehicle group assignments. This technique can involve estimating the handling parameters for many, but less than all, different permutations of the possible sequences of changes in the vehicle group assignments during a period of time that is longer than the upcoming designated period of time. For example, this technique can apply the "dynamic programming" technique described above to the entire trip of the vehicle system or to another period of time that is longer than the upcoming designated period of time.

In another embodiment, the method 1000 can employ a "hybrid" technique to identify the selected sequence of changes to the vehicle group assignments. This technique can involve examining the handling parameters for different vehicle group assignments (e.g., at different fence positions) at different potential change points along the route and selecting the sequence that reduces or minimizes (or increases or maximizes, as appropriate) the handling parameters over a designated period of time (e.g., the threshold dwell time period) following a change in the vehicle group assignments.

With continued reference to the method 1000 shown in FIG. 10, FIG. 11 illustrates a table 1100 demonstrating possible sequences of changing the vehicle group assignments in the vehicle system according to one embodiment. The handling parameters estimated from changing the vehicle group assignments according to the different sequences may be used to determine the selected sequence. The table 1100 includes several potential change point columns 1102 representative of different upcoming potential change points along the route. The table 1100 also includes several sequence rows 1104 representative of different sequences of changing the vehicle group assignments in the vehicle system. In each of the sequence rows 1104, one or more "X" symbols are shown. The location of the X symbols indicates the potential change point or potential change points in the corresponding sequence at which the vehicle group assignments are changed in that sequence when the vehicle system arrives at or passes through the potential change points. For example, the first sequence can include changing the position of the fence at the $k^{th}$ and $(k+4)^{th}$ potential change points, the fifth sequence can include changing the position of the fence at the $(k+1)^{th}$ and $(k+5)^{th}$ potential change points, and so on.

Several movement ban boxes 1106 are overlaid on the table 1100. These boxes 1106 represent the time periods over which the vehicle group assignments are not allowed to change following a previous change in the vehicle group assignments. For example, these boxes 1106 can correspond to the dwell time period over which the fence positions do not change following a preceding change in the fence positions. With respect to the third sequence, the box 1106 begins at the $k^{th}$ potential change point along the route (the potential change point of the vehicle system along the route where the vehicle group assignments are changed, such as by changing the position of the fence) and extends to the $(k+3)^{th}$ potential change point along the route to indicate that the vehicle group assignments cannot be moved again until at least the $(k+4)^{th}$ potential change point along the route. Other sequences include similar boxes 1106. With respect to the boxes 1106 in the latter potential change points, the length of the boxes 1106 is reduced in FIG. 11 due to size constraints of the table 1100. But, these boxes 1106 would extend to additional potential change points not shown in the table 1100.

The "hybrid" technique of identifying the selected sequence of changes to the vehicle group assignments (e.g., sequence of movements of the fence) can determine which of the sequences improves the handling parameters (e.g., by reducing the in-train forces) while optionally penalizing changes in the vehicle group assignments and/or penalizing bunching horsepower in the vehicle system. In one embodiment, the estimated handling parameters for a sequence of changes to the vehicle group assignments may be expressed as follows:

$$J = J1 + \frac{J2}{A} + J3*movePenalty + J4*bunchPenalty \quad \text{(Equation #28)}$$

where J represents the estimated handling parameters for a sequence (e.g., the coupler forces or other parameters), J1 represents a maximum value of $J_{force}(k, i)$ calculated for the different potential change points of the vehicle system along the route and different group assignments of the vehicles (e.g., different fence positions, as described above), J2 represents a mean value of the values of $J_{force}(k, i)$ calculated for the different potential change points and different group assignments of the vehicles (e.g., different fence positions), J3 represents a sum of the absolute values of changes in positions of the fence (e.g., which correspond or are determined from the changes in group assignments of the vehicles), and J4 represents the maximum of the absolute values of $J_{bunch}(k, i)$ for the vehicle system before and after each change in vehicle group assignments. Optionally, J1 may represent a value of $J_{force}(k, i)$ that is larger than one or more other values of $J_{force}(k, i)$, but not necessarily the maximum value. Alternatively, J2 can represent a median or other value of Jforce(k, i) calculated for the different potential change points along the route and different vehicle group assignments. With respect to J3, this variable can be calculated by determining how far (e.g., in terms of number of potential change points, number of vehicles, distance along the length of the vehicle system, or otherwise) that one or more fences are moved between changes in the vehicle group assignments. For example, if a change in vehicle group assignments would correspond to moving a fence by a designated distance, then this designated distance can be used to calculate J3. J3 can represent a combination of how far the fence is being moved within a sequence being examined. Optionally, J4 can represent a value of $J_{bunch}(k, i)$ for the vehicle system before and after each change in the vehicle group assignments that is larger than one or more other values of $J_{bunch}(k, i)$, but that is not necessarily the largest value. The movePenalty and bunchPenalty variables may have designated values that are based on how large the values of $J_{force}(k, i)$ are for a sequence. For example, for larger values of $J_{force}(k, i)$, such as normalized values that exceed one, the value of the movePenalty and/or bunchPenalty decreases (such as to one or zero). For smaller values of $J_{force}(k, i)$, such as normalized values that are one or less, movePenalty and/or bunchPenalty may have increased greater than one.

The value of J can be calculated for each sequence, or at least plural different sequences. The values of J can be compared to determine which sequence yields a value of J that is less than all other sequences, or that is less than one or more other sequences, but not necessarily all sequences. The sequence having the lower or lowest value of J can be identified as the selected sequence. If the values of J for the sequences are less than one, then the vehicle group assignments and/or the fence positions may not be changed for the $k^{th}$ potential change point along the route.

The selected sequence may then be used to determine when and/or where along the route to change the vehicle group assignments. For example, if the eighth sequence in the table 1100 is identified as the selected sequence, then the vehicle group assignments or position of the fence may change when the vehicle system reaches the $(k+2)^{th}$ potential change point and again when the vehicle system reaches the $(k+6)^{th}$ potential change point (as indicated by the "X's" in the table 1100).

Optionally, the selected sequence can be used to determine a makeup of the vehicle system. For example, different selected sequences can be determined for different vehicle systems, with the different vehicle systems having different propulsion-generating vehicles 904 (e.g., different numbers of the vehicles 904, different types of the vehicles 904, etc.), different non-propulsion-generating vehicles 906 (e.g., different numbers of the vehicles 906, different types of the vehicles 906, different cargo being carried by the vehicles 906, etc.). The locations, numbers, types, or the like, of the vehicles 904, 906 in a vehicle system can be referred to as a vehicle arrangement or make-up of the vehicle system. Different sequences may be determined for two or more different vehicle arrangements. Depending on which sequences have the best or better handling parameters than one or more other sequences, the vehicle arrangement associated with the sequence or sequences having the better handling parameters may be used to form the vehicle system.

Returning to the description of the flowchart of the method 1000 shown in FIG. 10, at 1016, a determination is made as to whether the current value of k is equal to the total number of potential change points in the trip. For example, a determination may be made as to whether a sequence for changing vehicle group assignments or fence positions has been selected for all of the designated potential change points (or at least a designated amount of the designated potential change points) along the route. If a sequence has been selected for the designated potential change points, then flow of the method 1000 can proceed to 1020. Otherwise, additional potential change points along the route may need to be examined to determine whether to change vehicle group assignments and/or fence positions, and/or to determine the sequence to use in changing the vehicle group assignments and/or fence positions. As a result, flow of the method 1000 can proceed toward 1018.

At 1018, the value of k is increased by one. For example, the value of k may be changed and flow of the method 1000 can return to 1008 so that the determination of whether to change vehicle group assignments and/or fence positions, and/or the identification of the sequence in which to change the vehicle group assignments and/or fence positions can be performed for another potential change point along the route.

At 1020, command profiles and/or change indices are generated using the selected sequences. The command profiles can include operational settings for inclusion in and/or use with a trip plan. The operational settings can indicate which throttle notch positions are to be used for which propulsion-generating vehicles and/or groups of the propulsion-generating vehicles at various locations along the route (e.g., at potential change points and/or other locations along the route), the brake settings of the vehicles 904 and/or 906, the speeds of the vehicles 904 and/or 906, or the like.

The change indices can include position indices and/or time indices. The position indices can indicate the potential change points along the route at which the operational settings are to be used. The operational settings may be designated so that one or more groups of the vehicles have the same operational settings at the same potential change points. As a result, the operational settings and the corresponding potential change points designated by the command profile can arrange the vehicles into groups and/or establish virtual fences between different groups of the vehicles, as described above. Because the operational settings and assignments of the vehicles to different groups may not change at every single potential change point along the route for a trip, the number of position indices in a plan may be smaller than the number of potential change points along the route for the trip.

The time indices can indicate the times during travel of the vehicle system along the route at which the corresponding operational settings are to be used. The operational settings may be designated so that one or more groups of the vehicles have the same operational settings at the same times. As a result, the operational settings and the corresponding times designated by the command profile can arrange the vehicles into groups and/or establish virtual fences between different groups of the vehicles, as described above. In one aspect, the position indices may be used in place of the time indices, or the time indices may be used in place of the position indices. Alternatively, both the position indices and the time indices may be used.

The command profiles, position indices, time indices, and/or trip plan can then be communicated to the vehicle system to direct an onboard operator how to control the propulsion-generating vehicles, to automatically control the propulsion-generating vehicles, or the like. The vehicle system may then travel on the route for the trip using the operational settings, position indices, and/or time indices to change vehicle group assignments and/or fence positions during the trip.

Figure 12:
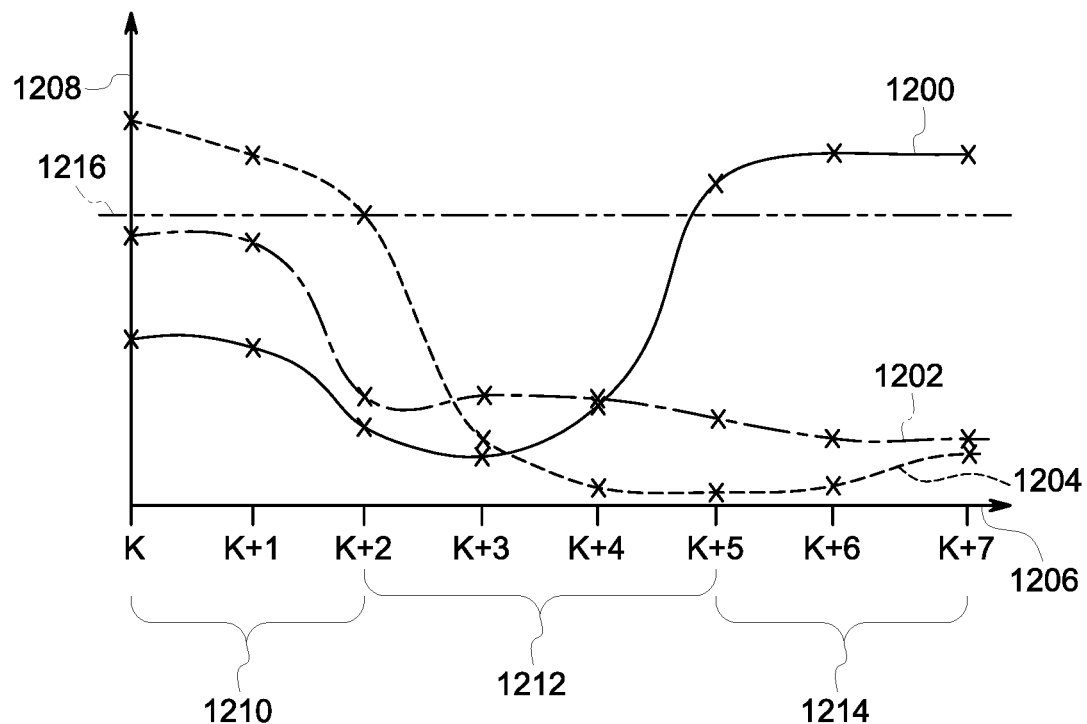
FIG. 12 illustrates examples of handling parameters calculated for three different vehicle group assignments or fence positions according to one embodiment.

In another embodiment, the selected sequences may be determined by grouping different potential change points along the route having the same vehicle group assignments and/or fence positions together. With continued reference to the flowchart of the method 1000 shown in FIG. 10, FIG. 12 illustrates examples of handling parameters (e.g., $J_{force}(k, i)$) calculated for three different vehicle group assignments or fence positions according to one embodiment. The values of the handling parameters are represented by parameter curves 1200, 1202, 1204 that are shown alongside a horizontal axis 1206 and a vertical axis 1208. The horizontal axis 1206 represents different potential change points along the route and the vertical axis 1208 represents different values of the handling parameter. The parameter curve 1200 represents values of the handling parameter with a first vehicle group or first fence position (e.g., where the fence is located between the consist 910A and the consist 910B). The parameter curve 1202 represents values of the handling parameter with a different, second vehicle group or a different, second fence position (e.g., where the fence is located between the consist 910B and the consist 910C). The parameter curve 1204 represents values of the handling parameter with a different, third vehicle group or a third position of the fence (e.g., the fence located behind the consist 910C or between the consist 910C and the trailing end of the vehicle system). "X" symbols are shown along the parameter curves 1200, 1202, 1204 to represent the calculated values of the handling parameters at the different potential change points along the route for the different vehicle group assignments and/or fence positions.

With the values of the handling parameter calculated for the different vehicle group assignments and/or fence positions at the different potential change points along the route, a determination is made as to whether segments of potential change points along the route having the same vehicle group assignments or fence positions exist, or if segments of potential change points along the route having values of the handling parameters (e.g., normalized values) that are less than a designated threshold value 1216 (e.g., one or another value) exist.

In the illustrated example, first, second, and third segments 1210, 1212, 1214 are identified based on the values of the handling parameters. The first segment 1210 can be identified based on the values of handling parameters in the third parameter curve 1204 exceeding the threshold value 1216 across consecutive potential change points along the route (e.g., potential change points k, (k+1), and (k+2)). The third segment 1214 can be identified based on the values of the handling parameters in the first parameter curve 1200 exceeding the threshold value 1216 across consecutive potential change points along the route (e.g., potential change points (k+5), (k+6), (k+7)). The second segment 1212 can be identified based on the values of the handling parameters being less than the threshold value 1216 in consecutive potential change points (e.g., mesh points (k+3), (k+4)).

In one embodiment, the identified segments 1210, 1212, 1214 are examined to determine if the segments 1210, 1212, 1214 are sufficiently long. For example, the number of consecutive potential change points in a segment may be compared to a threshold of consecutive potential change points, such as three or another value. If the number of consecutive potential change points in a segment does not meet or exceed this threshold value, then the segment may be merged into another, neighboring segment. If the number of consecutive potential change points in a segment does meet or exceed the threshold value, then the segment may be used to create the selected sequence of changes to the vehicle group assignments and/or changes to the fence positions. This comparison to a threshold value can be used to ensure that the vehicle group assignments and/or fence positions are not changed too frequently.

With respect to the potential change points along the route at which the values of the handing parameters do not exceed the threshold value 1216 and/or the consecutive potential change points that are insufficiently long to define a separate segment (as described above), these potential change points may be merged into one or more neighboring segments. The segment of these potential change points may be referred to as a "To Be Determined" or "TBD" segment. In the example shown in FIG. 12, the segment 1212 may be a TBD segment because the values of the handling parameters are less than the threshold value 1216 and/or because the number of potential change points along the route in the segment 1212 does not meet or exceed the threshold of consecutive potential change points.

To determine which neighboring segment 1210, 1214 of the TBD segment 1212 to merge the TBD segment 1212 into, a determination is made as to whether the neighboring segments 1210, 1214 on opposite sides of the TBD segment 1212 are associated with the same vehicle group assignments and/or fence positions. In the illustrated example, the segment 1210 is associated with the propulsion-generating vehicles 904A, 904B, 904C, 904D being in the same group (e.g., or the third position of the fence, which is behind the trailing consist 910C) while the segment 1214 is associated with the propulsion-generating vehicles 904A, 904B being in one group and the propulsion-generating vehicles 904C, 904D being in another group (e.g., or the first position of the fence, which is between the leading consist 910A and the middle consist 910B). Therefore, the neighboring segments 1210, 1214 of the TBD segment 1212 have different vehicle groupings and/or fence positions. As a result, the TBD segment 1212 is not merged into the segment 1210 or the segment 1214. If, on the other hand, the segments 1210, 1214 were associated with the same vehicle group assignments and/or fence positions as the TBD segment 1212, then the TBD segment 1212 could be merged into the segment 1210 and/or the segment 1214 to produce a larger segment comprised of the segments 1210, 1212, and/or 1214.

If the neighboring segments of a TBD segment are not associated with the same vehicle group assignments or fence positions (as is the case in the example shown in FIG. 12), then a determination is made as to whether several TBD segments have been identified. If several TBD segments have been identified, then the TBD segments can be sorted in an order, such as longest to shortest in length (in terms of consecutive potential change points in the various TBD segments, distance along the route encompassed by the consecutive potential change points, or the like). The TBD segments can then be examined for merging into other segments in order from the longer TBD segments to the shorter TBD segments. Alternatively, the TBD segments may be examined in another order.

For a TBD segment being examined for merger into a neighboring segment, the number of consecutive potential change points in the segments that neighbor the TBD segment is examined. For example, if one of these neighboring segments has a number of consecutive potential change points that is less than the threshold number of potential change points, but that would have a number of consecutive potential change points that is at least as large as this threshold number, then the TBD segment is merged into this neighboring segment. For example, if the threshold number of potential change points is three and the segment 1214 only had two potential change points (instead of the three potential change points shown in FIG. 12), then the TBD segment 1212 could be merged into the segment 1214 so that the merged segment would include five consecutive potential change points. Otherwise, the TBD segment is left without merging the TBD segment into any neighboring segment.

The remaining segments, which may include segments having values of the handling parameters that exceed the threshold value 1216, merged segments, and TBD segments that are not merged with other segments, are then used to create the selected sequence of changes to the vehicle group assignments and/or fence positions. At the potential change points of the trip that are included in the segments having values of the handling parameters that exceed the threshold value 1216, the vehicle group assignments and/or fence positions at those potential change points along the route can be the vehicle group assignments and/or fence positions associated with the values of the handling parameters that exceed the threshold value 1216.

For example, the vehicle group assignments and fence positions at the potential change points k, (k+1), and (k+2) in the first segment 1210 includes the vehicles 904A, 904B, 904C, and 904D in the same group (e.g., with the fence 912 in the third position between the trailing consist 910C and the trailing end of the vehicle system) due to the values of the handling parameters in the parameter curve 1204 being relatively large. The vehicle group assignments and fence position at the potential change points (k+3) and (k+4) in the TBD segment 1212 can remain at the same as the potential change points k, (k+1), and (k+2) from the first segment due to the TBD segment 1212 remaining separate from and not merged into other neighboring segments. For example, as described above, when the in-system forces are relatively low (e.g., for values of $J_{force}(k, i)$ that do not exceed the threshold value 1216), the vehicle group assignments and/or fence positions may remain the same and not change due to the benefit of changing the vehicle groups and/or fence positions being relatively small. The vehicle group assignments and/or fence positions may then change to the vehicles 904A, 904B being in one group and the vehicles 904C, 904D being in another group (e.g., with the fence 912 between the leading and middle consists 910A, 910B) at the (k+5) potential change point along the route. The vehicle group assignments and fence position may remain the same at least through the (k+6) and (k+7) potential change points due to the values of the handing parameters in the parameter curve 1200 being relatively large (e.g., greater than the threshold). The sequence in which the vehicle group assignments and/or fence positions change between these segments can define the selected sequence. The command profiles, position indices, and/or time indices of the vehicle group assignments and/or fence positions can then be generated using the selected sequence, similar to as described above.

While the foregoing description focuses on changing vehicle group assignments and/or fence positions within a vehicle system having a constant number and/or arrangement of vehicles 904, 906, optionally, the vehicle group assignments and/or fence positions may change by adding or removing one or more vehicles. For example, a selected sequence may include adding a propulsion-generating vehicle 904 to the vehicle system (e.g., a helper locomotive) to provide additional tractive effort at a selected potential change point. The vehicle group assignments and/or fence positions may change when this additional vehicle is added. As another example, a selected sequence may include removing vehicle 904 and/or 906 from the vehicle system at a selected potential change point. The vehicle groups and/or fence positions may change when this vehicle is removed.

In one embodiment, the trip plan, command profiles, change indices, and/or time indices may be determined without having the route data described herein. For example, the grades, curvatures, or the like, of the route to be traveled along for a trip may not be available or only some of this data may be available for determining fence positions, assignments of the vehicles to different groups, determining operational settings, etc. The fence positions, vehicle assignments to different groups, operational settings, etc. may be determined based on data obtained onboard the vehicles during movement along the route. For example, the grade, curvature, or the like, of the route can be determined using positional data obtained by the vehicle system or vehicles, such as by using the GPS locations of different vehicles in the vehicle system. Differences in altitude, location, or the like, between two or more vehicles in the vehicle system can be used to calculate or estimate the grade of the route, the curvature of the route, or the like. For example, if two vehicles 904, 906 have different altitudes and are spaced apart by a designated or estimated distance within the vehicle system, then the grade of the route between these vehicles 904, 906 may be determined or estimated. As another example, differences in geographic coordinates between two or more vehicles 904, 906 and/or the separation distances between these vehicles 904, 906 can be used to calculate or approximate the curvature of the route between these vehicles 904, 906.

Figure 13:
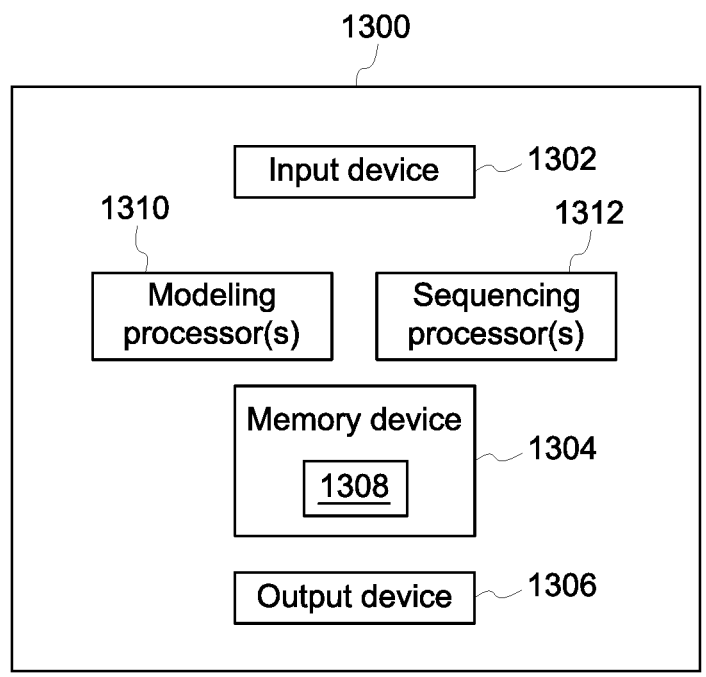
FIG. 13 illustrates a schematic diagram of a planning system according to one embodiment.

FIG. 13 illustrates a schematic diagram of a planning system 1300 according to one embodiment. The planning system can be used to generate command profiles, position indices, and/or time indices for operation of the vehicle systems described herein. For example, the planning system may perform one or more operations of the methods described herein to determine operational settings (e.g., throttle settings, asynchronous brake settings, etc.), vehicle group assignments, fence positions, potential change points along the route where the vehicle group assignments and/or fence positions are to change, or the like.

Components of the planning system may include or represent hardware circuits or circuitry that include and/or are connected with one or more processors, such as one or more computer microprocessors. The operations of the methods described herein and the planning system can be sufficiently complex such that the operations cannot be mentally performed by an average human being or a person of ordinary skill in the art within a commercially reasonable time period. For example, the generation of command profiles, position indices, and/or time indices for trips of vehicle systems may take into account a large amount of factors, may rely on relatively complex computations, may involve examination of many permutations of different potential sequences, and the like, such that such a person cannot complete the command profiles, position indices, and/or time indices within a commercially reasonable time period to have the command profiles, position indices, and/or time indices ready for the frequent trips of vehicle systems. The hardware circuits and/or processors of the planning system may be used to significantly reduce the time needed to determine the command profiles, position indices, and/or time indices such that these command profiles, position indices, and/or time indices can be generated within commercially reasonable time periods.

The planning system may be located onboard a vehicle system, off-board a vehicle system (e.g., at a dispatch center or other location), or may have some components disposed onboard a vehicle system and other components disposed off-board the vehicle system. The planning system includes an input device 1302 that obtains data used to determine the command profiles, position indices, and/or time indices. The input device can include a communication device, such as a wireless transceiver and associated hardware circuitry, a modem, or the like, that receives system data, vehicle data, route data, constraint data, trip plans (e.g., speed profiles), or the like, from an off-board location. Optionally, the input device can include a keyboard, microphone, touchscreen, stylus, or the like, that can receive this data.

A memory device 1304 includes one or more computer readable storage media, such as computer hard drives, random access memory (RAM), dynamic RAM (DRAM), static RAM (SRAM), read only memory (ROM), mask ROM, programmable ROM (PROM), erasable PROM (EPROM), electrically EPROM (EEPROM), non-volatile RAM (NVRAM), flash memory, magnetic tapes, optical discs, or the like. The memory device may store the data that is obtained by the input device, trip plans (e.g., speed profiles), designated potential change points along the route (e.g., potential change points), command profiles, position indices, time indices, or the like. In one embodiment, the flowchart of the methods described herein can represent one or more sets of instructions that are stored on the memory device for directing operations of the planning system. Alternatively, the memory device may have one or more other sets of instructions 1308 stored on the memory device (e.g., software) to direct operations of the planning system as described herein.

An output device 1306 generates signals that communicate information to a vehicle system, an operator of the vehicle system, or to another location. These signals may convey the command profiles, position indices, and/or time indices determined by the planning system. For example, the output device can be the same or different communication device as the input device to communicate this information to another location. Optionally, the output device can include a touchscreen, display device, speaker, or the like, for communicating the command profiles, position indices, or other information. The output device can communicate the command profiles, position indices, and/or other information to the vehicle system so that the vehicle system can present the command profiles, position indices, time indices, and/or other information to an operator to direct manual control of the vehicle system and/or to direct automatic control of the vehicle system.

The planning system includes one or more modeling processors 1310 that may include and/or represent hardware circuits or circuitry that include and/or are connected with one or more processors, such as one or more computer microprocessors. The modeling processor optionally may represent one or more sets of instructions stored on a computer readable medium, such as one or more software applications. The modeling processor can perform various calculations described herein. For example, the modeling processor may determine the handling parameters (such as coupler forces), for different locations in the vehicle system, for different vehicle group assignments, for different fence positions in the vehicle system, for different potential change points (e.g., mesh points) of the vehicle system along the route, for different asynchronous brake settings, and the like, as described herein. The modeling processor can determine the bunching power metrics, such as the bunching HP metrics, for different vehicle group assignments, different fence positions and/or different potential change points of the vehicle system, as described above.

The planning system includes one or more sequencing processors 1312 that may include and/or represent hardware circuits or circuitry that include and/or are connected with one or more processors, such as one or more computer microprocessors. In one embodiment, the one or more modeling processors and the one or more sequencing processors may be embodied in the same computer processor or two or more computer processors. The sequencing processor optionally may represent one or more sets of instructions stored on a computer readable medium, such as one or more software applications. The sequencing processor can perform various operations described herein. For example, the sequencing processor can examine the handling parameters determined by the modeling processor, determine potential sequences for changing the vehicle group assignments and/or moving the position and/or number of the fence(s) in the vehicle system, identify a selected sequence for changing the vehicle group assignments and/or moving the fence, and the like, as described above. The sequencing processor optionally may identify the segments of potential change points along the route where the vehicle group assignments and/or fence positions are the same and/or merge these segments to identify the selected sequence, also as described above. The sequencing processor may use the selected sequence to generate the command profiles, position indices, and/or time indices that are output by the output device to the vehicle system. As described above, these command profiles and position indices can be used to control where and when the vehicle group assignments and/or fence positions are changed within the vehicle system.

In one embodiment, the planning system may determine command profiles, change indices, time indices, fence positions and/or number of fences, operational settings, or the like, based on and/or in coordination with input from an operator of the vehicle system. The operator can provide a power request to the planning system via input provided to the input device 1302. The processors 1310 and/or 1312 can then determine assignments of the vehicles to different groups, operational settings of the vehicles in the different groups, and/or the locations and/or times where the groups and/or operational settings are to be used such that the vehicles provide at least the amount of power requested by the operator (as indicated by the power request). In one aspect, the processors 1310 and/or 1312 can determine several different sets of vehicle assignments to different groups, operational settings, locations, and/or times and present these different sets to the operator via the output device 1306. The operator may then select one or more of the sets via the input device 1302. The planning system may then create and/or modify a command profile and/or change indices to provide the power requested by the operator and/or the set of vehicle assignments, operational settings, locations, and/or times selected by the operator.

In one aspect, the planning system can determine number of fences and the positions of the fences at one or more locations and/or times along the route, but the operator selects the operational settings (e.g., throttle notch positions, brake settings, or the like) for the system-determined fence settings. For example, at a first potential change point, the planning system may determine that a fence should be positioned between the vehicles 904B and 906A. The planning system may report this fence position to the operator (e.g., via the output device 1306). The operator may then select the operational settings to be used by the vehicles 904A-B and the operational settings to be used by the vehicles 906A-D and/or the vehicles 904C-D for this fence position (e.g., via the input device 1302). Alternatively, the operator may select operational settings for one or more of the vehicles 904, 906 at one or more locations and/or times along the route during a trip of the vehicle system, and the planning system can determine fence positions for the vehicles at the locations and/or times.

The planning system may provide the operator with an ability to opt out or override the number of fences and/or the position of one or more fences, operational setting, or the like, that is determined by the planning system. The planning system can inform the operator of the fence positions, operational settings, or the like, via the output device 1306. The operator may reject the system-determined fence position, operational setting, or the like, via the input device 1302. The planning system may determine another fence position, operational setting, or the like, and/or the operator may provide an operator-selected or operator-determined fence position, operational setting, or the like.

Figure 14:
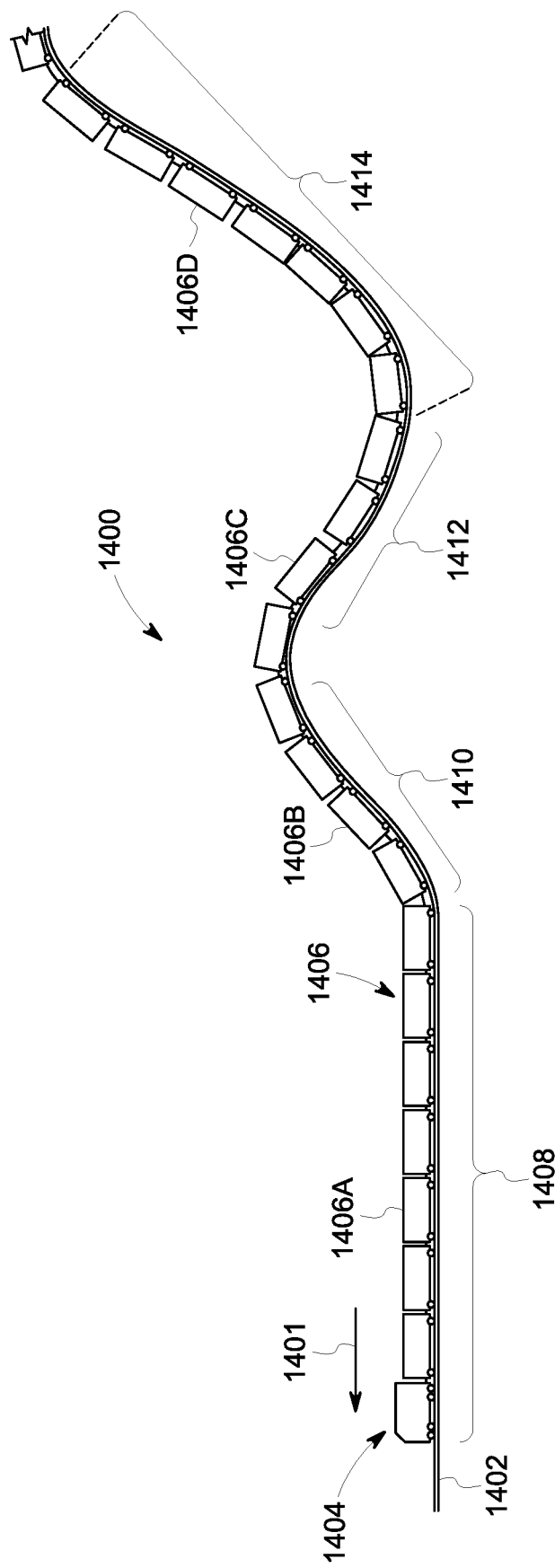
FIG. 14 illustrates another example of a vehicle system traveling along a segment of a route in a direction of travel.

FIG. 14 illustrates another example of a vehicle system 1400 traveling along a segment of a route 1402 in a direction of travel 1401. The vehicle system 1400 can represent one or more of the vehicle systems shown in other Figures and/or described herein. The vehicle system 1400 includes one or more propulsion-generating vehicles 1404 and/or one or more non-propulsion-generating vehicles 1406 (including the vehicles 1406A-D). Optionally, the vehicle system 1400 includes only a single vehicle. As described above, the vehicle system may include a single combined vehicle or multiple combined vehicles. The propulsion-generating vehicle 1404 can represent one or more of the propulsion-generating vehicles described and/or shown herein, and the non-propulsion-generating vehicles 1406 can represent one or more of the non-propulsion-generating vehicles described herein.

As shown in FIG. 14, the vehicle system 1400 may be sufficiently long that different vehicles 1404, 1406 travel over different grades in the route 1402 at the same time. The vehicles 1404, 1406A travel on a flat grade (e.g., no incline or decline) at the same time that the vehicle 1406B travels down a decline, the vehicle 1406C travels up an incline, and the vehicle 1406D travels down a larger decline than the vehicle 1406B. Similarly, two or more different vehicles 1404, 1406 may travel over different radii of curvature in the route 1402 at the same time.

In one embodiment, the planning system 1300 can determine asynchronous brake settings for different vehicles 1404 and/or 1406 during travel of the vehicle system 1400. For example, the modeling processors 1310 shown in FIG. 13 can determine the asynchronous brake settings as described herein. The brake settings can be asynchronous when a first vehicle (e.g., 1406B) uses a first brake setting to generate a first amount of braking effort at the same time that another, second vehicle (e.g., 1406D) uses a different, second brake setting to generate a different second amount of braking effort. This can be extended to many different vehicles 1404, 1406 in the same vehicle system 1400 such that many different brake settings are used by many different vehicles 1404, 1406 at the same time. In some embodiments, two or more of the vehicles 1404, 1406 may use the same brake setting at the same time, with one or more other vehicles 1404, 1406 using a different brake setting at that same time. In one example, asynchronous brake settings include different propulsion-generating vehicles in the same vehicle system concurrently applying different brake settings. In another example, asynchronous brake settings include different non-propulsion-generating vehicles in the same vehicle system concurrently applying different brake settings. In another example, asynchronous brake settings include one or more non-propulsion-generating vehicles and one or more propulsion-generating vehicles in the same vehicle system concurrently applying different brake settings. A brake setting may designate whether brakes are to be applied and/or a degree to which the brakes are applied (e.g., how much braking effort is generated).

Figure 15:
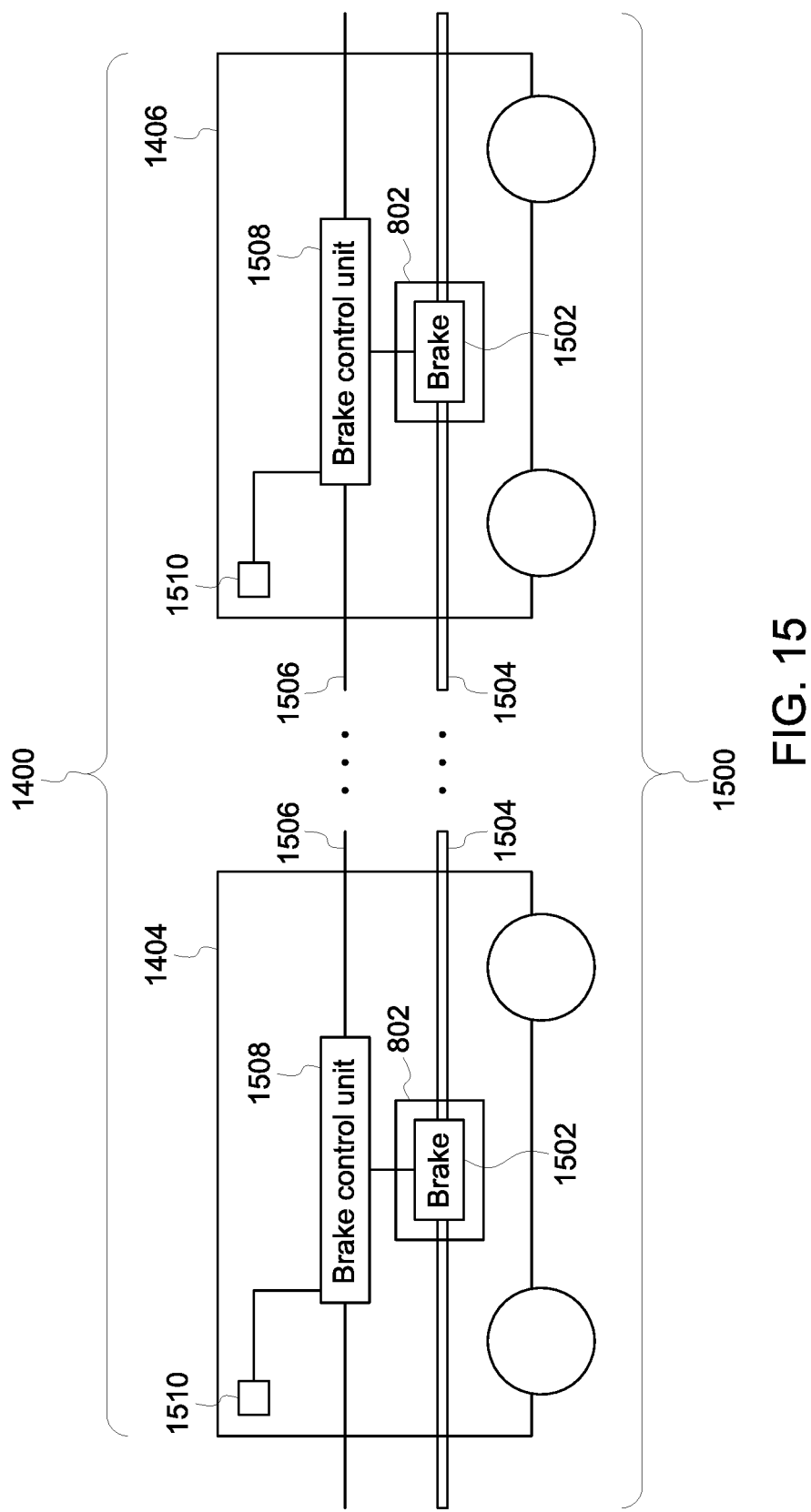
FIG. 15 is a schematic diagram of one embodiment of a braking system of the vehicle system shown in FIG. 14.

FIG. 15 is a schematic diagram of one embodiment of a braking system 1500 of the vehicle system 1400 shown in FIG. 14. The braking system 1500 can extend across the vehicles 1404, 1406 of the vehicle system 1400 with brakes 1502 disposed within the propulsion systems 802 of the vehicles 1404, 1406. The brakes 1502 may be pneumatic brakes in one embodiment. The brakes 1502 can be fluidly coupled with a brake control conduit 1504, such as a brake pipe, for determining when to apply the brakes 1502. The conduit 1504 can be pressurized with air to prevent the brakes 1502 from being applied to slow or stop movement. The pressure in the conduit 1504 can be decreased at one or more locations along the length of the vehicle system 1400 to cause the brakes 1502 in several (or all) vehicles 1404, 1406 to be applied. Increasing the pressure in the conduit 1504 can then release the brakes 1502 after application.

A brake control unit 1508 represents hardware circuitry that includes and/or is connected with one or more processors, such as controllers, microprocessors, application specific integrated circuits, field programmable gate arrays, other integrated circuits, or the like. The brake control unit 1508 controls when the brakes 1502 are applied based on control signals received via a conductive pathway 1506. In one embodiment, the conductive pathway 1506 can include a train line or other cable that extends along the length of the vehicle system 1400 to conduct brake signals. The brake signals can direct the brakes 1502 to engage to slow or stop movement, and the signals may direct the brakes 1502 to release. In one embodiment, one brake control unit 1508 can control brake operations of one or more other brake control units 1508. The brake control unit 1508 that controls the other brake control units 1508 can be referred to as a master brake control unit 1508, and the other brake control units 1508 can be referred to as slave brake control units 1508.

The vehicles 1404, 1406 and/or brake control units 1508 may be associated with unique identifiers. For example, each vehicle 1404, 1406 and/or each control unit 1508 in the vehicle system 1400 may have a unique address or other unique number, alphanumeric string, or the like. The unique identifiers allow for the brakes 1502 to be individually and asynchronously controlled. For example, the master brake control unit 1508 can send brake signals along the pathway 1506 with the signals being addressed to the slave brake control units 1508 that are to engage the brakes 1502 but not addressed to the other slave brake control units 1508.

Although not shown in FIG. 15, the vehicles 1404, 1406 may have one or more other components of the vehicle 800 shown in FIG. 8. For example, one or more of the vehicles 1404, 1406 may include the handling unit 818, processing unit 820, input/output 804, energy management unit 814, effort determination unit 816, and/or communication unit 808 (all shown in FIG. 8). With respect to the vehicles 1404, the vehicles 1404 also may include tractive generating portions of the propulsion system 802, such as one or more engines, alternators, generators, motors, or the like. The brake control unit 1508 may receive brake signals or directions on when to apply the brakes 1502 via the communication unit 808.

The planning system 1300 can determine asynchronous brake settings for the vehicles 1404, 1406. The asynchronous brake settings can be determined as a function of distance along the route 1402. For example, different vehicles 1404, 1406 may have different brake settings at different locations of the vehicle system 1400 and/or vehicles 1404, 1406 along the route 1402. In one aspect, the asynchronous brake settings are determined by the planning system 1300 to smooth an experienced grade beneath the vehicle system 1400. These brake settings can give all vehicles 1404, 1406 the same experienced grade, or experienced grades that are more similar to each other (in terms of angles of incline or decline) than if the brake settings for all vehicles 1404, 1406 were the same.

When a single vehicle 1406B is on a segment of the route 1402 having a grade with a decline and does not generate tractive effort or braking effort, the vehicle 1406B will accelerate down the route 1402 (e.g., toward the vehicle 1406A in the example shown in FIG. 14). The actual grade of such a segment of the route 1402 is negative (e.g., a negative angle or slope). The experienced grade experienced by this vehicle 1406B can be changed to differ from the actual grade. For example, applying the brake 1502 of the vehicle 1406B can prevent the vehicle 1406B from accelerating down the decline in the route 1402. Applying the brake 1502 of the vehicle 1406B can make the experienced grade of the route 1402 beneath the vehicle 1406B flat or flatter (e.g., the value of the grade is closer to zero than the angle of the route 1402) than by not applying the brake 1502.

When a single vehicle 1406C is on a segment of the route 1402 having a grade with an incline and does not generate tractive effort or braking effort, the vehicle 1406C will accelerate down the route 1402 (e.g., in a direction that is opposite of the direction of travel 1401, or in a direction that is toward the vehicle 1406D in the example shown in FIG. 14). The actual grade of such a segment of the route 1402 is positive (e.g., a positive angle or slope). The experienced grade experienced by this vehicle 1406C can be changed to differ from the actual grade. For example, applying the brake 1502 of the vehicle 1406C can prevent the vehicle 1406C from accelerating down the incline in the route 1402 in a direction that is opposite of the direction of travel 1401. Applying the brake 1502 of the vehicle 1406C can make the experienced grade of the route 1402 beneath the vehicle 1406C flat or flatter (e.g., the value of the grade is closer to zero than the angle of the route 1402) than by not applying the brake 1502. Optionally, the vehicle 1406C may generate tractive effort to make the experienced grade flat or flatter than by not generating tractive effort.

With respect to the route 1402 shown in FIG. 14, the route 1402 includes a flat segment 1408, two decline segments 1410, 1414, and an inclined segment 1412. With respect to the direction of travel 1401, the actual grade of the flat segment 1408 is zero or no grade, the actual grade of the decline segment 1410 is a negative grade, the actual grade of the incline segment 1412 is a positive grade, and the actual grade of the decline segment 1414 is a negative grade (that has a larger angle than the decline segment 1410). The planning system 1300 can determine asynchronous brake settings for the different vehicles 1404 and/or 1406 to make the experienced grade experienced by the vehicle system 1400 more flat than by using the same brake settings for all vehicles 1404, 1406 or by not asynchronously applying the brakes 1502. The planning system 1300 can determine the asynchronous brake settings based on the handling parameters determined for the vehicles 1404, 1406. The planning system 1300 can individually assign various brake settings for the brake control units 1508 of the vehicles 1404, 1406 as a function of distance along the route 1402, and communicate the brake settings to the control units 1508. Optionally, the planning system 1300 may assign the vehicles 1404, 1406 to different groups at different locations along the route 1402 and direct the vehicles 1404, 1406 assigned to the same group to use the same brake setting at the same location (which may differ from the brake settings used for one or more other groups of the vehicles 1404, 1406). The assignments of the vehicles 1404, 1406 to the different groups may change at various locations along the route 1402, as described herein.

In one aspect, one or more sensors 1510 may be disposed onboard the vehicles 1404, 1406 for locally determining handling parameters of the vehicles and/or vehicle system. The sensors 1510 can represent accelerometers that output acceleration data representative of actual grades of the section of the route that the sensor 1510 and associated vehicle is traveling over, gyroscopes that output data representative of actual grades of the section of the route that the sensor 1510 and associated vehicle is traveling over, tachometers (or other speed-sensitive sensors, such as global positioning system receivers) that output speed data representative of speeds of the vehicles, distance sensors (e.g., radar, sonar, etc.) that measure distances between neighboring vehicles, or other types of sensors. The data output by the sensors 1510 can be used by the brake control units 1508 to locally determine brake settings for the individual vehicles.

The data generated by the sensors for two different vehicles in the same vehicle system may indicate to the respective brake control units that the vehicles are experiencing different handling parameters (e.g., different actual grades, different coupler forces, etc.). For example, the acceleration data from one sensor may indicate that one vehicle is traveling down a steeper grade than the acceleration data from another sensor. The speed data may indicate that one vehicle is moving faster than another vehicle and, as a result, the coupler between the vehicles is being stretched or compressed. The distance data can indicate that neighboring vehicles are moving closer or farther apart. Based on this data, the brake control units can determine whether to apply the brake of the vehicle. For example, the brake control unit of the vehicle 1404 may determine that the vehicle 1404 is traveling down a decline, that the vehicle 1404 is accelerating, that the vehicle 1404 is moving farther from the trailing vehicle 1406, or the like. In response to this data, the brake control unit onboard the vehicle 1404 may apply the brake of the vehicle 1404, even though the brakes of other vehicles may not be applied at the same time or may be applied with a different setting.

Optionally, the brake control units can communicate the locally obtained data from the sensors to other brake control units. For example, the brake control unit or sensor onboard the vehicle 1404 may communicate the sensor data to the communication unit onboard the vehicle 1404. The communication unit may then communicate the sensor data to another or all other brake control units onboard other vehicles in the same vehicle system (e.g., via the respective communication units). The brake control units can examine the sensor data obtained by an onboard sensor and/or sensors onboard other vehicles to determine the asynchronous brake settings. For example, if a first brake control unit onboard a first vehicle examines data from a second brake control unit onboard a second vehicle and determines that the second vehicle is moving up an incline while the first vehicle is moving down a decline, the second vehicle is accelerating away from the first vehicle or the first vehicle is accelerating away from the second vehicle, etc., then the first brake control unit may engage the brake of the first vehicle while the second brake control unit does not engage the brake of the second vehicle in order to improve the handling parameters of the vehicle system (e.g., by reducing coupler forces, speed differences, experienced grades, etc.). In one aspect, groups of the vehicles (e.g., between virtual fences) may send the sensor data to other groups of the vehicles in the same vehicle system. The groups may share the sensor data to asynchronously control the brake settings of the vehicles in the different groups.

Figure 18:
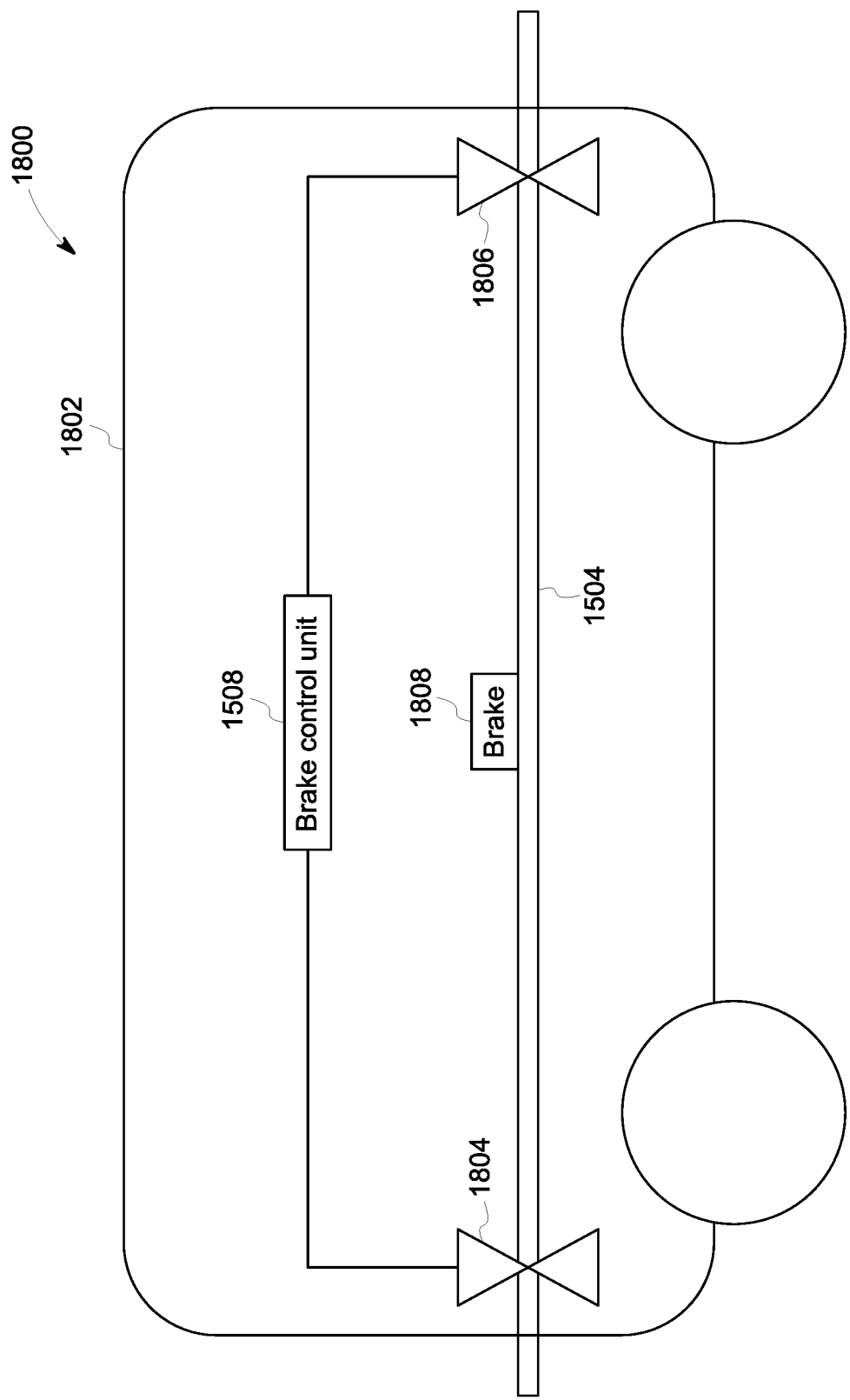
FIG. 18 is a schematic diagram of another embodiment of a braking system of a vehicle system.

FIG. 18 is a schematic diagram of another embodiment of a braking system 1800 of a vehicle system. The braking system 1800 can extend across multiple vehicles 1404, 1406 of the vehicle system 1400 shown in FIG. 14 with brakes 1808 disposed within the propulsion systems 802 of the vehicles 1404, 1406. In FIG. 18, part of the braking system 1800 is shown onboard a single vehicle 1802 that can represent one or more of the vehicles 1404, 1406. The portion of the braking system 1800 shown in FIG. 18 may be replicated in multiple other vehicles in the vehicle system 1400 to provide the braking system 1800.

In contrast to the braking system 1500 shown in FIG. 15, the braking system 1800 includes airbrakes 1808 instead of electronically controlled pneumatic brakes. The airbrakes 1808 can be fluidly coupled with the conduit 1504 and controlled by decreasing pressure in the conduit 1504. The airbrakes 1808 can be disengaged by raising the pressure in the conduit 1504. The control unit 1508 of the braking system 1800 applies or disengages the airbrakes 1808 by controlling valves 1804, 1806 connected with the conduit 1504. The valves 1804, 1806 may be disposed at or near opposing ends of the vehicle 1802. Closing the valves 1804, 1806 prevents air from leaving or entering into the portion of the conduit 1504 that is between the valves 1804, 1806 and opening the valves 1804, 1806 allows air to flow into or out of the portion of the conduit 1504 between the valves 1804, 1806 to other portions of the conduit 1504.

Instead of the control unit 1508 electronically controlling the airbrake 1808, the control unit 1508 can electronically control the valves 1804, 1806 by communicating signals to the valves 1804, 1806 that actuate (e.g., open or close) the valves 1804, 1806. The control unit 1508 can then individually control when the airbrake 1808 of the vehicle 1802 is applied by opening or closing the valves 1804, 1806. For example, during venting of the conduit 1504 to apply the airbrakes 1808 of one or more vehicles that are adjacent to or near the vehicle 1802, the control unit 1508 can close the valves 1804, 1806 to prevent the airbrake 1808 of the vehicle 1802 from being applied. Optionally, during venting of the conduit 1504, the control unit 1508 can open one of the valves 1804 or 1806 to allow the pressure to drop in the portion of the conduit 1504 in the vehicle 1802 (and thereby cause the airbrake 1808 in the vehicle 1802 to be applied) but close the other valve 1806 or 1804 to prevent the venting of the conduit 1504 from reaching another vehicle in the vehicle system.

In one aspect, the control units 1508 onboard different vehicles in a vehicle system can coordinate which valves 1804, 1806 are open and which valves 1804, 1806 are closed in the different vehicles to assign the vehicles to groups, similar to identifying virtual fences to assign the groups of vehicles described above. In connection with the example shown in FIG. 9, the virtual fences 912 may be established by directing the control unit 1508 onboard the vehicle 906A to close a valve 1804, 1806 onboard the vehicle 906A (e.g., that is closer to the fence 912 between the vehicles 906A, 904B than the other valve 1806, 1804) and by directing the control unit 1508 onboard the vehicle 904C to close a valve 1804, 1806 onboard the vehicle 904C (e.g., that is closer to the fence 912 between the vehicles 904C, 906C than the other valve 1806, 1804). The portion of the conduit 1504 that extends through the vehicles 906A, 906B, 904C that are within this group defined by the fences 912 is then shut off or cut off from the other portions of the conduit 1504 in the vehicle system 900. The airbrakes 1808 within this group can then be controlled to be activated (e.g., by dropping the pressure in the conduit 1504 between the fences 912) or deactivated (e.g., by not allowing the pressure in the conduit 1504 between the fences 912 to drop) independent of and separate from other groups of the vehicles.

Optionally, the braking system shown in FIG. 18 can be a communication system of one or more of the vehicle systems described herein. The communication system can extend across multiple vehicles 1404, 1406 of the vehicle system with communication components 1804 disposed within the vehicles 1404, 1406. The communication components can represent in FIG. 18, part of the braking system 1800 is shown onboard a single vehicle 1802 that can represent one or more of the vehicles described herein. The portion of the braking system 1800 shown in FIG. 18 may be replicated in multiple other vehicles in the vehicle system 1400 to provide the braking system 1800.

In contrast to the braking system 1500 shown in FIG. 15, the braking system 1800 includes airbrakes 1808 instead of (or in addition to) electronically controlled pneumatic brakes. The airbrakes 1808 can be fluidly coupled with the conduit 1504 and controlled by decreasing pressure in the conduit 1504. The airbrakes 1808 can be disengaged by raising the pressure in the conduit 1504. The control unit 1508 of the braking system 1800 applies or disengages the airbrakes 1808 by controlling valves 1804, 1806 connected with the conduit 1504. The valves 1804, 1806 may be disposed at or near opposing ends of the vehicle 1802. Closing the valves 1804, 1806 prevents air from leaving or entering the portion of the conduit 1504 that is between the valves 1804, 1806 and opening the valves 1804, 1806 allows air to flow into or out of the portion of the conduit 1504 between the valves 1804, 1806 to other portions of the conduit 1504.

Instead of the control unit 1508 electronically controlling the airbrake 1808, the control unit 1508 can electronically control the valves 1804, 1806 by communicating signals to the valves 1804, 1806 that actuate (e.g., open or close) the valves 1804, 1806. The control unit 1508 can then individually control when the airbrake 1808 of the vehicle 1802 is applied by opening or closing the valves 1804, 1806. For example, during venting of the conduit 1504 to apply the airbrakes 1808 of one or more vehicles that are adjacent to or near the vehicle 1802, the control unit 1508 can close the valves 1804, 1806 to prevent the airbrake 1808 of the vehicle 1802 from being applied. Optionally, during venting of the conduit 1504, the control unit 1508 can open one of the valves 1804 or 1806 to allow the pressure to drop in the portion of the conduit 1504 in the vehicle 1802 (and thereby cause the airbrake 1808 in the vehicle 1802 to be applied) but close the other valve 1806 or 1804 to prevent the venting of the conduit 1504 from reaching another vehicle in the vehicle system.

In one aspect, the control units 1508 onboard different vehicles in a vehicle system can coordinate which valves 1804, 1806 are open and which valves 1804, 1806 are closed in the different vehicles to assign the vehicles to groups, similar to identifying virtual fences to assign the groups of vehicles described above. In connection with the example shown in FIG. 9, the virtual fences 912 may be established by directing the control unit 1508 onboard the vehicle 906A to close a valve 1804, 1806 onboard the vehicle 906A (e.g., that is closer to the fence 912 between the vehicles 906A, 904B than the other valve 1806, 1804) and by directing the control unit 1508 onboard the vehicle 904C to close a valve 1804, 1806 onboard the vehicle 904C (e.g., that is closer to the fence 912 between the vehicles 904C, 906C than the other valve 1806, 1804). The portion of the conduit 1504 that extends through the vehicles 906A, 906B, 904C that are within this group defined by the fences 912 is then shut off or cut off from the other portions of the conduit 1504 in the vehicle system 900. The airbrakes 1808 within this group can then be controlled to be activated (e.g., by dropping the pressure in the conduit 1504 between the fences 912) or deactivated (e.g., by not allowing the pressure in the conduit 1504 between the fences 912 to drop) independent of and separate from other groups of the vehicles.

Figure 16:
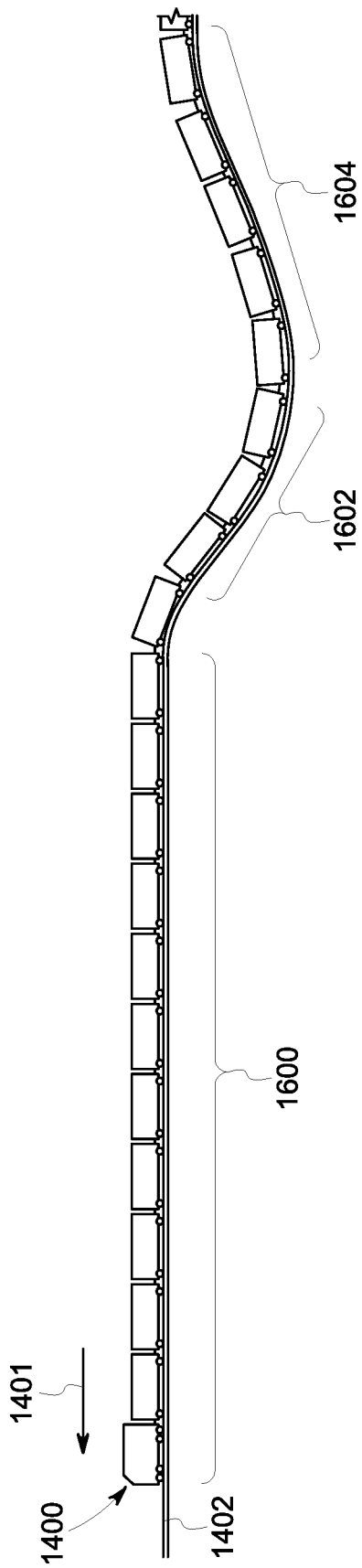
FIG. 16 illustrates experienced grades of the route shown in FIG. 14 according to one example.

FIG. 16 illustrates experienced grades of the route 1402 according to one example of asynchronous brake application. The route 1402 is shown in FIG. 16 so that the grades actually experienced by the vehicles 1404, 1406 differ from the actual grades of the route 1402 shown in FIG. 14. The planning system 1300 can determine asynchronous brake settings for the group assignments of the vehicles 1404, 1406 and/or determine asynchronous brake settings for individual vehicles 1404, 1406 so that the actual grades in the route 1402 as shown in FIG. 14 are experienced by the vehicles 1404, 1406 as the experienced grades in the route 1402 shown in FIG. 16. For example, the decline segment 1410 of the route 1402 shown in FIG. 14 becomes a flat segment 1600 in FIG. 16, such as by directing the vehicles 1404, 1406 on the decline segment 1410 to apply the brakes 1502 of those vehicles 1404, 1406. The incline segment 1412 of the route 1402 shown in FIG. 14 becomes an incline segment 1602 in FIG. 16 with a smaller angle of incline, such as by directing the vehicles 1404, 1406 on the incline segment 1412 to release the brakes 1502 of those vehicles 1404, 1406 and/or to generate tractive effort. The decline segment 1414 of the route 1402 shown in FIG. 14 becomes a decline segment 1604 in FIG. 16 with a smaller angle of decline, such as by directing the vehicles 1404, 1406 on the decline segment 1414 to apply the brakes 1502 of those vehicles 1404, 1406.

The asynchronous brake settings that are determined by the planning system 1300 can be the designated operational settings or parameters described herein. The designated operational settings can be computed to improve handling (e.g., control) of the vehicle system 1400. For example, the designated operational settings can be determined to reduce the frequency at which throttle notch settings and/or brake settings are changed, to reduce abrupt jerking movements of the vehicle system 100 or segments of the vehicle system 100, to reduce forces exerted on the couplers 108, and the like. The asynchronous brake settings may be determined to improve handling of the vehicle system 1400 during a trip, while also achieving one or more trip objectives and while remaining within operating constraints on the trip, as described above. The asynchronous brake settings may be included in a trip plan for the vehicle system 1400.

The asynchronous brake settings may be determined from a total required braking effort of the vehicle system. For example, the total brake force required to slow the vehicle system by a designated speed difference or to stop the vehicle system may be based on the size of the vehicle system, the weight of the vehicle system, the type of brakes of the vehicle system, the grade of the route, and the like. This total brake force may be calculated from physics models of the vehicle system, may be based on previous trips of the same or other vehicle systems, or the like. In one aspect, the total brake force is determined from a trip plan of the vehicle system. For example, the trip plan may designate the same brake setting for the vehicles to generate a total required brake force. The total required brake force may then be divided up among the vehicles in the vehicle system, with the brakes on different vehicles being engaged at different settings to generate the total required brake force while improving the handling parameters of the vehicle system relative to all the vehicles using the same brake setting. Optionally, the total required brake force may be based on an operator-initiated brake setting. For example, if the operator of the vehicle system engages an input device to direct the vehicles to engage the brakes at a designated setting, the total brake force generated by this setting may be divided up among the different vehicles such that two or more of the vehicles use different brake settings while still yielding the total brake force that would have been generated by the operator-initiated brake setting.

Figure 17:
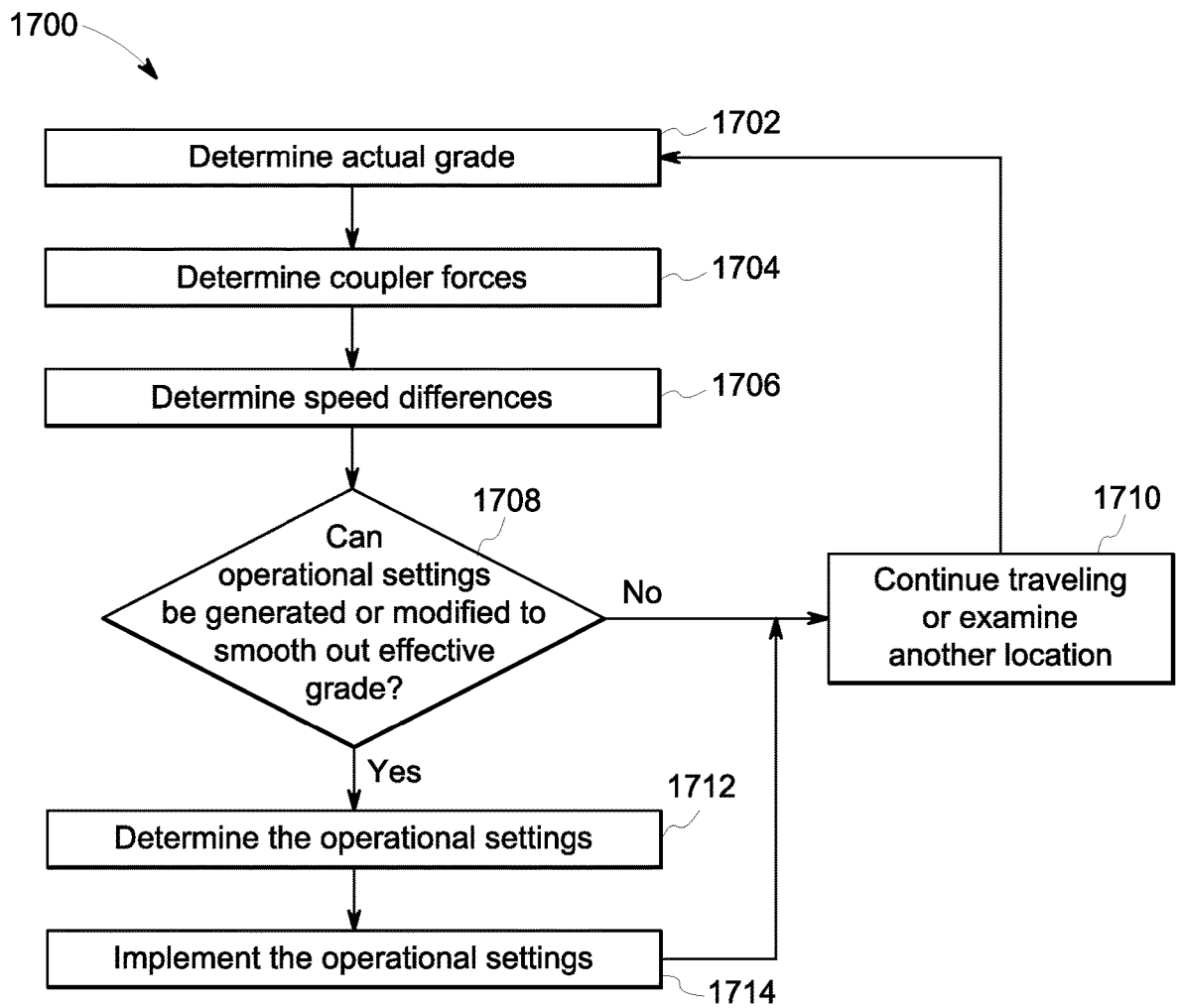
FIG. 17 illustrates a flowchart of one embodiment of a method for determining asynchronous brake settings for a trip of a vehicle system.

FIG. 17 illustrates a flowchart of one embodiment of a method 1700 for determining asynchronous brake settings for a trip of a vehicle system. The method 1700 may be performed by the planning system 1300 and/or control system 806 described above. The asynchronous brake settings can be determined before a vehicle system begins a trip along a route and/or during movement of the vehicle system along the route during the trip. The asynchronous brake settings can be determined for different locations along the route.

At 1702, an actual grade along a route is determined. The actual grade can be determined for a selected location along the route (if the asynchronous brake settings are being determined for an upcoming trip) and/or a current location along the route. The method 1700 can iteratively proceed through several locations along the route with the asynchronous brake settings being determined for the different locations. The actual grade can be obtained from a memory (e.g., the memory device 1304), can be communicated from an off-board source (e.g., a dispatch facility), can be input by an operator (e.g., via the input device 1302 or input/output device 804), and/or can be measured by one or more sensors onboard the vehicles (e.g., accelerometers onboard one or more of the vehicles described herein, which may be represented by the input/output device 804 shown in FIG. 8).

At 1704, coupler forces are determined. The coupler forces can be determined as the coupler parameters, the natural forces exerted on the couplers, or the like, as described above. The coupler forces can be determined for the vehicles for which the asynchronous brake settings are being determined at the selected location or at a current location along the route. At 1706, speed differences between the vehicles are determined. The speed differences can be determined between neighboring vehicles at the selected location along the route or the current location along the route. The speed differences can be calculated from the designated operational settings of a trip plan for the selected location, from speed sensors of the vehicles at the current location along the route, or the like. The speed difference for a first vehicle can be the difference in speeds between the first vehicle and the vehicle ahead of the first vehicle along a direction of travel and the difference in speeds between the first vehicle and the vehicle behind the first vehicle along the direction of travel.

At 1708, a determination is made as to whether the operational settings of the vehicles in the vehicle system can be generated or modified to smooth out the experienced grade experienced by the vehicles. This determination can involve examination of several factors. For example, the actual grade of the route beneath one or more vehicles at the selected location may be examined. If the angle of incline or decline in the actual grade exceeds a designated threshold (e.g., the absolute value of the actual grade exceeds a designated threshold, such as 0.5%, 1%, 2%, 3%, etc.), then the operational settings of the vehicle system may be able to be generated or modified to smooth out the experienced grade. The operational settings can include determining a new or different brake setting for one or more individual vehicles disposed above the grade at the selected location. As described herein, the brake setting for the individual vehicles at the selected location may differ from the brake settings for one or more other vehicles in the same vehicle system at other locations along the route, but at the same time.

As another example, the coupler forces for one or more vehicles at the selected location can be examined. The coupler forces may be calculated based on the actual grade and the asynchronous brake settings determined based on the coupler forces that are calculated. The coupler forces between two or more vehicles at the selected location may be examined to determine if the actual grade is sufficiently steep and/or changes enough to cause the calculated coupler forces to exceed the designated threshold. For example, very steep actual grades may cause the calculated coupler forces to be too large. As another example, changes in the grade (e.g., travel over a peak or valley in the route) may cause the calculated coupler forces to be too large. Asynchronous brake settings may be determined to reduce the coupler forces that are calculated.

Optionally, the coupler forces can be examined to ensure that individually changing (or not changing) the brake settings for one or more of the vehicles will not cause the coupler forces associated with the vehicles will not become too high to cause separation of the vehicle system into two or more separate parts or to cause two vehicles to contact each other. For example, if the method 1700 determines to change the brake settings for one or more vehicles at the selected location along the route based on the actual grade, then the method 1700 may determine the coupler forces that are expected to be exerted on the couplers of those vehicles using the asynchronous brake settings. If the coupler force calculated for one of the couplers of a vehicle at the selected location exceeds a designated threshold (e.g., 100,000 kilograms of tensile or compressive force, 90,000 kilograms of tensile or compressive force, or another threshold), then the calculated coupler force may be too large and the brake settings for one or more of those vehicles may not be changed. If the calculated coupler force does not exceed the threshold, then the asynchronous brake settings may be changed.

As another example, the speed differences between two or more vehicles at the selected location can be examined. The neighboring velocity parameters for the vehicles may be determined (as described above). The neighboring velocity parameters can be compared to one or more thresholds to determine if asynchronous brake settings need to be determined or modified to reduce the neighboring velocity parameters. For example, if neighboring vehicles at the selected location are traveling at significantly different speeds (e.g., the speeds differ by more than 3, 5, 10, etc. kilometers per hour), then the brake setting for one or more of these vehicles may be modified or determined to reduce this speed difference at the selected location.

Optionally, instead of or in addition to determining whether brake settings for one or more individual vehicles can be changed to smooth out the experienced grade at the selected location, the method 1700 may determine whether the tractive efforts of one or more vehicles may be modified at the selected location to smooth out the experienced grade. For example, instead of directing a vehicle to apply brakes during travel over an uphill portion of the route, the method 1700 may determine that directing such a vehicle to generate more tractive effort may smooth out the experienced grade experienced by the vehicle.

If the operational settings for one or more vehicles can be modified to smooth out (e.g., reduce) the differences in experienced grade among vehicles at the selected location along the route (e.g., relative to the actual grade), then flow of the method 1700 can proceed to 1712. But, if the operational settings cannot be modified to smooth out the experienced grade, then flow of the method 1700 can proceed toward 1710. For example, the actual grade may have a relatively small incline or decline, the coupler forces resulting from changing the operational settings may become too large, and/or the neighboring velocity parameters resulting from changing the operational settings may become too large.

At 1710, the vehicle system may continue traveling along the route and/or another location along the route may be examined. For example, if the asynchronous brake settings (and/or other operational settings) are being examined during movement of the vehicle system, then the method 1700 may return to 1702, 1704, and/or 1706 to continue examining actual grades, coupler forces, and/or speed differences for additional locations over which the vehicle system travels. As another example, the method 1700 may return to 1702, 1704, and/or 1706 to examine actual grades, coupler forces, and/or speed differences for additional selected locations for an upcoming trip of the vehicle system.

At 1712, operational settings that smooth out the actual grade at the selected location are determined. The method 1700 may determine what brake settings for individual vehicles can cause the experienced grade experienced by the individual vehicles to have a smaller incline or decline than the actual grade. As described above, for vehicles traveling or scheduled to travel down a decline at the selected location, one or more of the vehicles may be directed to apply brakes while one or more other vehicles may not apply brakes. For vehicles traveling or scheduled to travel up an incline, one or more of the vehicles may directed to not apply brakes while one or more other vehicles are directed to apply brakes. Optionally, the operational settings that are determined can include throttle settings that direct the vehicles to generate tractive effort that causes the experienced grade to be flatter than the actual grade.

At 1714, the operational settings that are determined are implemented. In one aspect, implementation can include sending signals (e.g., using an ECP airbrake system's signals) to the brake control units of the vehicles that are to apply brakes and not sending the signals to other brake control units during movement of the vehicle system along the route. In another aspect, implementation can include creating or modifying a trip plan to include the operational settings that are determined for an upcoming trip of the vehicle system or for an upcoming segment of a trip plan for a trip currently being traveled by the vehicle system. In another aspect, the brake control unit onboard one or more of the vehicles can translate (e.g., change) an operator-input command for braking in the vehicle system. For example, an operator onboard one or more vehicles in the vehicle system can manually input a brake setting for the entire vehicle system using one or more input and/or output devices 804. The planning system 1300 and/or brake control unit 1508 onboard the same or one or more other vehicles can examine the manually input brake setting and compare this setting to the operational setting determined at 1712 for the same location along the route. If the manually input brake setting differs from the operational setting determined at 1712 (e.g., the operator commands a brake setting of two while the operational setting determined at 1712 is a brake setting of four for some vehicles, two for other vehicles, and zero for other vehicles), then the planning system 1300 and/or brake control unit 1508 may modify the operator input command to individually direct the vehicles to apply the brake settings determined at 1712.

Flow of the method 1700 can return to 1710 so that the method 1700 can proceed to another selected location to determine whether to create and/or modify operational settings to decrease the experienced grade of the route. The method 1700 may proceed in a loop wise manner determining various information to determine whether to change operational settings (e.g., asynchronous brake settings) of different vehicles in the same vehicle system to make the experienced grades experienced by the different vehicles to be flatter than the actual grades of the route over which the different vehicles are traveling. The method 1700 may determine these operational settings during movement of the vehicle system along the route, and/or may determine the operational settings for an entire trip before the vehicle system begins traveling or at least an upcoming segment of the trip.

Traveling in a trip using asynchronous brake settings can provide several benefits relative to traveling with the same vehicle system along the same route using the same brake settings for all vehicles in the vehicle system. The asynchronous brake settings can, at times, direct all vehicles to apply the same brake settings but, at other times, direct different vehicles to apply different brake settings. Using different brake settings in different vehicles at the same time can improve handling of the vehicles, such as by improving one or more of the handling parameters described herein relative to traveling using the same brake settings. The different brake settings may be applied across the vehicle system. For example, in a train, different brake settings may concurrently be used by rail cars and locomotives in the same train.

For example, in addition or as an alternate to determining different brake settings to be concurrently applied by different vehicles in the same vehicle system to smooth out an experienced grade of the vehicles, the different brake settings may be determined to improve (e.g., increase or decrease, as appropriate) handling parameters of the vehicle system and/or route. As described above, one example of handling parameters is coupler parameters. The asynchronous brake settings may be determined to reduce the coupler parameters (e.g., the energies stored in the couplers) in a vehicle system relative to the vehicle system using synchronous brake settings. The coupler parameters of a vehicle system may be calculated by as described herein prior to or during a trip using different sets of proposed asynchronous brake settings. The different sets can represent different options or alternates for the asynchronous brake settings. One or more of these sets may result in the coupler parameters of the vehicle system being smaller than one or more (or all) other sets of asynchronous brake settings.

As described above, the handling parameters optionally can include the terrain excitation parameters, node parameters, neighboring velocity parameters, and/or momentum. Different terrain excitation parameters, node parameters, neighboring velocity parameters, and/or momenta can be calculated for different sets of proposed asynchronous brake settings. The set of asynchronous brake settings that result in the terrain excitation parameters, node parameters, neighboring velocity parameters, and/or momenta being reduced relative to one or more (or all) other sets of asynchronous brake settings) may be selected for use in controlling the vehicle system.

In one embodiment, the handling parameters may be predicted (e.g., calculated prior to a trip or prior to traveling over a segment of a route) or may be actually measured (e.g., by sensors measuring coupler forces, inter-car separation distances, vehicle speeds, vehicle accelerations, etc.) and the asynchronous brake settings may be calculated to achieve a goal that is a function of the predicted or measured values. For example, one goal may be to reduce collision forces between neighboring vehicles. These forces may be a function of the coupler forces (with the collision forces increasing for larger compressive coupler forces), the separation distances (with the collision forces increasing for separation distances that decrease at more rapid rates than other separation distances), vehicle speeds (with the collision forces increasing for neighboring vehicles having mismatched vehicle speeds relative to other vehicle speeds), and/or vehicle accelerations (with the collision forces increasing for neighboring vehicles having accelerations toward each other relative to other accelerations). Different sets of the asynchronous brake settings may be used to calculate the different coupler forces, as described above. The set of asynchronous brake settings that results in a decrease in the coupler forces relative to some or all the potential sets of asynchronous brake settings may be selected for implementation with the vehicle system.

Another example of a goal may be to dampen traveling waves of forces through the vehicle system. These waves of forces may be a function of the coupler forces (with coupler forces moving in waves more when the coupler forces change more rapidly or have more zero crossings relative to other coupler forces), the separation distances (with the forces moving in waves more for distances that change more rapidly relative to other distances), vehicle speeds (with the forces moving in waves more for speeds that change more rapidly or have more zero crossings relative to other speeds), and/or vehicle accelerations (with the forces moving in waves more for accelerations that change more rapidly or have more zero crossings relative to other accelerations). Different sets of the asynchronous brake settings may be used to calculate whether the forces move in waves and the speed at which the waves of forces move in the vehicle system. The set of asynchronous brake settings that results in a decrease in the number and/or speed of force waves relative to some or all the potential sets of asynchronous brake settings may be selected for implementation with the vehicle system.

The prediction and/or calculation of the handling parameters based on different sets of asynchronous brake settings may be performed prior to a trip (e.g., based on a trip plan, route database, trip manifest, etc.) and/or during movement along a route for the trip (e.g., based on sensor measurements, route grades, vehicle speeds, etc.).

In one embodiment, the systems and methods described herein can use MPC to determine the times and/or locations along a route being traveled by the vehicle system to change the asynchronous brake settings of the vehicles to improve the handling parameters of the vehicle system while satisfying other constraints (e.g., limitations on the brake settings, limitations on the frequency of changes in the brake settings, and the like). MPC can include calculating or estimating handling parameters for the vehicle system at different locations and/or times along a route for an upcoming portion of a trip for different sets of asynchronous brake settings. These handling parameters may be calculated or estimated multiple times for the same location of the vehicle system and/or time along the trip, with different handling parameters calculated for different sets of the asynchronous brake settings. The handling parameters are predicted for an upcoming trip (e.g., prior to the vehicle system beginning to move for the trip) and/or for an upcoming segment of the trip (e.g., while the vehicle system is moving during the trip). Different sets of asynchronous brake settings may be examined and compared with each other to identify the set of asynchronous brake settings that improve (e.g., increase or reduce, as appropriate) the handling parameters the most, more than one or more other sets (but not necessarily all other sets), or by at least a designated threshold amount.

In another embodiment, the systems and methods described herein can determine the speeds of one or more of the vehicles in a vehicle system (e.g., using the sensors 1510) and calculate a braking effort of the vehicles that dampens movement dynamics of the vehicle system. For example, a movement dynamic index may be calculated as:

$$F_m = -g^*v \qquad \text{(Equation \#29)}$$

where $F_m$ represents a force exerted on the vehicle system, which is one example of a movement dynamic index, g represents a control gain of the vehicle system, and v represents a relative velocity between two or more of the vehicles. For example, v can represent a difference in velocity between neighboring vehicles. Multiple forces can be calculated for different sets or groups of vehicles in the vehicle system for different velocity differences between the vehicles. The different velocity differences can be determined or controlled by assigning asynchronous brake settings to the vehicles. The asynchronous brake settings that result in the forces being reduced for some or all the sets or groups of the vehicles relative to one or more (or all) other asynchronous brake settings may be selected for implementation with the vehicle system. Stated differently, a command used to control the throttle and/or brake of an individual vehicle or a group of vehicles can be generated that is proportional to the velocity of the vehicle or vehicles, but in the opposite direction of movement. As this command increases in magnitude, larger retarding forces are generated to stop or slow movement of the vehicle or vehicles. In one aspect, control gain (g) can be determined and be negatively proportional to the relative vehicle velocity between neighboring vehicles to control the force $F_m$ that is exerted.

In one embodiment, a method includes determining handling parameters of one or more of a route or a vehicle system at different locations along a length of the vehicle system having plural vehicles traveling together along the route, determining asynchronous brake settings for two or more of the vehicles in the vehicle system based on the handling parameters that are determined, and controlling brakes of the two or more vehicles according to the asynchronous brake settings.

In one aspect, the handling parameters that are determined include one or more of actual grades of the route, estimated forces exerted on one or more of the vehicle system or couplers within the vehicle system, actual forces exerted on the one or more of the vehicle system or the couplers, energies stored in the couplers, distances between neighboring vehicles in the vehicle system, and/or momentum of one or more vehicles in the vehicle system.

In one aspect, the brakes are air brakes, determining the asynchronous brake settings includes determining different settings for the air brakes of the two or more vehicles, and controlling the brakes includes concurrently applying the different brake settings for the air brakes.

In one aspect, the handling parameters include actual grades of the route and wherein determining the handling parameters includes obtaining the actual grades from one or more of a memory that stores the actual grades for different locations along the route, an operator of the vehicle system, and/or an accelerometer onboard the vehicle system.

In one aspect, controlling the brakes of the two or more vehicles includes applying the brakes according to the asynchronous brake settings such that one or more of the handling parameters are improved relative to controlling the brakes of the two or more vehicles using a common brake setting for the two or more vehicles.

In one aspect, the handling parameters include one or more coupler forces to be exerted on the two or more vehicles based at least in part on actual grades of the route. The asynchronous brake settings that are determined can be based on the one or more coupler forces.

In one aspect, the method includes determining one or more speed differences between the two or more vehicles at the different locations along the route. The asynchronous brake settings that are determined can be based on the one or more speed differences.

In one aspect, the brakes include electronically controlled pneumatic brakes, and controlling the brakes of the two or more vehicles includes communicating signals that are uniquely addressed to the electronically controlled pneumatic brakes of the two or more vehicles.

In one aspect, the brakes include airbrakes fluidly coupled with a conduit extending along the vehicle system, and controlling the brakes includes closing valves onboard at least one of the vehicles in the vehicle system to prevent a pressure drop propagating through the conduit from causing the airbrakes onboard the at least one of the vehicles from activating while the airbrake onboard one or more other vehicles are activated from the pressure drop in the conduit.

In one aspect, determining the asynchronous brake settings includes determining the asynchronous brake settings based on one or more of a total required braking effort of the vehicle system or an operator-initiated braking command.

In one aspect, the vehicle system travels along the route according to a trip plan that designates operational settings of the vehicle system as a function of one or more of time or distance along the route. The method also can include one or more of creating or modifying the trip plan to include the asynchronous brake settings that are determined.

In one aspect, controlling the brakes of the two or more vehicles according to the asynchronous brake settings improves the handling parameters while the vehicle system operates within operating constraints of a trip of the vehicle system.

In one embodiment, a planning system includes one or more processors configured to determine handling parameters of a route at different locations along a length of a vehicle system having plural vehicles traveling together along the route, determine asynchronous brake settings for two or more of the vehicles in the vehicle system based on the handling parameters that are determined, and control brakes of the two or more vehicles according to the asynchronous brake settings.

In one aspect, the handling parameters include one or more of actual grades of the route, estimated forces exerted on one or more of the vehicle system or couplers within the vehicle system, actual forces exerted on the one or more of the vehicle system or the couplers, energies stored in the couplers, distances between neighboring vehicles in the vehicle system, and/or momentum of one or more vehicles in the vehicle system.

In one aspect, the brakes are air brakes, and the one or more processors are configured to determine the asynchronous brake settings by determining different settings for the air brakes of the two or more vehicles and are configured to control the brakes by concurrently applying the different brake settings for the air brakes.

In one aspect, the one or more processors are configured to control the brakes of the two or more vehicles by directing brake control units of the two or more vehicles to apply the brakes according to the asynchronous brake settings such that one or more handling parameters of the vehicle system are improved relative to controlling the brakes of the two or more vehicles using a common brake setting for the two or more vehicles.

In one aspect, the brakes include electronically controlled pneumatic brakes, and the one or more processors are configured to control the brakes of the two or more vehicles by communicating signals that are uniquely addressed to the electronically controlled pneumatic brakes of the two or more vehicles.

In one aspect, the brakes include airbrakes fluidly coupled with a conduit extending along the vehicle system, and the one or more processors are configured to control the brakes by closing valves onboard at least one of the vehicles in the vehicle system to prevent a pressure drop propagating through the conduit from causing the airbrakes onboard the at least one of the vehicles from activating while the airbrake onboard one or more other vehicles are activated from the pressure drop in the conduit.

In one aspect, the vehicle system travels along the route according to a trip plan that designates operational settings of the vehicle system as a function of one or more of time or distance along the route. The one or more processors can be configured to one or more of create or modify the trip plan to include the asynchronous brake settings that are determined.

In one embodiment, a method includes determining handling parameters of one or more of a vehicle system or a route beneath different vehicles of the vehicle system at different locations along the route and, for each of the different locations along the route, determining different brake settings to be concurrently applied by air brakes of the different vehicles based on the handling parameters. The method also can include activating the air brakes of the different vehicles according to the different brake settings at each of the different locations along the route.

In one aspect, activating the air brakes according to the different brake settings at each of the different locations causes experienced grades experienced by the different vehicles to be flatter than the actual grades of the route.

Figure 19:
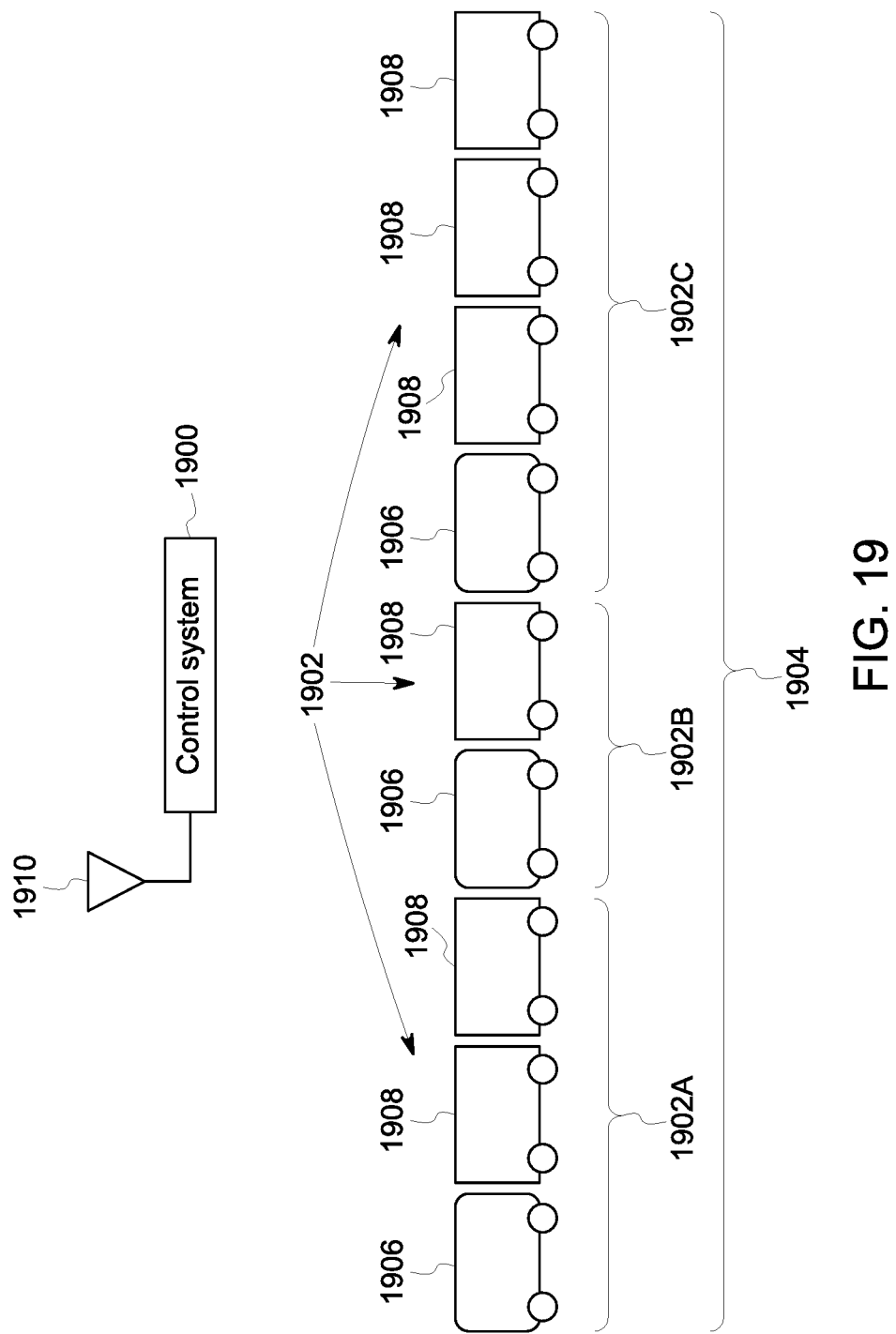
FIG. 19 illustrates one embodiment of a vehicle convoy control system.

FIG. 19 illustrates one embodiment of a vehicle convoy control system 1900. The vehicle control system 1900 represents hardware circuitry that includes and/or is connected with one or more processors (e.g., one or more microprocessors, field programmable gate arrays, and/or integrated circuits) that operate to dictate or otherwise determine how to combine and/or divide up different vehicle systems 1902 (e.g., vehicle systems 1902A-C) into larger or smaller vehicle system convoys 1904. Each of the vehicle systems 1902 can represent one or more of the vehicle consists 110, 112, 114, 910 described above. For example, each vehicle system 1902 can include a propulsion-generating vehicle 1906 (which can represent one or more of the vehicles 104, 304, 904, 1404) and one or more non-propulsion-generating vehicles 1908 (which can represent one or more of the vehicles 106, 306, 906, 1406). Optionally, one or more (or all) of the vehicle systems 1902 can be formed from a single vehicle (e.g., a combined vehicle, as described above). The vehicle systems 1902 having multiple vehicles can be referred to as multi-unit vehicle systems, while the vehicle systems 1902 formed of a single vehicle can be referred to as a single-unit vehicle system 1902. The term "vehicle system" can refer to single- or multi-unit vehicle systems.

The vehicles 1906, 1908 can be mechanically coupled with each other within the corresponding vehicle system 1902 (e.g., by one or more couplers 108). Optionally, the vehicles 1906, 1908 may not be mechanically coupled with each other within the corresponding vehicle system 1902, but may be logically coupled with each other, as described herein. The vehicles 1906 can be propulsion-generating rail vehicles (e.g., locomotives) and the vehicles 1908 can be non-propulsion-generating rail vehicles (e.g., rail cars). Alternatively, the vehicles 1906 can be other, non-rail propulsion-generating vehicles, such as trucks, automobiles, mining vehicles, or the like, and the vehicles 1908 can be other, non-rail vehicles that do not generate propulsion, such as trailers, mining shovels or scoops, or the like. The number and arrangement of vehicle systems 1902 in the convoy 1904 and the number and arrangement of the vehicles 1906, 1908 in the vehicle systems 1902 and the convoy 1904 shown in FIG. 19 are provided as one example, and a different number and/or arrangement of vehicle systems 1902 in the convoy 1904 and vehicles 1906, 1908 in the vehicle systems 1902 and convoy 1904 may be used.

The control system 1900 includes or is connected with a communication unit 1910, which represents hardware transceiving circuitry that includes and/or is connected with one or more processors. The communication unit 1910 can include or be connected with antennas, modems, or the like, for communicating with communication units 808 onboard the vehicles 1906. The control system 1900 determines which vehicle systems 1902 are included in the convoy 1904 for different segments of a trip between locations. For example, the control system 1900 can determine how different vehicle systems 1902 connect with each other (e.g., logically and/or mechanically) between different locations in a transportation network. A convoy 1904 can include a single vehicle system 1902 or multiple vehicle systems 1902. A vehicle system 1902 can be formed from a single vehicle 1906, or multiple vehicles 1906. A vehicle system 1902 can include one or more vehicles 1908, or may not include any vehicles 1908.

The control system 1900 determines which vehicles or vehicle systems to add together to form a convoy 1904, and/or which vehicles or vehicle systems to add to or remove from a convoy 1904. At times, travel of vehicle systems 1902 in the convoy 1904 can provide advantages in terms of reduced fuel or energy consumption (e.g., due to the vehicle systems 1902 drafting each other to reduce wind drag), improved functionality (e.g., via shared sensor data, shared braking effort, alternating which vehicles propel the convoy 1904, etc.), or the like. As described herein, the control system 1900 can determine which vehicle systems 1902 to include in a convoy 1904 based on the advantages that may arise from adding or removing vehicle systems 1902 to or from the convoy 1904.

The vehicle systems 1902 in a convoy 1904 can be mechanically coupled with each other by connecting neighboring or adjacent vehicle systems 1902 with couplers 108. The vehicle systems 1902 in a convoy 1904 can be logically coupled with each other by the vehicle control systems onboard the vehicle systems 1902 (e.g., the control systems 806) communicating with each other to coordinate relative movements of the vehicle systems 1902 so that the vehicle systems 1902 move together along a route without the vehicle systems 1902 necessarily being mechanically coupled with each other. This type of connection optionally can be referred to as communicative coupling.

In one embodiment, each multi-unit vehicle system 1902 includes a propulsion-generating vehicle 1906 at a leading end of the vehicle system 1902 along a direction of travel. The vehicle systems 1902 that are combined into the convoy 1904 can be coupled such that the vehicle 1906 at the leading end of at least one of the vehicle systems 1902 is coupled with a trailing end of another vehicle system 1902. Alternatively, one or more of the multi-unit vehicle systems 1902 can have a propulsion-generating vehicle in another location, such as the middle or trailing end of the vehicle system 1902. The middle-location propulsion-generating vehicle can pull and/or push other vehicles in the multi-unit vehicle system 1902, while the trailing end-location propulsion-generating vehicle can push other vehicles in the multi-unit vehicle system 1902.

The operational settings of the vehicles 1906 throughout the convoy 1904 can be determined by positioning virtual fences between the vehicle systems 1902 forming the convoy 1904. The virtual fences can be established for a convoy 1904, but changed each time a vehicle system 1902 is removed from or added to the convoy 1904. For example, the vehicles 1906 within each vehicle system 1902 may operate using the same operational settings, which may be the same or may differ from the vehicles 1906 in one or more other vehicle systems 1902 in the convoy 1904. As a result, the convoy 1904 can operate with synchronous or asynchronous operational settings. Each of the vehicle systems 1902 in a convoy 1904 can operate independent of the other vehicle systems 1902 in the same convoy 1904. For example, the throttle settings and/or brake settings of the vehicle system 1902A may not be based on the throttle settings and/or brake settings of the vehicle system 1902B or the vehicle system 1902C.

Figure 20:
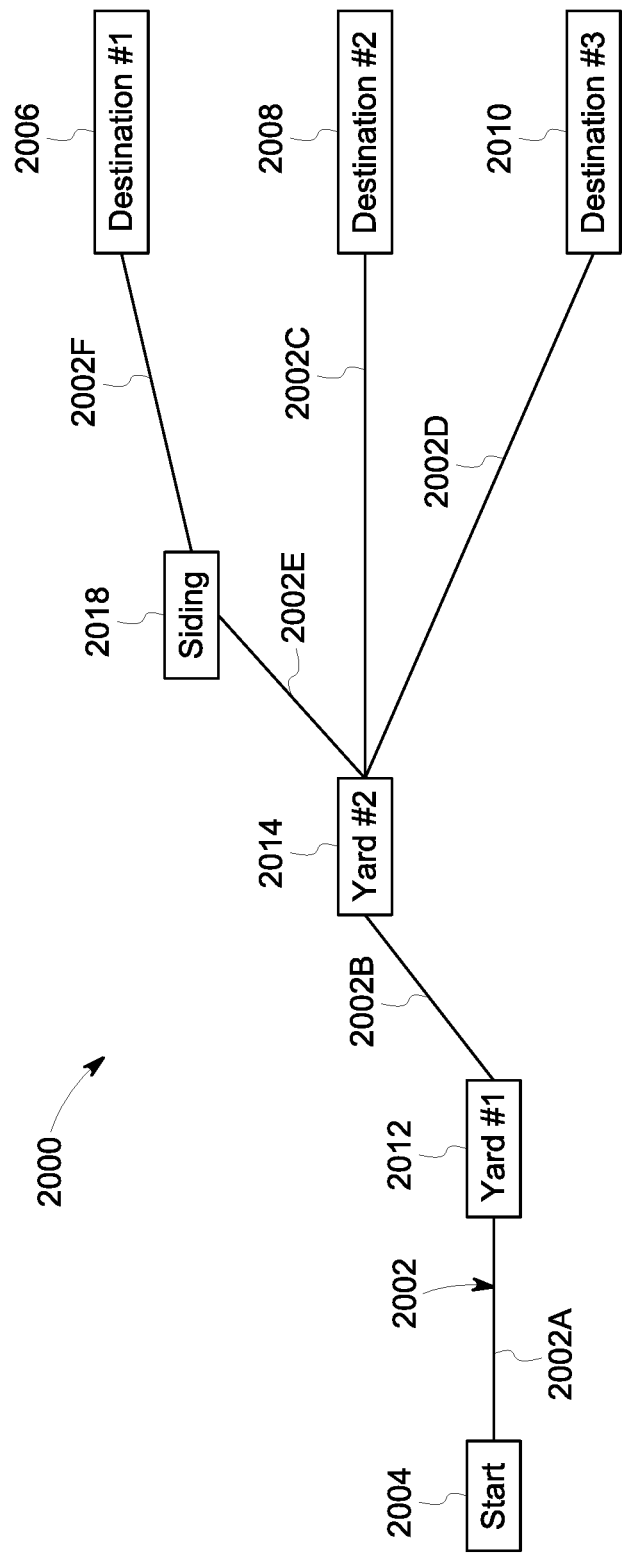
FIG. 20 schematically illustrates how the control system shown in FIG. 19 can change which vehicle systems are included in one or more convoys during travel between locations in a transportation system.

FIG. 20 schematically illustrates how the control system 1900 can change which vehicle systems 1902 are included in one or more convoys 1904 during travel between locations in a transportation system 2000. The transportation system 2000 is formed from several interconnected routes 2002 (e.g., one or more of the routes 102, 302, 902, 1402) extending between various locations, such as a starting location 2004 for a convoy 1904 ("Start" in FIG. 20), destination locations 2006, 2008, 2010 for different vehicle systems 1902 ("Destination #1," "Destination #2," and "Destination #3" in FIG. 20), and various intermediate locations. Examples of the intermediate locations can include vehicle yards 2012, 2014 ("Yard #1" and "Yard #2" in FIG. 20) and sidings 2018. The vehicle yards 2012, 2014 can represent rail yards, warehouses, or the like. The siding 2018 can represent a section of the routes 2002 that extends alongside a route 2002 between two or more of the locations 2004, 2006, 2008, 2010, 2012, 2014, but that does not itself extend from one of the locations 2004, 2006, 2008, 2010, 2012, 2014 to another location 2004, 2006, 2008, 2010, 2012, 2014.

The control system 1900 can examine the locations to which various vehicles 1906, 1908 in the vehicle systems 1902 are to travel to in the transportation system 2000. These locations can be determined from schedules of the vehicles 1906, 1908 and/or vehicle systems 1902, from manifests of the vehicles 1906, 1908 and/or vehicle systems 1902, from operator input, or the like. For example, the control system 1900 can determine that cargo carried by the vehicles 1908 in the vehicle system 1902A is to travel to the first destination 2006, the vehicle 1908 in the vehicle system 1902B is to travel to the second destination 2008, and the vehicles 1908 in the vehicle system 1902C are to travel to the third destination 2010. One or more additional vehicles 1908 of other vehicle systems 1902 may be determined by the control system 1900 to be headed toward the destinations 2006, 2008, and/or 2010.

The control system 1900 can determine which vehicles 1908 are headed toward the same destination location, and can direct these vehicles 1908 to be included in the same vehicle system 1902. This direction can occur by the control system 1900 sending control signals to output devices instructing operators of the vehicle systems 1902 on which vehicles 1908 to include in a vehicle system 1902, to robotic systems (e.g., cranes, switches, or the like) in vehicle yards for automatically moving the vehicles 1908 and/or routes in a vehicle yard to put the vehicles 1908 in the same vehicle system 1902, or the like. The control system 1900 can direct different groups of the vehicle systems 1902 to join together (logically or mechanically) between various combinations of the locations in the transportation system 2000 to get the vehicles 1906, 1908 to the appropriate destination locations. The control system 1900 does not direct the vehicles 1906, 1908 within a vehicle system 1902 to separate from each other until the vehicles 1908 reach the final destination of the vehicles 1908 in one embodiment. Instead, the control system 1900 communicates control signals to the vehicle control systems onboard the vehicles 1906 to control which vehicle systems 1902 are joined with each other for travel between locations so that the vehicles 1906, 1908 reach the final destination locations.

For example, the first vehicle system 1902A can begin a trip to the first destination location 2006 in the starting location 2004. The second vehicle system 1902B and the third vehicle system 1902C can begin trips to the corresponding second and third destination locations in the first vehicle yard 2012. The control system 1900 can determine that one or more additional vehicle systems not shown in FIG. 19 may travel from various starting locations to various destination locations in the transportation system 2000. The table below lists the starting and final destination locations for different vehicle systems 1902.

| Vehicle System | Starting Location | Final Destination |
|---|---|---|
| First (1902A in FIG. 19) | Start 2004 | Destination #1 2006 |
| Second (1902B in FIG. 19) | Yard #1 2012 | Destination #2 2008 |
| Third (1902C in FIG. 19) | Yard #1 2012 | Destination #3 2010 |
| Fourth (not shown in FIG. 19) | Yard #2 2014 | Destination #2 2008 |
| Fifth (not shown in FIG. 19) | Siding 2018 | Destination #1 2006 |
| Sixth (not shown in FIG. 19) | Yard #2 2014 | Destination #3 2010 |

The control system 1900 can examine these locations and vehicle systems, and determine which vehicle systems are to be combined into convoys for travel between different locations to result in the vehicle systems arriving at the corresponding final destinations. The vehicle systems can be combined into convoys in a way that is different from the way in which rail yards break down and re-combine cars and locomotives into trains. For example, rail yards receive trains formed from locomotives and rail cars, and separate the locomotives and rail cars from each other as the trains are received into the yards. The rail cars can be shuffled and re-combined with other rail cars and locomotives into other trains that depart from the rail yard at a later time. This breaking down, shuffling, and re-forming of the trains can take a considerable amount of time. In contrast, one embodiment of the inventive subject matter described herein provides for the control system 1900 determining which entire vehicle systems 1902 (formed from a propulsion-generating vehicle and at least one non-propulsion-generating vehicle) remain connected with each other and mechanically or logically couple with other vehicle systems for travel. For example, each vehicle system may remain intact without any non-propulsion-generating vehicle being removed from the vehicle system and/or without any propulsion-generating vehicle being removed from the vehicle system for the entire duration of the trip of the vehicle system from the scheduled starting location to the scheduled final destination location.

In the illustrated example, the control system 1900 can communicate a control signal to the first vehicle system 1902A at the start location 2004. This signal can instruct the first vehicle system 1902A to automatically control the propulsion system and/or brakes of the first vehicle system 1902A to move toward the first vehicle yard 2012 along the route 2002A. Optionally, the control signal may direct an output device onboard the first vehicle system 1902A to provide instructions to an operator controlling movement of the first vehicle system 1902A to control the first vehicle system 1902A to move toward the first vehicle yard 2012 along the route 2002A.

After arriving at the first vehicle yard 2012, the control system 1900 can direct the second vehicle system 1902B and the third vehicle system 1902C to logically or mechanically couple with the first vehicle system 1902A. For example, the control system 1900 can communicate control signals that direct the propulsion systems and/or brakes of the vehicle systems 1902A-C to move into positions where the vehicle systems 1902A-C can be logically or mechanically coupled. Optionally, the control system 1900 can communicate signals that direct operators of the vehicle systems 1902A-C to move the vehicle systems 1902A-C into these positions. The first vehicle system 1902A can be received and processed through the first vehicle yard 2012, and coupled with the second and third vehicle systems 1902B-C, without removing any of the vehicles 1906, 1908 from the first vehicle system 1902A. The control system 1900 can then direct the convoy formed by the first through third vehicle systems 1902 to automatically or manually move along the route 2002B toward the second vehicle yard 2014.

After arriving at the second vehicle yard 2014, the control system 1900 determines that the convoy formed of the first through third vehicle systems 1902 must be separated into the separate vehicle systems 1902 for continued travel. The control system 1900 can direct the first vehicle system 1902A, second vehicle system 1902B, and the third vehicle system 1902C to separate from each other, but without the vehicles 1906, 1908 in the first vehicle system 1902A separating from each other, without the vehicles 1906, 1908 in the second vehicle system 1902B separating from each other, and the vehicles 1906, 1908 in the third vehicle system 1902C separating from each other.

The control system 1900 also can determine whether any other vehicle systems 1902 in the second vehicle yard 2014 should connect (logically and/or mechanically) with any of the first through third vehicle systems 1902A-C for combined travel. In the example set forth in the table above, the control system 1900 can determine (e.g., from schedules or manifests) that a fourth vehicle system 1902 in the second vehicle yard 2014 should combine with the second vehicle system 1902B to form another convoy, and this convoy should travel together along the route 2002C toward the second destination location 2008. The control system 1900 can generate and communicate control signals to the second and fourth vehicle systems to direct these vehicle systems to connect and travel together along the route 2002C, similar to as described above. The control system 1900 also can determine (e.g., from schedules or manifests) that a sixth vehicle system 1902 in the second vehicle yard 2014 should combine with the third vehicle system 1902C to form another convoy, and this convoy should travel together along the route 2002D toward the third destination location 2010. The control system 1900 can generate and communicate control signals to the third and sixth vehicle systems to direct these vehicle systems to connect and travel together along the route 2002D.

With respect to the first vehicle system 1902A, the control system 1900 can direct the first vehicle system 1902A to travel along the route 2002E toward the siding 2018. The fifth vehicle system 1902 may be waiting at the siding 2018, or the first vehicle system 1902A may pull off the route 2002E onto the siding 2018 and wait for the fifth vehicle system 1902 to arrive. The control system 1900 can direct the first and fifth vehicle systems 1902 to logically or mechanically couple into another convoy. This convoy can then travel toward the first destination location 2006 along the route 2002F.

The control system 1900 can combine different vehicle systems 1902 (each capable of propelling itself) with each other in convoys at various locations within a transportation system to move the separate vehicle systems 1902 to associated destination locations. Each of the vehicle systems 1902 may remain together, but different combinations of the vehicle systems 1902 can be connected or disconnected with each other to form different convoys for joint movement of the vehicle systems 1902 throughout the transportation system to the destination locations of the different vehicle systems 1902.

In one embodiment, the control system 1900 shown in FIG. 19 can coordinate movement of the vehicle systems 1902 throughout the transportation system 2000 using a fixed takt time schedule. This type of schedule can designate fixed times (and/or dates) at which vehicles are allowed to leave (and/or enter) various locations (e.g., according to the takt time schedule generated or controlled by the control system 1900), such as starting locations, vehicle yards, destination locations, etc. For example, the control system 1900 may dictate that convoys 1904 are to be formed by any available vehicle systems 1902 and leave the starting location 2004, vehicle yards 2012, 2014, or other locations once every two hours. Convoys 1904, individual vehicle systems 1902, or vehicles 1906, 1908 may not be permitted by the takt time schedule designated by the control system 1900 to leave the locations at times between the two hour constraint of the takt time schedule.

The control system 1900 can generate and communicate signals to the vehicle systems 1902 in the various locations to instruct the vehicle systems 1902 to combine with other vehicle systems 1902 based on where the various vehicle systems 1902 are headed and the next departure time of the takt time schedule. The control system 1900 may not generate separate, individualized schedules for entire convoys 1904 formed from two or more vehicle systems 1902 headed to the same destination location or headed to different destination locations. Instead, the control system 1900 can instruct the vehicle systems 1902 to couple with and depart with other vehicle systems 1902 headed toward (but not necessarily to) the same destination location in a convoy 1904. This can significantly reduce the complexity of scheduling movement of the vehicles 1906, 1908 in the transportation system, which correspondingly reduces errors, time, and effort involved in moving the vehicles 1906, 1908 in the transportation system.

Allowing separate vehicle systems 1902 to remain coupled during the entirety of a trip for each vehicle system 1902, while changing which entire vehicle systems 1902 are combined for travel in larger convoys, can reduce the time and effort otherwise required for transporting cargo throughout a transportation system. The time and effort otherwise used in breaking apart the non-propulsion-generating vehicles 1908 in various vehicle yards, re-organizing these vehicles 1908 into other convoys (e.g., trains), and then waiting for other propulsion-generating vehicles 1906 to become available for transporting the vehicles 1908 is avoided by grouping the vehicles 1906, 1908 into the vehicle systems 1902 at starting locations and keeping the vehicle systems 1902 together (while shuffling which convoys include different vehicle systems 1902 at each intermediate location) until the vehicle systems 1902 reach the corresponding final destination locations.

Figure 21:
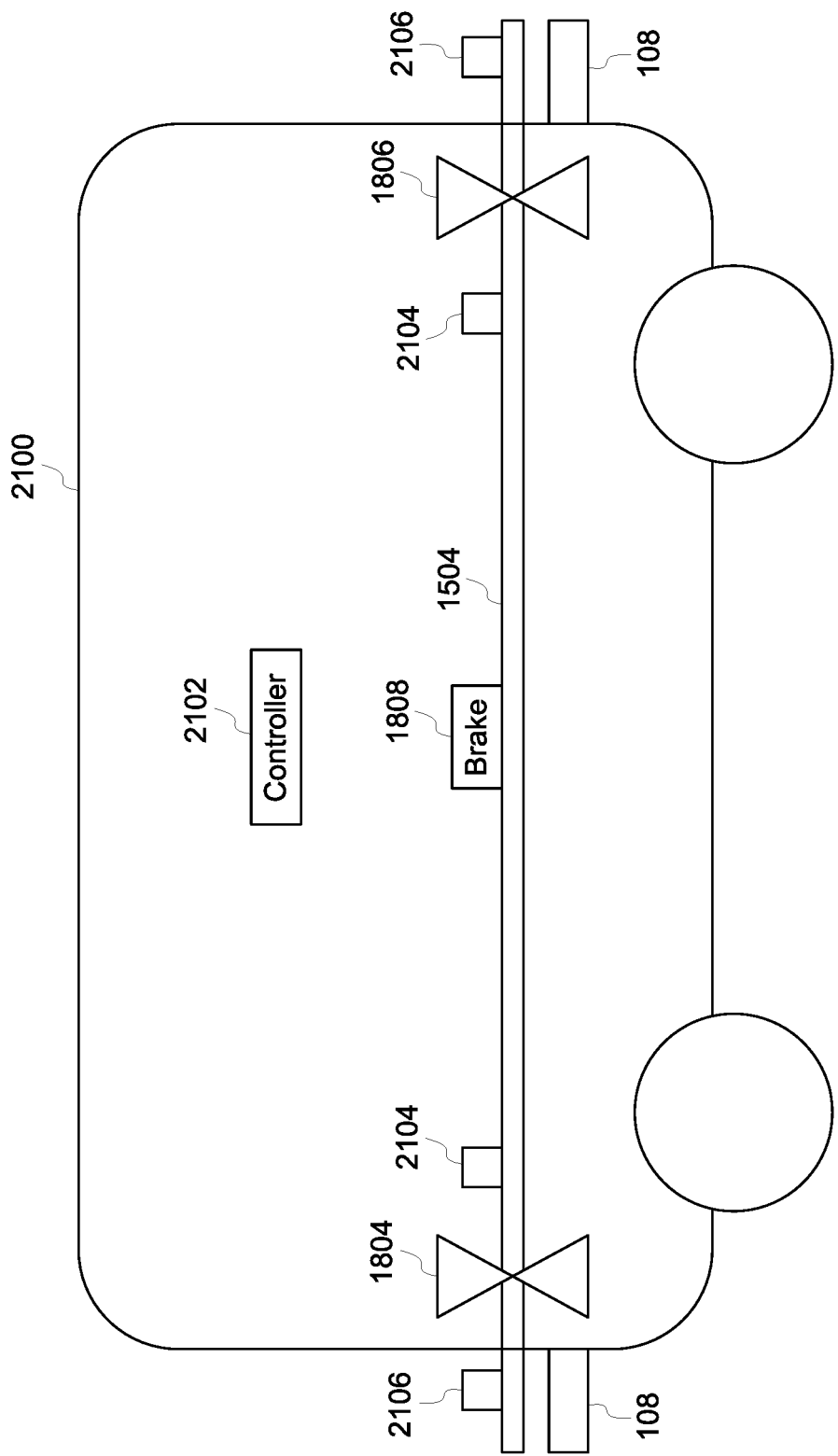
FIG. 21 illustrates one embodiment of a vehicle.

FIG. 21 illustrates one embodiment of a vehicle 2100. The vehicle 2100 can represent one or more of the vehicles 1906, 1908 shown in FIG. 19. Optionally, the vehicle 2100 can represent one or more other vehicles described herein. The vehicle 2100 includes the conduit 1504, valves 1804, 1806, and brake 1808 described above. In one embodiment, one or more of the valves 1804, 1806 can represent a remotely controlled angle cock. The vehicle 2100 also includes a controller 2102, which can represent hardware circuitry that includes and/or is connected with one or more processors (e.g., one or more microprocessors, field programmable gate arrays, and/or integrated circuits) that controls actuation of the valves 1804, 1806 and/or controls actuation of one or more couplers 108 of the vehicle 2100. The controller 2102 can communicate control signals to the valves 1804, 1806 via one or more wired and/or wireless communications to individually change a state of each valve 1804, 1806 from an open state to a closed state, or from a closed state to an open state. The controller 2102 be disposed onboard a vehicle 1906 and remotely control actuation (e.g., closing or opening) of a valve 1804, 1806 on another vehicle 1908 in the same vehicle system 1902 by communicating the control signal to the appropriate valve 1804, 1806 on the other vehicle 1908. The valves 1804, 1806 can include or be connected with hardware transceiving circuitry (e.g., antennas, modems, or the like) for receiving the control signals.

In one embodiment, the couplers 108 can be controlled by the controller 2102 (e.g., by receiving a control signal) to connect or disconnect from a coupler 108 on another vehicle 1906, 1908. For example, the couplers 108 can be automatic couplers that automatically connect vehicles 1906 and/or 1908 with each other when the couplers 108 engage each other. The couplers 108 optionally can include one or more motors that, responsive to receiving a control signal from the controller 2102, pull the pin or other components of the couplers 108 to automatically disengage the couplers 108 from each other, thereby decoupling the previously coupled vehicles 1906 and/or 1908 from each other.

Some currently known vehicle systems (e.g., trains) are unable to easily combine or re-combine vehicle consists 1902 as described above due to the need to manually fluidly decouple and fluidly couple air brake conduits in the trains. But, the controllers 2102, valves 1804, 1806, and couplers 108 can allow for the separate vehicle systems 1902 to quickly be coupled for combining the vehicle systems 1902 into larger convoys (without breaking apart individual vehicle systems 1902) and quickly decoupled for separating the vehicle systems 1902 from each other to divide up a convoy (without breaking apart individual vehicle systems 1902).

For example, prior to coupling the vehicle systems 1902A-C shown in FIG. 19 into the convoy 1904, the valve 1804 at a leading end of the vehicle 1906 in the vehicle system 1902A may be closed and the valve 1806 at a trailing end of the vehicle 1908 at the trailing end of the vehicle system 1902A may be closed, while the valves 1804, 1806 between these valves 1804, 1806 of the vehicles 1906, 1908 in the vehicle system 1902A remain open. The closed valves 1804, 1806 prevent air within the conduit 1504 of the brake system from escaping out of the conduit 1504, while the open valves 1804, 1806 allow the air to flow within the conduit 1504. The other vehicle systems 1902B, 1902C also may have the valves 1804, 1806 on the opposite ends of the vehicle systems 1902B, 1902C closed with the valves 1804, 1806 between the opposite ends open.

Once the vehicle systems 1902A, 1902B, 1902C are coupled with each other (e.g., by the automatically engaging couplers 108), the valves 1804, 1806 on the opposite ends of the convoy 1904 formed by the vehicle systems 1902A, 1902B, 1902C can be closed while the valves 1804, 1806 in the vehicle systems 1902A-C that are between these valves 1804, 1806 on the opposite ends of the convoy 1904 are opened. This allows the conduits 1504 in the coupled vehicle systems 1902A-C to be fluidly coupled with each other, while preventing air from inside the conduits 1504 from escaping out of the conduits 1504. The controller 2102 on the different vehicle systems 1902A-C can coordinate the opening and closing of valves 1804, 1806 to prevent air from escaping. To decouple vehicle systems 1902 from each other and separate the convoy 1904 into separate vehicle systems 1902, the controller 2102 can send a control signal to one or more of the couplers 108 to cause the couplers 108 to automatically decouple and separate the vehicles 1906 and/or 1908.

Optionally, the vehicle 2100 includes pressure sensors 2104, 2106 on either side of each of the valves 1804, 1806. The pressure sensors 2104 can be interior pressure sensors because these pressure sensors 2104 measure the pressure in the conduit 1504 inside the vehicle 2100 (e.g., between the valves 1804, 1806 in the vehicle 2100). The pressure sensors 2106 can be exterior pressure sensors because these pressure sensors 2106 measure the pressure in the conduit 1504 outside the vehicle 2100 or outside of the valves 1804, 1806.

The pressure sensors 2104, 2106 can measure pressures in the conduit 1504 and communicate the pressures to the controller 2102 via one or more wired and/or wireless communication paths. If the connection between adjacent vehicles in the convoy 1904 is broken (e.g., the convoy 1904 accidentally breaks apart), one or more of the sensors 2104, 2106 may detect a decrease pressure in the conduit 1504 that is not associated with application of the brake. This detection can be communicated to the controller 2102, which can identify the location of the break in couplers 108 based on where the pressure drop is detected. The controller 2102 can then instruct the valves 1804, 1806 that are on either side of the break in couplers 108 to close to prevent further loss in pressure in the conduit 1504.

In one embodiment, the valves 1804, 1806 and couplers 108 can be controlled to couple or decouple vehicle systems 1902 from each other during movement of the vehicle systems 1902 along routes. For example, a leading vehicle system 1902 can be moving in a first direction and a separate, trailing vehicle system 1902 can approach the leading vehicle system 1902 and connect with the leading vehicle system 1902 without the leading vehicle system 1902 stopping (or, in some embodiments, even slowing down). The couplers 108 on the leading and trailing vehicle systems 1902 can be actuated to connect with each other during the movement of these vehicle systems 1902, and the valves 1804, 1806 can be actuated to fluidly couple the conduits 1504 onboard the vehicle systems 1902 once the couplers 108 are connected.

Figure 23:
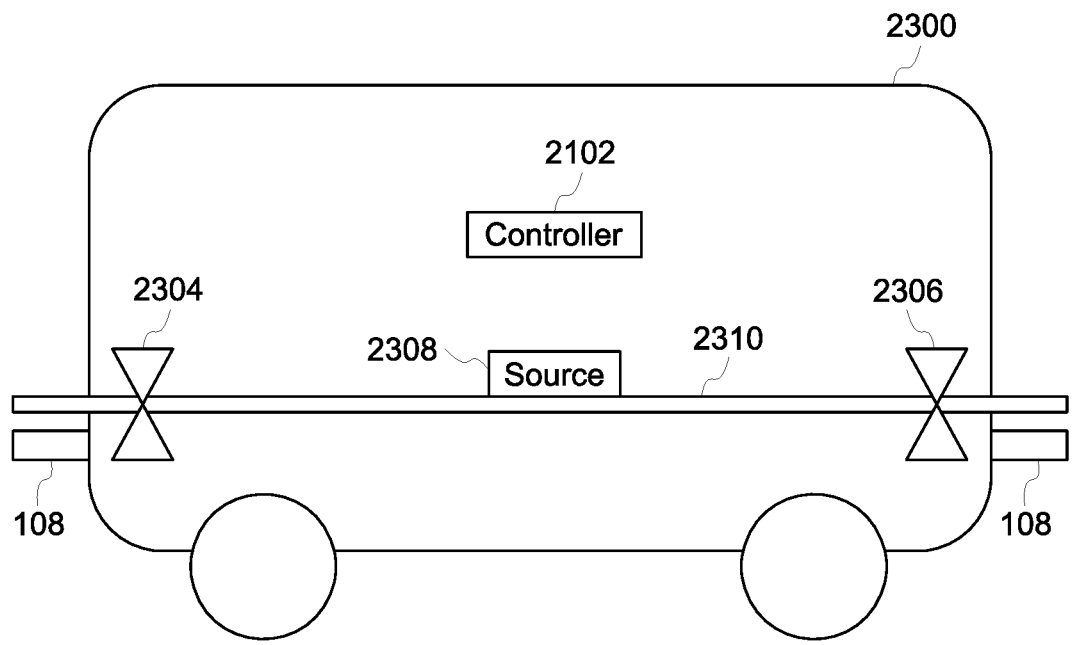
FIG. 23 illustrates another embodiment of a vehicle.

Optionally, two or more vehicles in a multi-unit vehicle system can share other materials or information in addition to or in place of sharing air pressure for the braking systems. For example, two or more vehicles can fluidly couple with each other when the vehicles mechanically connect with each other to share liquid fuel between the vehicles. FIG. 23 illustrates another embodiment of a vehicle 2300. The vehicle 2300 can represent one or more of the vehicles described herein. Although not shown in FIG. 23, the vehicle 2300 optionally also includes the conduit 1504, valves 1804, 1806, controller 2102, sensors 2104, 2106, and/or brake 1808 described herein.

The vehicle 2300 includes a source 2308, which can represent one or more tanks or containers of fluid materials. For example, the source 2308 can represent a container holding fuel, coolant (e.g., the source 2308 can represent a cooling circuit having coolant therein), compressed air (e.g., the source 2308 is an air compressor), or the like. Optionally, the source 2308 can represent a storage device for storing electric energy or current, such as one or more batteries, capacitors, flywheels, or the like. Optionally, the source 2308 can represent one or more assemblies that create electric current or through which electric current is conducted, such as one or more alternators, generators, solar cells, turbines, or the like.

The source 2308 is connected with an internal connection assembly 2310, which can represent one or more conduits through which fuel, coolant, or other fluids flow, one or more conductive pathways through which current is conducted (e.g., busses, cables, wires, etc.), or the like. The connection assembly 2310 can be coupled with one or more other components of the vehicle 2300 to convey the material(s) from the source 2308 to the components. For example, the connection assembly 2310 can be connected with an engine of the vehicle 2300 to carry fuel and/or coolant to the engine, with a motor, battery, or other load of the vehicle 2300 to carry electric current to the motor, battery, or load, etc.

The vehicle 2300 includes flow control devices 2304, 2306 that operate to permit or prevent the flow or conduction of material(s) through or along the connection assembly 2310. With respect to fluids (e.g., coolant, air, fuel, etc.), the flow control devices 2304, 2306 can represent valves, such as the valves 1804, 1806, that can open or close under direction of the controller 2102. With respect to electric current, the flow control devices 2304, 2306 can represent switches that open or close under direction of the controller 2102. The controller 2102 can communicate control signals to the devices 2304, 2306 via one or more wired and/or wireless communications to individually change a state of each device 2304, 2306 from an open state to a closed state, or from a closed state to an open state. The controller 2102 can be disposed onboard one vehicle and remotely control actuation (e.g., closing or opening) of a device 2304, 2306 on the same or other vehicle by communicating the control signal to the appropriate device 2304, 2306 on the other vehicle. The devices 2304, 2306 can include or be connected with hardware transceiving circuitry (e.g., antennas, modems, or the like) for receiving the control signals.

The controller 2102 can control one or more of the devices 2304, 2306 to allow one vehicle to share, provide, or receive materials with, to, or from another vehicle. For example, responsive to another vehicle coupling with the vehicle 2300, the connection assembly 2310 of the vehicle 2300 may be fluidly coupled with the connection assembly 2310 onboard the other vehicle and/or the connection assembly 2310 of the vehicle 2300 may be conductively coupled with the connection assembly 2310 onboard the other vehicle. The controller 2102 can direct devices 2304, 2306 onboard these vehicles to change states to allow fuel, coolant, electric current, data signals, or the like, to be shared between the vehicles. For example, the controller 2102 can direct the device 2304 or 2306 onboard each vehicle that is closer to the other vehicle to open to allow fuel, coolant, air, or the like, to flow between the vehicles. As another example, the controller 2102 can direct the device 2304 or 2306 onboard each vehicle that is closer to the other vehicle to close to allow data signals, electric current, or the like, to be conducted between the vehicles.

This can allow the vehicles to share fuel, coolant, air, electric current, and/or data signals between the coupled vehicles. Prior to the vehicles separating from each other, the controller 2102 can close one or more of the devices 2304, 2306 to prevent the fluid from spilling from the connection assembly 2310 after vehicle separation. As another example, prior to the vehicles separating from each other, the controller 2102 can open one or more of the devices 2304, 2306 to prevent electric current or data signals from being conducted outside of the vehicles. The sharing of fuel, air, coolant, current, data signals, or the like, between vehicles (or one vehicle providing fuel, air, coolant, etc. to another vehicle) can assist a vehicle by providing the vehicle with additional fuel to extend how far that vehicle can travel, by providing the vehicle with additional coolant to help keep operating temperatures of the vehicle down, by providing the vehicle with electric current to help power loads of the vehicle, by providing the vehicle with data signals to inform the vehicle of sensed information or other information obtained or generated by another vehicle, or the like. For example, the connecting of conductive pathways between the vehicles can establish a wired communication connection between the vehicles to help the vehicles communicate with each other.

Returning to the description of the control system 1900 shown in FIG. 19, the control system 1900 can change the size of convoys 1904 to prevent convoys 1904 that exceed size restrictions from entering one or more designated geographic areas. For example, the control system 1900 and/or the onboard control systems or controllers of the vehicle systems 1902 can determine that a convoy 1904 is to be separated into two or more smaller convoys 1904 or into separate vehicle systems 1902 responsive to the convoy 1904 approaching (e.g., prior to entering) a densely-populated area (e.g., a city or town instead of a rural area). The couplers 108 and valves 1804, 1806 can be controlled from onboard control systems and/or the control system 1900 to separate the convoy 1904 into two or more smaller convoys 1904, into two or more smaller vehicle systems 1902, or into a smaller convoy 1904 and a vehicle system 1902. The convoys 1904 or vehicle systems 1902 can be smaller in that the smaller convoys 1904 or vehicle systems 1902 are shorter than the larger convoy 1904. The smaller convoys 1904 and/or vehicle systems 1902 can travel through the more densely-populated geographic area and optionally re-combine into the larger convoy 1904 responsive to exiting from the geographic area.

As another example, the control system 1900 and/or the onboard control systems or controllers of the vehicle systems 1902 can determine that a convoy 1904 is to be separated into two or more smaller convoys 1904 or into separate vehicle systems 1902 responsive to the convoy 1904 approaching (e.g., prior to entering) a siding 2018 that is too short to receive the entire convoy 1904. The couplers 108 and valves 1804, 1806 can be controlled from onboard control systems and/or the control system 1900 to separate the convoy 1904 into two or more smaller convoys 1904, into two or more smaller vehicle systems 1902, or into a smaller convoy 1904 and a vehicle system 1902. The convoys 1904 or vehicle systems 1902 can be smaller in that the smaller convoys 1904 or vehicle systems 1902 are shorter than the larger convoy 1904. One or more of the smaller convoys 1904 and/or vehicle systems 1902 can enter into the siding 2018, while one or more of the other smaller convoys 1904 and/or vehicle systems 1902 can continue traveling.

As another example, the control system 1900 and/or the onboard control systems or controllers of the vehicle systems 1902 can determine that a convoy 1904 is to be separated into two or more smaller convoys 1904 or into separate vehicle systems 1902 responsive to wireless communication between vehicles 1906 and/or 1908 deteriorating or being interrupted. For example, during travel of some long convoys 1904 through areas such as densely populated areas, tunnels, mountainous regions, or the like, wireless communication between vehicles 1906, 1908 at or near the opposite ends of the convoy 1904 may be interfered with or may not be successful. This can interfere with the continued safe operation of the convoy 1904. Shortening the length of the convoy 1904 can improve wireless communication between the vehicles 1906, 1908 within the smaller convoys 1904 and/or vehicle systems 1902 (e.g., relative to wireless communication within the larger convoy 1904). Responsive to determining that wirelessly communicated signals are not being successfully communicated within the convoy 1904, the control system and/or controllers onboard the convoy 1904 can control the couplers 108 and valves 1804, 1806 to separate the convoy 1904 into two or more smaller convoys 1904, into two or more smaller vehicle systems 1902, or into a smaller convoy 1904 and a vehicle system 1902. The convoys 1904 or vehicle systems 1902 can be smaller in that the smaller convoys 1904 or vehicle systems 1902 are shorter than the larger convoy 1904. The smaller convoys 1904 and/or vehicle systems 1902 optionally can be re-combined into the larger convoy 1904 responsive to exiting the area or areas where the wireless communication problems were encountered.

As another example, the control system 1900 and/or the onboard control systems or controllers of the vehicle systems 1902 can determine that a convoy 1904 is to be separated into two or more smaller convoys 1904 or into separate vehicle systems 1902 responsive to the larger convoy 1904 approaching a tunnel or other geographic area where airflow is restricted (e.g., in a valley or a mountainous region). Movement of longer convoys 1904 through such airflow restricted areas can significantly increase the temperature within the areas and/or decrease the amount of oxygen available for combustion by engines in the convoys 1904. This can cause the engines to de-rate or otherwise decrease in performance.

The control system 1900 (and/or the control system and/or controllers onboard the convoy 1904) can control the couplers 108 and valves 1804, 1806 to separate the convoy 1904 into two or more smaller convoys 1904, into two or more smaller vehicle systems 1902, or into a smaller convoy 1904 and a vehicle system 1902. The convoys 1904 or vehicle systems 1902 can be smaller in that the smaller convoys 1904 or vehicle systems 1902 are shorter than the larger convoy 1904. The smaller convoys 1904 and/or vehicle systems 1902 can travel through the airflow restricted area with the convoys 1904 and/or vehicle systems 1902 being spatially separated from each other. This separation can allow for the airflow restricted area to cool down and/or receive more oxygen after one smaller convoy 1904 or vehicle system 1902 passes through and before the next smaller convoy 1904 and/or vehicle system 1902 enters. The smaller convoys 1904 and/or vehicle systems 1902 optionally can be re-combined into the larger convoy 1904 responsive to exiting the airflow restricted area.

As another example, the control system 1900 and/or the onboard control systems or controllers of the vehicle systems 1902 can determine that a convoy 1904 is to be separated into two or more smaller convoys 1904 or into separate vehicle systems 1902 based on characteristics of the terrain that the convoy 1904 is traveling over and/or approaching. For example, the route may extend over terrain that is too steep of an incline for the propulsion-generating vehicles 1906 to pull the rest of the convoy 1904 up, over terrain that is too steep of a decline for the brake systems of the vehicles 1906, 1908 to safely slow or stop the convoy 1904, and/or over terrain having too small of a radius of curvature for the convoy 1904 (e.g., to avoid risk of the convoy 1904 tipping over or placing too large of a lateral load on the route and thereby damage the route).

The control system 1900 (and/or the control system and/or controllers onboard the convoy 1904) can control the couplers 108 and valves 1804, 1806 to separate the convoy 1904 into two or more smaller convoys 1904, into two or more smaller vehicle systems 1902, or into a smaller convoy 1904 and a vehicle system 1902. The convoys 1904 or vehicle systems 1902 can be smaller in that the smaller convoys 1904 or vehicle systems 1902 are shorter than the larger convoy 1904. The smaller convoys 1904 and/or vehicle systems 1902 can travel through the terrain having the increased incline, increased decline, and/or smaller radius of curvature (e.g., compared to a designated threshold). The smaller convoys 1904 and/or vehicle systems 1902 optionally can be re-combined into the larger convoy 1904 responsive to completing travel over this section of the terrain.

As another example, the control system 1900 and/or the onboard control systems or controllers of the vehicle systems 1902 can determine that a convoy 1904 is to be separated into two or more smaller convoys 1904 or into separate vehicle systems 1902 based on an upcoming segment of the route including several back-to-back curves. For example, some segments of a route can include a convex curve followed by a concave curve followed by a convex curve, and so on. Traveling through these back-to-back curves with a longer convoy 1904 can result in the convoy 1904 traveling at slower speeds due to a need to restrict stresses on the couplers 108 below designated thresholds (and avoid breaking the convoy 1904). For example, couplers 108 in longer convoys 1904 that are at or near inflection points and/or at or near peaks of the curves can experience increased stress relative to other couplers 108 in the same convoys 1904. The convoys 1904 may travel slower (relative to traveling on other curves) to avoid the increased stress on the couplers 108.

The control system 1900 (and/or the control system and/or controllers onboard the convoy 1904) can control the couplers 108 and valves 1804, 1806 to separate the convoy 1904 into two or more smaller convoys 1904, into two or more smaller vehicle systems 1902, or into a smaller convoy 1904 and a vehicle system 1902. The convoys 1904 or vehicle systems 1902 can be smaller in that the smaller convoys 1904 or vehicle systems 1902 are shorter than the larger convoy 1904. The smaller convoys 1904 and/or vehicle systems 1902 can travel through the back-and-forth curves at faster speeds than the longer convoy 1904 as the stress on the couplers 108 in the smaller convoys 1904 and/or vehicle systems 1902 may be less. The smaller convoys 1904 and/or vehicle systems 1902 optionally can be re-combined into the larger convoy 1904 responsive to completing travel over the back-and-forth curves.

As another example, the control system 1900 and/or the onboard control systems or controllers of the vehicle systems 1902 can determine that a convoy 1904 is to be separated into two or more smaller convoys 1904 or into separate vehicle systems 1902 based on upcoming inspection events or locations. Convoys 1904 and vehicle systems 1902 may be subject to inspection events at various locations, such as weighing of the cargo being carried at weigh stations. Inspecting longer convoys 1904 can take longer than shorter convoys 1904 and/or vehicle systems 1902. The control system 1900 (and/or the control system and/or controllers onboard the convoy 1904) can control the couplers 108 and valves 1804, 1806 to separate the convoy 1904 into two or more smaller convoys 1904, into two or more smaller vehicle systems 1902, or into a smaller convoy 1904 and a vehicle system 1902. The convoys 1904 or vehicle systems 1902 can be smaller in that the smaller convoys 1904 or vehicle systems 1902 are shorter than the larger convoy 1904. Each of the smaller convoys 1904 and/or vehicle systems 1902 can be inspected (e.g., weighed) faster than the larger convoy 1904 and, in some circumstances, all of the smaller convoys 1904 and/or vehicle systems 1902 can be inspected faster than the larger convoy 1904. The smaller convoys 1904 and/or vehicle systems 1902 optionally can be re-combined into the larger convoy 1904 after the inspections are completed.

As another example, the control system 1900 and/or the onboard control systems or controllers of the vehicle systems 1902 can determine that a convoy 1904 is to be separated into two or more smaller convoys 1904 or into separate vehicle systems 1902 based on an upcoming branch or intersection of routes. Different vehicle systems 1902 may need to travel onto different branches or routes, and the convoy 1904 can separate into different convoys 1904 or vehicle systems 1902 so that the vehicle systems 1902 travel onto the correct branches or routes.

As another example, the control system 1900 and/or the onboard control systems or controllers of the vehicle systems 1902 can determine that a convoy 1904 is to be separated into two or more smaller convoys 1904 or into separate vehicle systems 1902 based on detected failure or damage to one or more components of the convoy 1904. For example, a hot axle, damaged engine cylinder, or the like, may be detected by the control system 1900 and/or the onboard control systems or controllers of the vehicle systems 1902. The control system 1900 (and/or the control system and/or controllers onboard the convoy 1904) can control the couplers 108 and valves 1804, 1806 to separate the convoy 1904 into two or more smaller convoys 1904, into two or more smaller vehicle systems 1902, or into a smaller convoy 1904 and a vehicle system 1902. The convoy 1904 may be divided up in this way to isolate the damaged component on a single vehicle system 1902 so that the remaining vehicle system 1902 or systems 1902 in the larger convoy 1904 can continue traveling together without being impeded or slowed by the damaged component on the vehicle system 1902.

Figure 22:
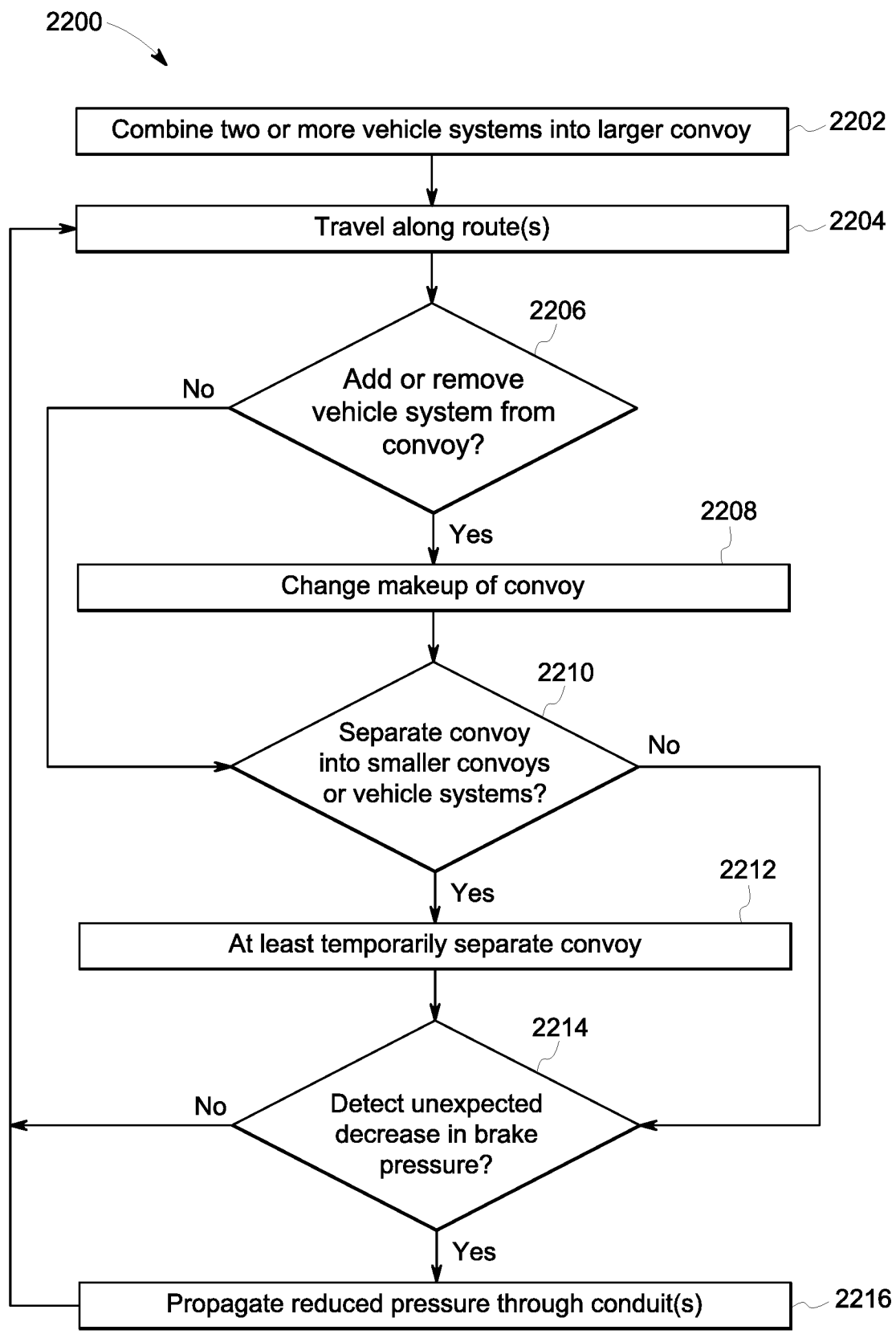
FIG. 22 illustrates a flowchart of one embodiment of a method for controlling movement of vehicles in a transportation system.

FIG. 22 illustrates a flowchart of one embodiment of a method 2200 for controlling movement of vehicles in a transportation system. The method 2200 can represent operations performed by the control system 1900 and/or one or more control systems or controllers onboard the vehicles, such as operations performed under the direction of software. Optionally, the method 2200 can represent an algorithm that can be used by a person of ordinary skill in the art to create such software.

At 2202, two or more vehicle systems are combined into a convoy. The vehicle systems can be mechanically or logically coupled. Each vehicle system can have at least one propulsion-generating vehicle and one or more non-propulsion-generating vehicles. At 2204, the convoy travels along one or more routes. At 2206, a determination is made as to whether one or more vehicle systems are to be removed from the convoy and/or if one or more vehicle systems are to be added to the convoy. As described above, a vehicle system can be removed from the convoy to reduce the length of the convoy for various reasons, and one or more vehicle systems can be added to the convoy so that the added vehicle systems can travel toward associated destination locations. If one or more vehicles are to be added and/or removed, flow of the method 2200 can proceed toward 2208. Otherwise, flow of the method 2200 can proceed toward 2210.

At 2208, the makeup of the convoy is changed. The makeup can be changed by removing one or more vehicle systems from the convoy and/or by adding one or more vehicle systems to the convoy. At 2210, a determination is made as to whether the convoy is to be separated into smaller convoys and/or vehicle systems. The convoy can be separated due to damage to one or more components of a vehicle in a vehicle system, the convoy approaching terrain or a segment of a route that could require smaller convoys or vehicle systems for travel over the route, or the like. If the convoy is to be separated, flow of the method 2200 can proceed toward 2212. But, if the convoy is not to be separated, flow of the method 2200 can proceed toward 2214.

At 2212, the convoy is at least temporarily separated into smaller convoys and/or vehicle systems. For example, the convoy can be separated for travel up a steep incline, down a steep decline, through a series of curves, for inspection, or the like, as described above. The convoy optionally can be subsequently re-combined from the smaller convoys and/or vehicle systems.

At 2214, a determination is made as to whether an unexpected decrease in brake pressure is detected. For example, the pressure in the conduit of an air brake line can be monitored to determine if the pressure decreases without automatic or manual application of the air brakes. Such a decrease can indicate a break between segments of the convoy. If such a decrease is detected, then flow of the method 2200 can proceed toward 2216. But, if no decrease is detected, then flow of the method 2200 can return toward 2204. Optionally, the method 2200 can terminate or return to another operation.

At 2216, the reduced pressure is propagated through the conduit if one or more of the valves are closed. For example, the reduced pressure in the conduits that remain fluidly coupled with each other can propagate through the conduits. Flow of the method 2200 can then return toward 2202. Optionally, the method 2200 can return to another operation or terminate.

With respect to a convoy formed of two or more vehicle systems that are logically (but not mechanically) coupled with each other, the controllers onboard one or more of the vehicle systems can control the propulsion systems of the vehicle systems to maintain a designated distance between the vehicle systems in the convoy. For example, the trailing vehicle system 1902B in the convoy 1904 shown in FIG. 19 may have a controller onboard the vehicle 1906 in the vehicle system 1902B that determines how far the leading end of the vehicle system 1902B is from the trailing end of the leading vehicle system 1902A. The vehicle system 1902C in the same convoy 1904 may have another controller that determines how far the vehicle system 1902C is from the vehicle system 1902B. The controllers can determine the separation distances between the neighboring vehicle systems 1902 in the convoy 1904 based on a variety of different sources of information, such as radar systems, global positioning system receivers, lidar systems, or the like.

The controllers can use the measured or estimated separation distances between the vehicle systems 1902 to determine whether to automatically change movement of one or more of the vehicle systems 1902. For example, the controller onboard the vehicle system 1902B may cause the vehicle system 1902B to accelerate responsive to the separation distance between the vehicle systems 1902A, 1902B increasing. As another example, the controller onboard the vehicle system 1902B can send a signal or automatically direct the controller onboard the vehicle system 1902A to slow down or brake responsive to the separation distance between the vehicle systems 1902A, 1902B increasing. Conversely, the controller onboard the vehicle system 1902B may cause the vehicle system 1902B to decelerate responsive to the separation distance between the vehicle systems 1902A, 1902B decreasing. As another example, the controller onboard the vehicle system 1902B can send a signal or automatically direct the controller onboard the vehicle system 1902A to accelerate responsive to the separation distance between the vehicle systems 1902A, 1902B decreasing.

The controllers can coordinate the movements of the vehicle systems 1902 in the convoy 1904 so that the separation distances between the logically coupled vehicle systems 1902 stays the same or remains within a designated threshold. For example, the controllers can ensure that the separation distance between neighboring vehicle systems 1902 remains within 10%, 20%, or another limit of a designated distance. Keeping the vehicle systems 1902 close to each other in this way can reduce wind drag on one or more of the trailing vehicle systems 1902, which also can reduce the amount of fuel consumed by the trailing vehicle systems 1902. The leading vehicle system 1902 may not experience the reduction in fuel consumption and may increase the amount of fuel consumed relative to the controllers not maintaining the separation distances. For example, the leading vehicle system 1902 may accelerate more and/or travel faster to maintain the separation distance at the designated distance (relative to the controllers not maintaining the separation distances between the vehicle systems 1902). The increase in fuel consumption by the leading vehicle system 1902 may be offset by the decrease in fuel consumption by the trailing vehicle system(s) 1902. For example, the extra amount of fuel consumed by the leading vehicle system 1902 may be less than the reduced amount of fuel that the trailing vehicle system(s) 1902 consume.

The controllers can store or have access to a database (or other memory structure) that stores information about the routes being traveled upon and use this route information to keep the same separation distance between neighboring vehicle systems 1902. For example, the controller onboard the vehicle system 1902A may determine that the vehicle system 1902A is heading toward an incline, toward a reduced speed limit, or toward another location requiring or likely to result in the vehicle system 1902A slowing down. To avoid slowing down and reducing the separation distance from the vehicle system 1902B, the controller of the leading vehicle system 1902A can automatically speed up and/or can instruct the trailing vehicle system 1902B to slow down prior to reaching the incline. As another example, the controller onboard the vehicle system 1902A may determine that the vehicle system 1902A is heading toward a decline, toward an increased speed limit, or toward another location requiring or likely to result in the vehicle system 1902A speeding up. To avoid speeding up and increasing the separation distance from the vehicle system 1902B, the controller of the leading vehicle system 1902A can automatically slow down and/or can instruct the trailing vehicle system 1902B to speed up prior to reaching the incline.

The designated separation threshold between vehicle systems 1902 in a convoy 1904 can be based on a wireless communication range of the communication units onboard the vehicle systems 1902. The control system 1900 and/or controllers onboard the convoys 1904 can control movement of the convoys 1904 so that the convoys 1904 move close enough to each other to allow for wireless communication between the convoys 1904. The convoys 1904 may not have mechanical or electrical (e.g., conductive) couplings between each other, which can result in the controllers onboard the convoys 1904 wirelessly communicating with each other. Because wireless communication may have limited range, the control system 1900 and/or onboard controllers can move the convoys 1904 to within a designated range of each other. This designated range can be the designated separation threshold described above, and can represent a wireless communication range, or a distance that the communication units 808 onboard the different convoys 1904 can communicate with each other.

In one embodiment, the designated separation distance can be different at different locations and/or times during travel of the convoy 1904. For example, during travel through urban areas, covered areas (e.g., tunnels, multi-level bridges, vegetation-covered areas, etc.), or other areas associated with increased interference with wireless communication. The control system 1900 and/or onboard controllers can refer to the route database to identify these locations and/or can monitor signal-to-noise ratios of wireless communications between the vehicle systems 1902 (or other measurements of wireless communication strength). Responsive to determining that the convoy 1904 is traveling toward or in an area associated with increased wireless communication interference, decreased wireless communication range, or lower wireless signal-to-noise ratios, the control system 1900 and/or onboard controllers can reduce the threshold separation distance between neighboring vehicle systems 1902. Responsive to determining that the convoy 1904 is traveling toward or in an area associated with decreased wireless communication interference, increased wireless communication range, or larger wireless signal-to-noise ratios, the control system 1900 and/or onboard controllers can increase the threshold separation distance between neighboring vehicle systems 1902. This can assist with keeping the vehicle systems 1902 close enough to maintain wireless communications between the controllers of the vehicle systems 1902 in the convoy 1904, such as between the neighboring vehicle systems 1902 in the convoy 1904.

Optionally, the onboard controllers of the vehicle systems 1902 can engage in multi-communication mode shifting based on how far the neighboring vehicle systems 1902 in a convoy 1904 are from each other. This shifting can involve changing a wireless communication mode based on the separation distance between the vehicle systems 1902 within a convoy 1904. For example, the onboard controllers can direct the communication units to use a first type or mode of wireless communication (e.g., cellular communication) while the communication units in neighboring vehicle systems 1902 in the convoy 1904 are farther apart that the designated separation threshold, and can direct the communication units to use a different, second type or mode of wireless communication (e.g., BLUETOOTH communication) while the communication units in neighboring vehicle systems 1902 in the convoy 1904 are no farther apart that the designated separation threshold.

The communication units of the vehicle systems 1902 within a convoy 1904 can form wireless mesh networks with each other. The formation of a mesh network can allow for the communication units of the vehicle systems 1902 in the convoy 1904 to change with respect to time as vehicle systems 1902 are added to and/or removed from the convoy 1904, as described herein. Mesh networks allow for nodes (e.g., communication units of the vehicle systems 1902 in the convoy 1904) to join or leave the network without having to terminate the network, re-start or re-configure the network, or the like. Alternatively, the communication units of a convoy 1904 can form another type of network.

The network formed by the communication units of a convoy 1904 can be used to share information among the vehicle systems 1902 in the convoy 1904. For example, one vehicle system 1902 may have a sensor that is not onboard another vehicle system 1902. The vehicle system 1902 having the sensor can communicate data from that sensor to one or more other vehicle systems 1902 in the same convoy 1904. This sensor data can include information on environmental conditions, as one example. This sensor data can be shared to allow the vehicle systems 1902 that do not have the same type of sensor or sensor data to operate using the sensor data that is otherwise not available to it. As another example, a sensor onboard one vehicle system 1902 may fail, but the communication units in the convoy 1904 can relay data from a redundant sensor in another vehicle system 1902 in the convoy 1904 to the vehicle system 1902 having the failed sensor. This vehicle system 1902 (or the controller of that vehicle system 1902) can use the sensor data to avoid a loss in functionality that otherwise would occur because of the failed sensor.

Optionally, the vehicle systems 1902 in a convoy 1904 can share sensor data to allow one or more redundant sensors in the convoy 1904 to be turned off or otherwise deactivated. For example, multiple vehicle systems 1902 in a convoy 1904 may have global positioning system receivers, track inspection systems, cameras, or the like. The control system 1900 and/or controllers of the convoy 1904 can turn off or otherwise deactivate several or all but one of the redundant sensors while the convoy 1904 is formed. The data generated by the sensor that remains active can be shared among the vehicle systems 1902 in the convoy 1904. Prior to separating one or more of the vehicle systems 1902 from the convoy 1904, the control system 1900 and/or controllers can activate the deactivated redundant sensor on the vehicle system(s) 1902 that are separating from the convoy 1904. This can ensure that the separated vehicle system(s) 1902 have functional, activated sensors prior to separating from the convoy 1904.

The control system 1900 can operate as a master scheduling system that coordinates the couplings and de-couplings of different convoys 1904 into different vehicle systems 1902 based on similarities in origin locations and/or destination locations of the different convoys 1904. For example, the control system 1900 can examine trip manifests, previously generated schedules, current locations and/or headings of convoys 1904, etc., where the different convoys 1904 are moving and/or will be moving and when the different convoys 1904 are moving and/or will be moving. Where the different convoys 1904 are or will be moving can include locations that the convoys 1904 will depart from and/or locations that the convoys 1904 are or will be headed toward. The control system 1900 can examine this information and determine which groupings of convoys 1904 is most efficient or more efficient (than one or more, but not all, other groupings of convoys 1904) to form larger vehicle systems 1902. For example, the control system 1900 can estimate or calculate how much fuel different groupings of convoys 1904 will consume for upcoming travel based on previous trips or travels of vehicle systems 1902. As another example, the control system 1900 can estimate or calculate how much wind drag different groupings of convoys 1904 will experience for upcoming travel based on previous trips or travels of vehicle systems 1902. As another example, the control system 1900 can estimate or calculate how much wear different groupings of convoys 1904 will experience for upcoming travel based on previous trips or travels of vehicle systems 1902.

The control system 1900 can select different groups of vehicle systems 1902 to form a convoy 1904 based on common or overlapping travel schedules. For example, one vehicle system 1902A may be scheduled to travel from the starting location 2004 (shown in FIG. 20) to the second destination location 2008, another vehicle system 1902B may be scheduled to travel from a different (e.g., second) starting location to another destination location via the routes 2002B, 2002E, and another vehicle system 1902C may be scheduled to travel from another (e.g., third) starting location to the first destination location 2006. The scheduled trip of the second vehicle system 1902B may include travel from the second starting location to the yard 2012, while the scheduled trip of the third vehicle system 1902C may include travel from the third starting location to the siding 2018.

The control system 1900 can determine that the convoy 1904 that includes the vehicle system 1902A (and may include other vehicle systems 1902) can leave from the starting location 2004, travel to the yard 2012, then the yard 2014, then the siding 2018, then the first destination location 2006. Along the way, the second vehicle system 1902B can join up with (e.g., couple with the convoy 1904 logically and/or mechanically) at the yard 2012. This coupling can occur while the convoy 1904 is stationary or moving, as described herein. The second vehicle system 1902B can remain part of the convoy 1904 during travel on the routes 2002B, 2002E, but then may separate from the convoy 1904 (while the convoy 1904 is moving or stationary) at the siding 2018 to allow the second vehicle system 1902B to continue toward the destination location of the second vehicle system 1902B. The first vehicle system 1902A can continue in the convoy 1904 toward the first destination location 2006. The third vehicle system 1902C can join up with the convoy 1904 at the siding 2018, and can continue with the convoy 1904 to the first destination location 2006. The control system 1900 can direct the vehicle systems 1902 to join up and/or separate in this way so that the vehicle systems 1904 travel more often in convoys 1904 that reduce the fuel consumption, wear, wind drag, or the like, on the vehicle systems 1902 relative to the vehicle systems 1902 separately traveling to the respective destination locations.

The control system 1900 can select different groups of vehicle systems 1902 to form a convoy 1904 based on common or overlapping travel schedules. For example, one vehicle system 1902A may be scheduled to travel from the starting location 2004 (shown in FIG. 20) to the second destination location 2008, another vehicle system 1902B may be scheduled to travel from a different (e.g., second) starting location to another destination location via the routes 2002B, 2002E, and another vehicle system 1902C may be scheduled to travel from another (e.g., third) starting location to the first destination location 2006. The scheduled trip of the second vehicle system 1902B may include travel from the second starting location to the yard 2012, while the scheduled trip of the third vehicle system 1902C may include travel from the third starting location to the siding 2018.

The control system 1900 can determine requirements for different segments of a trip of the convoy 1904 to ensure that any vehicle systems 1902 that are added to the convoy 1904 for the entire or part of the trip can still meet the requirements of the trip. For example, before deciding to logically and/or mechanically add a vehicle system 1902 to an existing convoy 1904 or to another vehicle system 1902 to form a convoy 1904, the control system 1900 can calculate or estimate how much fuel or electric energy will be needed for the convoy 1904 to reach one or more upcoming locations, such as the final destination of the convoy 1904. This calculation or estimation can be based on previous trips of other convoys 1904 and/or based on mathematical models of the convoy 1904. The calculation or estimation can be based on the assumption that the vehicle system 1902 will join the convoy 1904. The control system 1900 can communicate with a controller onboard the vehicle system 1902 to be added to the convoy 1904 to determine whether the vehicle system 1902 has enough fuel and/or electric energy stored onboard the vehicle system 1902 to complete the trip of the convoy 1904 (or at least the portion of the trip that the vehicle system 1902 will be part of the convoy 1904). If the vehicle system 1902 has enough fuel and/or electric energy, then the control system 1900 can direct the vehicle system 1902 to join the convoy 1904. Otherwise, the control system 1900 may not direct the vehicle system 1902 to join the convoy 1904.

As another example, the control system 1900 can calculate or estimate how much tractive effort will be needed to propel the convoy 1904 to across or up one or more sections of routes of the trip. This calculation or estimation can be based on previous trips of other convoys 1904 and/or based on mathematical models of the convoy 1904. The calculation or estimation can be based on the assumption that the vehicle system 1902 will join the convoy 1904. The control system 1900 can communicate with a controller onboard the vehicle system 1902 to be added to the convoy 1904 to determine whether the convoy 1904 with the vehicle system 1902 to be added has the capability to generate the tractive effort needed to propel the convoy 1904 along and/or up the routes of the trip. If the convoy 1904 can generate enough tractive effort with the vehicle system 1902 added, then the control system 1900 can direct the vehicle system 1902 to join the convoy 1904. Otherwise, the control system 1900 may not direct the vehicle system 1902 to join the convoy 1904.

As another example, the control system 1900 can calculate or estimate whether the vehicle system 1902 to be added to the convoy 1904 will be able to travel fast enough to keep up with the other vehicle system(s) 1902 in the convoy 1904. Some vehicle systems 1902 may be limited in how fast the vehicle systems 1902 can move due to weight and/or size of the vehicle system 1902, wind drag on the vehicle system 1902, and the like. If the vehicle system 1902 can travel as fast as other vehicle systems 1902 in the convoy 1904, then the control system 1900 can direct the vehicle system 1902 to join the convoy 1904. Otherwise, the control system 1900 may not direct the vehicle system 1902 to join the convoy 1904.

As another example, the control system 1900 can calculate or estimate whether the vehicle system 1902 to be added to the convoy 1904 will be too limited by the slower speeds at which the convoy 1904 will travel. The vehicle system 1902 to be added to the convoy 1904 may need to reach one or more locations due to a schedule, manifest, or the like. If the convoy 1904 can travel fast enough to keep the vehicle system 1902 on schedule, then the control system 1900 can direct the vehicle system 1902 to join the convoy 1904. Otherwise, the control system 1900 may not direct the vehicle system 1902 to join the convoy 1904.

The schedule and/or location of a vehicle system 1902 may not coincide with travel of a convoy 1904 to which the vehicle system 1902 can be added (or with another vehicle system 1902 to form the convoy 1904). For example, the vehicle system 1902 to be added may be at a location though which the convoy 1904 will pass at a later time. The control system 1900 and/or controller of the vehicle system 1902 can weigh one option of waiting at the location to join the convoy 1904 against another option of continuing to travel without joining the convoy 1904. The control system 1900 and/or controller can calculate or estimate how much fuel or electric energy would be saved by the vehicle system 1900 waiting to join the convoy 1904 or traveling without the convoy 1904. If the saving in fuel or electric energy is greater than a threshold associated with the delay in travel of the vehicle system 1902 (with different thresholds associated with different delays in a memory accessible to the control system 1900 and/or controller), then the control system 1900 and/or controller can direct the vehicle system 1902 to wait and join the convoy 1904. Otherwise, the control system 1900 and/or controller can direct the vehicle system 1902 to proceed without waiting on the convoy 1904.

In one embodiment, the control system 1900 may select one or more non-propulsion-generating vehicles in one vehicle system 1902 in a convoy 1904 to be handed off to another vehicle system 1902 in the convoy 1904. For example, instead of a rail car or trailer always staying with the same locomotive, truck, or automobile, the control system 1900 may direct the rail car or trailer to switch to another vehicle system. A convoy 1904 may be traveling from a starting location to a destination via first, second, and third routes. A vehicle system 1902 having a non-propulsion-generating vehicle may join with the convoy 1904 at an intersection between the first and second routes and travel in the convoy 1904 to an intersection between the second and third routes. The non-propulsion-generating vehicle may separate (e.g., logically separate and/or mechanically separate) from the vehicle system 1902 at the intersection between the second and third routes, and logically and/or mechanically couple with another vehicle system 1902 in the convoy 1904 at this same location. The non-propulsion-generating vehicle may then travel in the convoy 1904 to the destination location along the third route.

The control system 1900 and/or onboard controllers of the vehicle systems 1902 in a convoy 1904 can direct which vehicle systems 1902 generate propulsive force at different times during travel of the convoy 1904. For example, the control system 1900 and/or onboard controllers can direct one or more propulsion-generating vehicles in the vehicle system 1902B in the convoy 1904 shown in FIG. 19 to generate tractive effort to move the convoy 1904 through or across one segment of the route(s), and can direct the propulsion-generating vehicles in the vehicle system 1902A and/or 1902C to not generate tractive effort through or across the same segment of the route(s). The control system 1900 and/or onboard controllers can direct one or more propulsion-generating vehicles in another vehicle system (e.g., the vehicle system 1902A) in the convoy 1904 to generate tractive effort to move the convoy 1904 through or across another, different segment of the route(s), and can direct the propulsion-generating vehicles in the vehicle system 1902B and/or 1902C to not generate tractive effort through or across the same segment of the route(s). The control system 1900 and/or controllers can alternate which vehicle system(s) 1902 generate tractive efforts at different times to reduce the amount of fuel and/or energy consumed by the entire convoy 1904 for a trip relative to all propulsion-generating vehicles always generating tractive effort during an entire trip. For example, one vehicle system 1902 can generate tractive effort to push and/or pull the convoy

1904 up one hill, while another vehicle system 1902 generates tractive effort to push and/or pull the convoy 1904 up another hill.

The control system 1900 and/or onboard controllers of the vehicle systems 1902 in a convoy 1904 can direct which vehicle systems 1902 generate braking force at different times during travel of the convoy 1904. For example, the control system 1900 and/or onboard controllers can coordinate which brakes of the vehicle systems 1902 in the convoy 1904 generate braking effort at different times and/or at different locations. The convoy 1904 may be able to safely slow or stop using the brakes of some, but not all, vehicle systems 1902 in the convoy 1904. The control system 1900 and/or controllers can alternate which vehicle systems 1902 brake while other vehicle systems 1902 do not brake to prolong the useful lives of the brakes in one or more of the vehicle systems 1902. Additionally, the control system 1900 and/or controllers can coordinate which vehicle systems 1902 in the convoy 1904 apply brakes to avoid crashes between the vehicle systems 1902 during slowing or stopping of the convoy 1904. For example, the control system 1900 and/or controllers can direct a trailing vehicle system 1902C to begin braking or otherwise slowing before a leading vehicle system 1902A, 1902B to prevent the vehicle systems 1902A, 1902B, 1902C from colliding when the vehicle system 1902A and/or 1902B begins braking.

The control system 1900 and/or onboard controllers can direct one or more propulsion-generating vehicles in another vehicle system (e.g., the vehicle system 1902A) in the convoy 1904 to generate tractive effort to move the convoy 1904 through or across another, different segment of the route(s), and can direct the propulsion-generating vehicles in the vehicle system 1902B and/or 1902C to not generate tractive effort through or across the same segment of the route(s). The control system 1900 and/or controllers can alternate which vehicle system(s) 1902 generate tractive efforts at different times to reduce the amount of fuel and/or energy consumed by the entire convoy 1904 for a trip relative to all propulsion-generating vehicles always generating tractive effort during an entire trip. For example, one vehicle system 1902 can generate tractive effort to push and/or pull the convoy 1904 up one hill, while another vehicle system 1902 generates tractive effort to push and/or pull the convoy 1904 up another hill.

The control system 1900 can limit or select the locations where vehicle systems 1902 add to or separate from a convoy 1904 (or with another vehicle system 1902 to form the convoy 1904). For example, with respect to automobiles, trucks, or other road-based vehicles, the control system 1900 can direct the vehicle systems 1902 to join the convoy 1904 and/or other vehicle systems 1902 at on ramps and/or off-ramps that are off highways or interstates, in sections of a road, highway, or interstate having at least a threshold number of lanes (e.g., at least three lanes), in sections of a road, highway, or interstate having less than a threshold density of vehicles (e.g., areas of less traffic congestion), or the like.

The above description of the convoys 1904, vehicle systems 1902, vehicles 1906, 1908, valves 1804, 1806, sensors 2104, 2106, control system 1900, and/or method 2200 can apply to a variety of different types of vehicles. In one embodiment, the vehicles 1906 may be trucks and the vehicles 1908 may be trailers pulled by the trucks. A truck and one or more trailers connected with the truck can form a vehicle system, and multiple vehicle systems can travel together as a convoy. The vehicle systems in the convoy may not be mechanically coupled with each other, but may be logically coupled by communicating with each other to coordinate movements of the vehicle systems with each other. In one embodiment, a vehicle system 1902 and/or convoy 1904 can be formed from different types of vehicles. For example, a convoy 1904 can be formed from one vehicle system 1902 formed from one or more automobiles and another vehicle system 1902 formed from one or more trucks having trailers. As another example, a convoy 1904 can be formed from one vehicle system 1902 formed from one or more rail vehicles and another vehicle system 1902 formed from one or more automobiles and/or trucks having trailers. The rail vehicle system 1902 may travel on tracks embedded or located within a road, while the automobiles and/or trucks travel on the road having the embedded tracks.

In one embodiment, a method includes identifying, using a control system, plural vehicle systems for combining into a larger convoy of vehicle systems. Each of at least two of the vehicle systems is formed from at least one propulsion-generating vehicle and at least one non-propulsion-generating vehicle. The method also includes directing the vehicle systems identified for combining to couple with each other for travel as the convoy from a first location toward a different, second location, and (in at least one intermediate location between the first location and the second location), directing one or more of at least a first vehicle system of the vehicle systems in the convoy to separate from the convoy and/or at least a second vehicle system that is outside of the convoy to join the convoy by coupling with at least one of the vehicle systems in the convoy. The at least one propulsion-generating vehicle and the at least one non-propulsion-generating vehicle in each of the vehicle systems in the convoy remain connected during separation of the first vehicle system from the convoy or during joining of the second vehicle system to the convoy.

Optionally, the method can include selecting one or more of the first vehicle system for separation from the convoy or the second vehicle system for joining the convoy based on a destination of at least one other vehicle system of the vehicle systems in the convoy.

Optionally, directing the one or more of the first vehicle system to separate from the convoy or the second vehicle system to join the convoy includes automatically directing valves of an air brake system in the convoy to open or close for isolating a conduit of the air brake system in the convoy.

Optionally, the method also includes automatically directing valves in the convoy located on opposite sides of a location of the decrease in pressure to open (or close). This can occur responsive to detecting an unexpected decrease in pressure in an air brake system in the convoy.

Optionally, directing the one or more of the first vehicle system to separate from the convoy or the second vehicle system to join the convoy occurs during designated times of a takt time schedule.

Optionally, the method can include determining that the convoy is longer than a siding section of a route and directing the first vehicle system to separate from the convoy so that the convoy without the first vehicle system fits on the siding section of the route.

Optionally, the method also includes determining that different vehicle systems in the convoy are headed in different directions after an intersection in a route, where the method can include directing the first vehicle system to separate from the convoy so that the first vehicle travels in a first direction after the intersection and a remainder of the convoy travels in a different, second direction after the intersection.

Optionally, directing the one or more the first vehicle system to separate from the convoy or the second vehicle system join the convoy occurs while the convoy is moving.

Optionally, the method can include combining vehicle systems with each other into a larger vehicle system while the smaller vehicle systems are moving. For example, a trailing vehicle system can speed up relative to a leading vehicle system and connect (logically and/or mechanically) with the leading vehicle system so that the leading and trailing vehicle systems are combined with each other.

Optionally, the method includes directing the first vehicle system to separate from the convoy responsive to one or more of determining that the convoy is experiencing a communication loss between the vehicles in the convoy or determining that the convoy is approaching at least one of a densely-populated area, an incline, a decline, an airflow restricted area, an inspection location, and/or a series of curves in the route.

In one embodiment, a system includes a control system configured to identify plural vehicle systems for combining into a larger convoy of vehicle systems. Each of at least two of the vehicle systems is formed from at least one propulsion-generating vehicle and at least one non-propulsion-generating vehicle. The control system also is configured to direct the vehicle systems identified for combining to couple with each other for travel as the convoy from a first location toward a different, second location. The control system also is configured to, in at least one intermediate location between the first location and the second location, direct one or more of at least a first vehicle system of the vehicle systems in the convoy to separate from the convoy and/or at least a second vehicle system that is outside of the convoy to join the convoy by coupling with at least one of the vehicle systems in the convoy. The at least one propulsion-generating vehicle and the at least one non-propulsion-generating vehicle in each of the vehicle systems in the convoy remain connected during separation of the first vehicle system from the convoy or during joining of the second vehicle system to the convoy.

Optionally, the control system also is configured to select one or more of the first vehicle system for separation from the convoy or the second vehicle system for joining the convoy based on a destination of at least one other vehicle system of the vehicle systems in the convoy.

Optionally, the control system also is configured to direct the one or more of the first vehicle system to separate from the convoy and/or the second vehicle system to join the convoy by automatically directing valves of an air brake system in the convoy to open or close for isolating a conduit of the air brake system in the convoy.

Optionally, the control system also is configured to automatically direct valves in the convoy located on opposite sides of a location of the decrease in pressure to open. This can occur responsive to detecting an unexpected decrease in pressure in an air brake system in the convoy.

Optionally, the control system also is configured to direct the one or more of the first vehicle system to separate from the convoy or the second vehicle system to join the convoy occurs during designated times of a takt time schedule.

Optionally, the control system also is configured to determine that the convoy is longer than a siding section of a route, where the control system is configured to direct the first vehicle system to separate from the convoy so that the convoy without the first vehicle system fits on the siding section of the route.

Optionally, the control system also is configured to determine that different vehicle systems in the convoy are headed in different directions after an intersection in a route, and is configured to direct the first vehicle system to separate from the convoy so that the first vehicle travels in a first direction after the intersection and a remainder of the convoy travels in a different, second direction after the intersection.

Optionally, the control system is configured to direct the first vehicle system to separate from the convoy responsive to one or more of determining that the convoy is experiencing a communication loss between the vehicles in the convoy and/or determining that the convoy is approaching at least one of a densely-populated area, an incline, a decline, an airflow restricted area, an inspection location, and/or a series of curves in the route.

In one embodiment, a system includes an electrically activated coupler configured to be connected with a first vehicle. The coupler configured to automatically actuate to couple with a second vehicle responsive to receipt of a control signal such that the coupler automatically couples the first vehicle with the second vehicle.

Optionally, the coupler is configured to automatically disconnect from the second vehicle such that the first vehicle and the second vehicle are automatically disconnected from each other.

Optionally, the coupler is configured to receive the control signal from a controller of the first vehicle.

In one embodiment, a method includes identifying a first vehicle system that is traveling from a first location toward a different, second location, and a second vehicle system for combining with the first vehicle system into a convoy of vehicle systems. The method also includes directing the first and second vehicle systems to couple with each other for travel as the convoy. The method includes, in at least one intermediate location between the first location and the second location, directing one or more of the second vehicle system of the convoy to separate from the convoy and/or a third vehicle system that is outside of the convoy to join the convoy by coupling with one or more of the first vehicle system or the second vehicle system in the convoy.

Optionally, one or more of the second vehicle system is directed to separate from the convoy while the convoy is moving or the third vehicle system is directed to join the convoy while the convoy is moving.

Optionally, directing the first and second vehicle systems to couple with each other as the convoy includes directing the first and second vehicle systems to maintain a separation distance between the first and second vehicle systems during travel in the convoy.

Optionally, directing the first and second vehicle systems to couple with each other as the convoy reduces a wind drag imparted on the second vehicle system relative to the second vehicle system traveling outside of the convoy.

Optionally, directing the first and second vehicle systems to couple with each other for travel as the convoy includes directing the first and second vehicle systems to travel closer to each other than a wireless communication range of a communication unit onboard at least one of the first or second vehicle systems.

Optionally, the method also includes directing wireless communication units onboard the first and second vehicle systems to communicate using a first wireless communication mode while the first and second vehicle systems are separated in the convoy by greater than a threshold distance, and directing the wireless communication units onboard the first and second vehicle systems to switch to communicating using a different, second wireless communication mode while the first and second vehicle systems are separated in the convoy by no greater than the threshold distance.

Optionally, the method also includes directing a controller onboard the first vehicle system to share a functionality of the first vehicle system with the second vehicle system while the first and second vehicle systems travel together in the convoy.

Optionally, the method also includes directing the first vehicle system and the second vehicle system to share compressed air with each other during travel in the convoy.

Optionally, the method also includes directing communication units of the first and second vehicle systems communicatively couple with each other in a mesh network during travel of the first and second vehicle systems in the convoy.

Optionally, the method also includes directing the first and second vehicle systems to coordinate different times when each of the first and second vehicle systems applies a brake of the respective first or second vehicle system during slowing of the convoy.

Optionally, the method also includes directing the first vehicle system and the second vehicle system to share coolant with each other during travel in the convoy.

Optionally, the method also includes directing the first vehicle system and the second vehicle system to share electric current with each other during travel in the convoy.

Optionally, the method also includes directing the first vehicle system and the second vehicle system to share fuel with each other during travel in the convoy.

Optionally, the method also includes directing the first vehicle system and the second vehicle system to alternate when propulsion systems onboard the first and second vehicle systems generate tractive effort in different segments of a trip of the convoy.

Optionally, the method also includes directing the first vehicle system to share one or more of sensor data or communications with the second vehicle system in the convoy.

Optionally, the method also includes determining whether the third vehicle system can meet a requirement of travel of the convoy to the second location, and, responsive to determining that the third vehicle system can meet the requirement, directing the third vehicle system to join the convoy.

Optionally, the first and second vehicle systems are different types of vehicle systems.

Optionally, the method also includes directing a fourth vehicle system to join the convoy at another intermediate location between the first and second locations, and the fourth vehicle system leaves the convoy prior to the convoy reaching the second location and travels to a third location.

Optionally, each of the first and second vehicle systems includes one or more propulsion-generating vehicles and at least one non-propulsion-generating vehicle, and at least one of the propulsion-generating vehicles in each of the first and second vehicle systems remains in the corresponding first or second vehicle system prior to the first and second vehicle systems joining with each other in the convoy and after the second vehicle system leaves the convoy.

Optionally, the method also includes each of the first vehicle system includes a non-propulsion-generating vehicle prior to joining with the second vehicle system to form the convoy, and the non-propulsion-generating vehicle remains with the second vehicle system after the second vehicle system separates from the convoy.

In one embodiment, a control system includes a controller having one or more processors that are configured to perform one or more (or all) of the operations described above in connection with the method.

Figure 24:
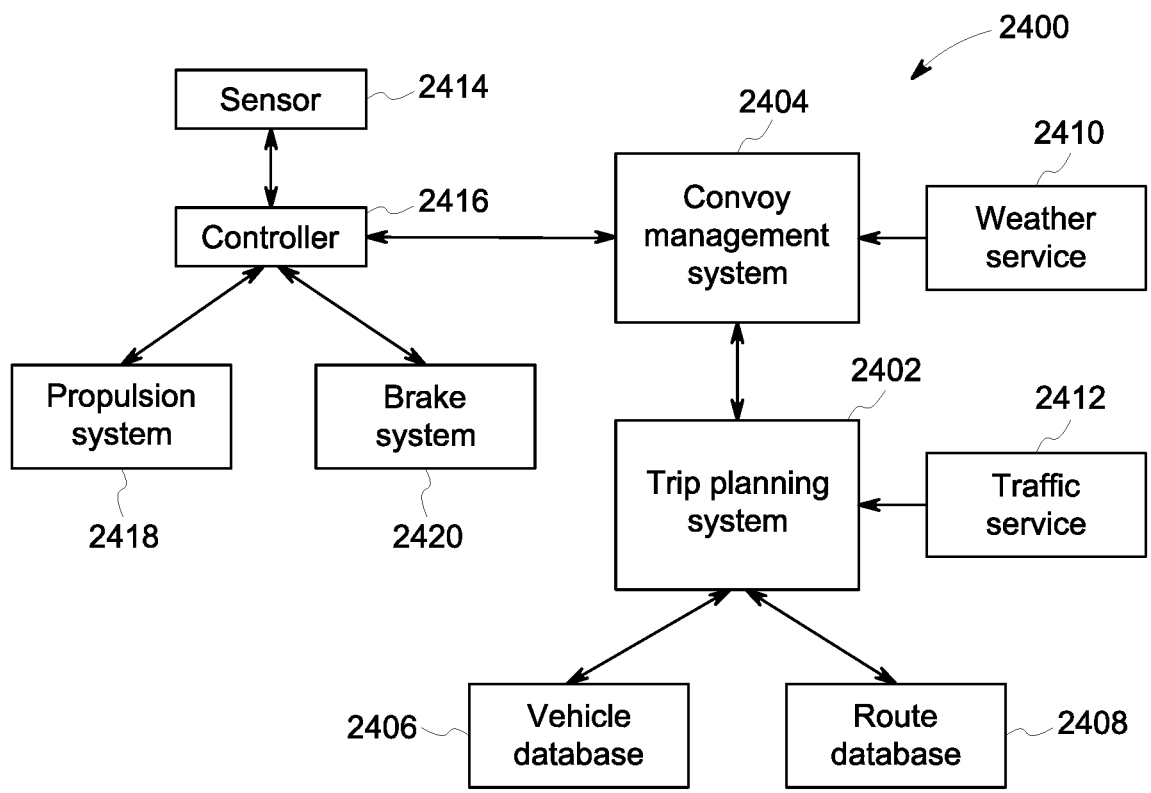
FIG. 24 illustrates another vehicle convoy control system according to one embodiment.

FIG. 24 illustrates another vehicle convoy control system 2400 according to one embodiment. The control system can determine spacing and/or ordering of vehicle systems in a convoy that may dynamically change at different locations and/or times during a trip of the convoy. As described herein, the convoys can be formed from vehicle systems that are not mechanically coupled with each other, but that communicate with each other to travel together along routes. Alternatively, the vehicle systems in the convoys described above and below may not communicate with each other, but may communicate with the control system (or other system) to coordinate the movements of the vehicle systems so that the vehicle systems travel together as the convoy. As described below, at least one embodiment includes a convoy that has two or more vehicle systems that can mechanically couple with each other during travel of the convoy.

The control system can forecast the forces imparted on the vehicle systems in the convoy, as well as speeds at which the vehicle systems in the convoy are to travel, as a function of distance along one or more routes, locations in the one or more routes, and/or time during a trip of the convoy. The spacing between the vehicle systems in the convoy and/or the order in which the vehicle systems are in the convoy can be based on these forces and/or speeds, and also can change as a function of distance, locations, and/or time during the convoy trip. The control system can determine the forces, speeds, spacing, and/or vehicle system order in a convoy for different trip locations, trip times, and/or trip distances for the entire upcoming trip of the convoy, or for a moving look-ahead window of the trip.

The control system can determine the forces, speeds, spacing, and/or vehicle system order by computing an optimal tradeoff between braking and aerodynamic losses for a given terrain and traffic condition as well as differences in payload and powertrain characteristics for vehicle systems in the convoy that results in equitable and minimal fuel consumption for each individual vehicle system.

The control system includes a trip planning system 2402 and a convoy management system 2404. The convoy management system optionally can be referred to as a control system that also can include controllers on the vehicle systems. Each of these planning systems includes hardware circuitry that includes and/or is connected with one or more processors. Some or all processors of the trip planning system may be the same or different processors than those of the convoy management system. For example, one or more processors may be shared between and perform one or more operations of each of the planning systems, or the planning systems may each be formed from separate processors that do not perform the operations of the other planning system.

The trip planning system determines a trip plan for a convoy, with the plan dictating or designating one or more operational settings of vehicle systems within the convoy for different distances along the route(s) of the trip, for different locations along the route(s) of the trip, and/or for different times during the trip. These operational settings can be moving speeds of the vehicle systems in the convoy, throttle settings of the vehicle systems in the convoy, brake settings of the vehicle systems in the convoy, accelerations of the vehicle systems in the convoy, decelerations of the vehicle systems in the convoy, and the like. The trip planning system determines the trip plan so that the convoy completes the trip (e.g., from a starting location to a final destination location, or between any other two locations that may not include one or both of the starting and destination locations) within a designated period of time (e.g., before or no later than a scheduled arrival time). In one embodiment, the trip planning system may dictate speeds of the convoy that differ from one or more speed limits of the routes being traveled upon.

The trip planning system can calculate the convoy speeds and power outputs (by the propulsion-generating vehicles in the vehicle systems of the convoy) needed to complete the trip on time, while resulting in the propulsion-generating vehicles of the convoy consuming less fuel than the propulsion-generating vehicles would have consumed if traveling according to operational settings that differ from those of the trip plan. For example, the trip planning system can determine the trip plan to result in the vehicle systems consuming less fuel and arriving on time, while abiding by applicable speed limits of the routes.

The trip planning system can determine the operational settings for the trip plan using information provided by an operator of the control system, information provided by an operator of one or more vehicle systems in the convoy, information stored in one or more databases 2406, 2408, and/or information obtained from one or more other systems 2410, 2412. The databases 2406, 2408 represent the same or different tangible and non-transitory computer-readable storage media, such as computer hard drives, computer servers, optical discs, removable discs, or the like.

The database 2406 can be referred to as a vehicle database that stores information about characteristics of the vehicle systems in the convoy, the vehicle systems that will travel together as the convoy, and optionally other vehicle systems that may join the convoy. These characteristics can include a size of a vehicle or vehicle system (e.g., length and/or height), a weight of a vehicle or vehicle system, a number of the vehicles or vehicle systems in the convoy, an engine rating of an engine onboard a vehicle or vehicle system, a type of fuel consumed by a vehicle or vehicle system, a type of powertrain of a vehicle or vehicle system, and/or a presence of a drag-altering device on a vehicle or vehicle system. The drag-altering device can be a skirt, scoop, or other device coupled with a vehicle that reduces the wind drag exerted on the vehicle (relative to the vehicle not having the device).

The database 2408 can be referred to as a route database that stores information about characteristics of the routes that the convoy will travel along. These characteristics can include grades (e.g., degrees of incline and/or decline), curvatures (e.g., radii of curves), speed limits, restrictions (e.g., due to ongoing maintenance or repair of the route), and the like.

The trip planning system can use the vehicle characteristics and route characteristics to determine the trip plan. For example, the trip planning system can calculate the operational settings for the trip plan as a function of location, distance, and/or time by modeling the forces imparted on the convoy for different combinations of the operational settings, the fuel consumed by the vehicle systems in the convoy for different combinations of the operational settings, and/or the arrival time or time needed to complete the trip for the different combinations of the operational settings. The trip planning system can then select the combination of operational settings that provide for reduced forces and/or reduced fuel consumption, while providing for the convoy to arrive on time, as the operational settings of the trip plan.

The trip planning system provides the trip plan to the convoy management system. Optionally, the trip planning system can provide several different trip plans to the convoy management system, such as the trip plan associated with the lowest fuel consumption of the different combinations of operational settings that were considered, the trip plan associated with the smallest forces imparted on the convoy among the different combinations of operational settings that were considered, the trip plan associated with the shortest time to complete the trip among the different combinations of operational settings that were considered, and the like.

The convoy management system coordinates the configuration of the convoy to achieve the forecasted drive profile (e.g., the trip plan provided by the trip planning system, or for each of the different trip plans provided by the trip planning system), and determines a convoy order and inter-vehicle spacing to dynamically deal with variations in the convoy. These variations can include the number of vehicle systems in the convoy, engine ratings of the propulsion-generating vehicles in the convoy, the type of power trains of the propulsion-generating vehicles in the convoy (e.g., hybrid, diesel, or other advanced power trains), etc.

The convoy management system determines the configuration of the convoy as inter-vehicle spacing and/or the vehicle order within the convoy. While the following description focuses on trucks as the vehicles (e.g., semi-trailer trucks and/or rigid trucks with trailers), the description also can be used with other types of vehicles, such as automobiles, buses, rail vehicles, mining vehicles, and the like. Additionally, at least one embodiment can be used to determine convoy configurations for convoys that include different types of vehicles (e.g., a mixture of trucks, automobiles, buses, etc.). The inter-vehicle spacing optionally can be referred to as an inter-truck spacing. This spacing defines the separation distance between neighboring vehicle systems in the convoy.

In one embodiment, the convoy management system operates to determine the convoy configurations to reduce fuel consumption of a convoy by reducing how often the vehicles in the convoy brake. A variety of different convoy configurations can be examined to determine which of the configurations are predicted or estimated to require less braking by vehicles in the convoy (and therefore consume less fuel) than one or more (or all) other configurations that are examined. The configuration associated with less or the least amount of braking can be selected as the configuration to be used during travel of the convoy.

But, reducing fuel consumption by reducing braking via control of convoy configurations may interfere with the attempts of the energy management systems described herein to increase fuel savings via creation of a trip plan. The energy management system can create a trip plan to reduce the amount of fuel consumed by a convoy relative to the same convoy traveling the same route using operational settings that differ from those dictated by the trip plan. But, the convoy configuration that is identified as reducing fuel consumption (by reducing vehicle braking) may result in the vehicles not following the trip plan as closely. For example, the convoy configuration can prevent or interfere with one or more vehicles traveling according to the operational settings dictated by the trip plan. The vehicles may not be able to travel at the designated speeds, throttle settings, or the like, of the trip plan due to the required inter-vehicle spacing required by the convoy configurations that are determined.

Therefore, in one embodiment, the vehicle controller, the convoy management system, and/or the energy management system can iteratively optimize for fuel savings and change or determine different operational settings, a different convoy configuration and/or a different trip plan to reduce the losses in fuel savings that may occur by following a previously determined convoy configuration and/or trip plan too closely. For example, a first convoy configuration may be determined and expected by the convoy management system to result in a first reduction in fuel consumption for a trip of a convoy. A first trip plan may be determined and expected by the energy management system to result in a larger, second reduction in fuel consumption for the same trip of the convoy (relative to traveling according to operational settings other than those of the first trip plan). But, the first configuration of the convoy may prevent the vehicles in the convoy from operating according to the first trip plan and, therefore, the convoy may not achieve the larger, second reduction in fuel consumption associated with the first trip plan. The energy management system can then modify the operational settings of the first trip plan to different operational settings of a different, second trip plan. This second trip plan may have operational settings that do not achieve the second reduction in fuel consumption associated with the first trip plan, but that do allow for the vehicles in the convoy to travel in the first convoy configuration associated with the first reduction in fuel consumption.

Figure 25:
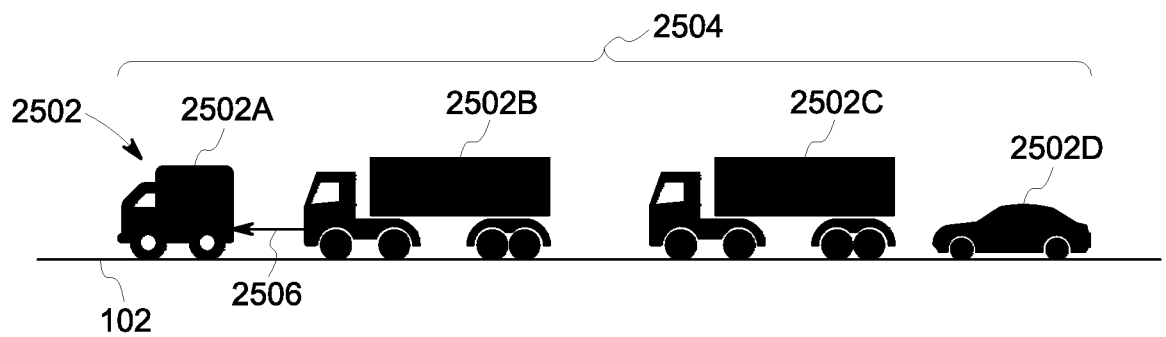
FIG. 25 illustrates another example of a convoy moving along a route.

FIG. 25 illustrates another example of a convoy 2504 moving along a route 102. The convoy shown in FIG. 25 can represent one of the convoys 1904 described above. The convoy is formed from several vehicle systems 2502 (e.g., vehicle systems 2502A-D) that are not mechanically coupled with each other. The vehicle systems shown in FIG. 25 can represent one or more of the vehicle systems shown and/or described herein. The vehicle system 2502A represents a rigid truck with trailer, the vehicle systems 2502B, 2502C represent semi-trailer trucks, and the vehicle system 2502D represents an automobile. Optionally, one or more other vehicle systems may be included in the convoy, such as a rail vehicle (traveling on a track that is at least partially embedded in a road).

The convoy management system can determine inter-vehicle spacing 2506 as separation distances between neighboring vehicle systems in the convoy. The inter-vehicle spacing can be the shortest distance between a trailing end of a leading vehicle system and a leading end of a trailing vehicle system that is moving behind the leading vehicle system. The convoy management system calculates the inter-vehicle spacings using the operational settings dictated by the trip plan, as well as characteristics of the routes being traveled upon and/or the characteristics of the vehicle systems.

With respect to the trip plan, the convoy management system can calculate larger inter-vehicle spacings between the vehicle systems for portions of the trip having more frequent changes in speeds and/or accelerations than for other portions of the trip. For example, during portions of the trip where the vehicle systems in the convoy are traveling at the same or substantially the same speed (e.g., the speeds do not vary from each other by more than 5%), the convoy management system can decrease the inter-vehicle spacings. During other portions of the trip where the vehicle systems in the convoy are changing speeds more often (e.g., the vehicle systems are speeding up, slowing down, or changing throttle settings at a rate that exceeds a designated threshold rate), the convoy management system can increase the inter-vehicle spacings.

With respect to the vehicle system characteristics, the convoy management system can determine larger inter-vehicle spacings for vehicle systems based on weight of the vehicle systems. For example, the vehicle systems 2502B, 2502C may be heavier than the vehicle systems 2502A, 2502D and, as a result, may require greater distances to slow or stop relative to lighter vehicle systems. The convoy management system can increase the inter-vehicle spacing between each of the vehicle systems 2502B, 2502C and the vehicle system ahead of each of the vehicle systems 2502B, 2502C (e.g., the vehicle systems 2502A, 2502B), and decrease or maintain the inter-vehicle spacing between the lighter vehicle system 2502D and the vehicle system 2502C ahead of the vehicle system 2502D. In one embodiment, the convoy management system changes the inter-vehicle spacings by different distances based on the weight(s) of the vehicle system(s). For example, the inter-vehicle spacings may be increased to larger distances for pairs of vehicle systems having heavier vehicle systems and decreased to shorter distances for pairs of vehicle systems having lighter vehicle systems.

The convoy management system can determine the inter-vehicle spacings based on a combination of vehicle characteristics and other characteristics, such as weather conditions. The convoy management system can obtain weather reports or forecasts from one or more weather services 2410 (shown in FIG. 24), such as the National Weather Service, the National Oceanic And Atmospheric Administration, or the like. The convoy management system can increase inter-vehicle spacings between pairs of vehicle systems that include taller vehicle systems and/or vehicle systems having higher centers of gravity while these vehicle systems are traveling in areas having stronger winds and/or areas having headwinds. For example, if the vehicle system 2502C is taller than the vehicle system 2502D and/or has a higher center of gravity than the vehicle system 2502D, the convoy management system can increase the inter-vehicle spacing between the vehicle systems 2502C, 2502D in areas having faster winds and/or headwinds, and can decrease the inter-vehicle spacing between these vehicle systems in areas having slower or no winds. This can allow for the trailing vehicle system 2502D to have enough room to slow down in the event that winds suddenly cause the vehicle system 2502C to slow down.

As another example, the convoy management system can increase inter-vehicle spacings between pairs of vehicle systems during travel through hazardous weather conditions, such as travel through areas of precipitation, ice conditions, or the like. The convoy management system can decrease the inter-vehicle spacings between pairs of vehicle systems once the convoy exits the area of hazardous weather conditions, such as travel through areas of precipitation, ice conditions, or the like.

With respect to the route characteristics, the convoy management system can determine the inter-vehicle spacings based on grades in the route. For example, the convoy management system can increase the inter-vehicle spacings for portions of the route that approach (e.g., are within a designated distance, such as five kilometers) inclines in the grade of the route, that approach a flatter or inclined grade after a decline in the grade, that approach curves in the route, or the like. The convoy management system can decrease the inter-vehicle spacings for portions of the route that have flatter grades (e.g., the grade of the route does not incline or decline by more than three degrees for at least at threshold distance) and/or for longer portions of the route that have a grade that does not change by a threshold amount (e.g., the incline or decline in the grade does not change more than 10% for at least five kilometers). In one embodiment, the convoy management system changes the inter-vehicle spacings by different distances based on amount of incline or decline in the route. For example, the inter-vehicle spacings may be increased by larger distances for steeper inclines or declines and decreased to shorter distances for flatter grades in the route.

The convoy management system can determine the inter-vehicle spacings based on curvatures in the route. For example, the convoy management system can increase the inter-vehicle spacings for portions of the route that approach (e.g., are within a designated distance, such as one kilometer) curves having a radius of curvature that is smaller than a designated radius. The convoy management system can decrease the inter-vehicle spacings for portions of the route that curves with larger radii of curvature or that are straight. In one embodiment, the convoy management system changes the inter-vehicle spacings by different distances based on the radius of curvature in the route. For example, the inter-vehicle spacings may be increased to larger distances for smaller radii of curvature and decreased to shorter distances for larger radii of curvature.

The convoy management system optionally can change the inter-vehicle spacings based on other environmental conditions. As one example, the convoy management system can change the inter-vehicle spacings based on how much traffic congestion there is on the route(s) being traveled by the convoy. The convoy management system can obtain measurements of traffic congestion from a traffic service 2412. The traffic service represents one or more computerized systems that determine, calculate, and/or obtain measurements of traffic congestion. These measurements can indicate the density of vehicles or vehicle systems within different geographic areas or along different sections of routes. The traffic service can determine traffic congestion by determining how many vehicle systems and/or convoys are in a geographic area based on signals received from global positioning system receivers onboard the vehicle systems and/or convoys, based on images or videos from cameras, based on roadside sensors, or the like.

During movement of the convoy through a geographic area associated with increased traffic congestion, the convoy management system can increase the inter-vehicle spacing within a convoy. This can provide for increased stopping distance between the vehicle systems in the convoy in the event of a sudden slowing or stoppage due to traffic congestion. During movement of the convoy through a geographic area associated with less traffic congestion, the convoy management system can decrease the inter-vehicle spacing within a convoy. The convoy management system can compare the traffic congestion to one or more thresholds (e.g., by comparing measured traffic density with one or more thresholds associated with different inter-vehicle spacings), and vary the inter-vehicle spacings based on which threshold(s) are exceeded by the measured traffic congestion.

As another example of environmental conditions, the convoy management system can change the inter-vehicle spacings based on the presence of a non-convoyed vehicle system within a designated distance of the convoy. A non-convoyed vehicle system is a vehicle system (formed from a single vehicle or multiple vehicles, as described herein) that is not part of any convoy. For example, a convoy of trucks traveling down a highway may travel alongside, behind, or in front of an automobile that is not included in any convoy. The convoy management system can increase the inter-vehicle spacing within the convoy responsive to the convoy moving within a designated distance of a non-convoyed vehicle. For example, the convoy may have one or more sensors 2414 that include a camera, proximity sensor (e.g., radar, a laser distance measuring device, LiDAR, etc.), or a location sensor (e.g., global positioning system receivers). These sensors can detect the presence of a non-convoyed vehicle (or other object that is not included in the convoy) within a designated distance of the sensors, such as the focal range of a camera, the range in which the proximity sensor can detect objects, etc. With respect to the location sensor, the controller can compare the location of the vehicle system or convoy with reported locations of other vehicles near the convoy (which can be reported to the controller or the convoy management system by location sensors onboard the other vehicles).

Responsive to the sensors detecting the non-convoyed vehicle or object, the convoy management system (or a controller 2416 onboard one or more of the vehicle systems of the convoy) can increase the inter-vehicle spacing between at least two of the vehicle systems in the convoy. Responsive to the sensors detecting that the non-convoyed vehicle or object is no longer near the convoy, the convoy management system (or the controller) can decrease the inter-vehicle spacing between at least two of the vehicle systems in the convoy. The controller shown in FIG. 24 can represent one or more of the vehicle controllers described herein.

The convoy management system can change the inter-vehicle spacing during a trip to reduce how many accelerations or decelerations of the vehicle systems occur (relative to not changing the inter-vehicle spacing). For example, the convoy management system can increase the inter-vehicle spacing to reduce how many times a vehicle system in the middle or end of the convoy brakes and subsequently accelerates to keep up with a leading vehicle system. Reducing the accelerations and decelerations of the vehicle systems can reduce the amount of fuel consumed by the vehicle systems.

The convoy management system (and/or controller) can change the inter-vehicle spacing with respect to time during the trip of the convoy. The spacing may change due to changes in environmental and other conditions during travel. For example, as the route grade changes, as the route curvature changes, as the wind speed and/or direction changes, as the weather changes, as the speed limits change, as traffic congestion changes, as different vehicle systems join and/or leave the convoy, and the like, the convoy management system and/or controller can adjust the inter-vehicle spacings as described herein. The inter-vehicle spacings in a convoy need not be the same between all pairs of neighboring vehicle systems. The inter-vehicle spacings can differ for different pairs of the vehicle systems.

During travel of the convoy, the controller onboard one or more (or each) of the vehicle systems can automatically monitor the inter-vehicle spacing between the vehicle system that includes the controller and the vehicle system ahead of or behind the vehicle system. The sensors can measure the inter-vehicle spacing between the vehicle system that includes the sensors and another vehicle, and the controller can automatically change a throttle setting of a propulsion system 2418 and/or engage (or disengage) a brake system 2420 of the vehicle system. As described herein, the propulsion system can include engines, traction motors, alternators, rectifiers, batteries, and the like, that operate to propel a vehicle system. The brake system can include friction brakes, air brakes, regenerative braking by traction motors, or the like, to slow or stop movement of the vehicle system. The convoy management system can communicate with the controllers of the vehicle systems in the convoy (e.g., using communication devices having wireless transceiving circuitry) to update or change the inter-vehicle spacings as described herein.

Optionally, the convoy management system can change the order in which the vehicle systems are in the convoy. The order of the vehicle systems indicates where each vehicle system is in the convoy. With respect to the example shown in FIG. 25, the vehicle system 2502A is in the first location in the convoy order, the vehicle system 2502B is in the second location in the convoy order, the vehicle system 2502C is in the third location in the convoy order, and the vehicle system 2502D is in the fourth (and last) location in the convoy order. The convoy management system can change the convoy order by communicating instructions to the controllers onboard the different vehicle systems in the convoy that direct the vehicle systems to pass ahead of one or more other vehicle systems in the convoy or to allow one or more other vehicle systems to pass ahead in the order. The convoy order can change while the convoy is moving, or the convoy order can change while the vehicle systems in the convoy are stationary (e.g., in a parking lot, along the side of the road, in a rail yard, or the like).

The convoy management system can change the convoy order based on a fuel savings comparison for the vehicle systems. Different vehicle systems may change how efficiently the vehicle systems consume fuel during movement of the convoy. For example, some vehicle systems may be more efficient in consuming fuel while traveling at one or more speeds, while traveling on one or more segments of the routes, while traveling in certain weather conditions (e.g., based on wind speed and/or direction), etc. The efficiency at which a vehicle system moves can be calculated as the rate of fuel consumed for the distance traveled, the rate of fuel consumed over a designated time period or per unit time, the rate of fuel consumed per unit of horsepower generated, or the like. Greater fuel efficiencies of vehicle systems can indicate that the vehicle systems have greater fuel savings than vehicle systems having lesser fuel efficiencies. The convoy management system can communicate with the controllers of the vehicle systems to determine the fuel efficiencies of the vehicle systems. The controllers may communicate with fuel gauges or sensors, as well as determine throttle settings and/or estimate the horsepower generated (e.g., based on the torque generated and engine speed), to calculate the fuel efficiencies of the vehicle systems. These fuel efficiencies can be communicated to the convoy management system, which compares the fuel efficiencies with each other. The fuel efficiencies for different vehicle systems traveling in different conditions, different portions of the routes, and/or in different locations in convoys can be tracked over time to determine more fuel-efficient locations in the convoy order for the vehicle systems in various combinations of conditions. The convoy management system can then use this information to determine the order of the vehicle systems in the convoy.

The convoy management system can change the convoy order based on a fuel burn equality measure of the convoy. The fuel burn equality measure can be an indication of which vehicle systems have been in less fuel-efficient locations in the convoy order for longer than other vehicle systems. For example, the leading vehicle system in the convoy is likely to burn fuel less efficiently than trailing vehicle systems due to the leading vehicle system experiencing greater wind drag and the trailing vehicle systems experiencing less wind drag. The convoy management system can monitor how long each vehicle system is located in the leading or first location in the convoy, and can change the convoy order to even out or reduce disparities in how long each vehicle system is in the leading or first location.

The convoy management system can change the convoy order based on the wind speed and/or direction of wind. If the convoy is traveling into a strong wind (e.g., the head wind is at least a designated speed), then the convoy management system may change the convoy order so that a shorter vehicle system is in the leading location in the convoy order. If the convoy is traveling with a strong wind (e.g., the tail wind is at least a designated speed), then the convoy management system may change the convoy order so that a taller vehicle system is in the leading location in the convoy order. This can allow for the tail wind to benefit forward movement of one or more other, shorter vehicle systems in the convoy that trail the taller vehicle system.

The convoy management system can add vehicle systems to and/or remove vehicle systems from a convoy during the trip of the convoy. A convoy can be formed of several vehicle systems traveling from a starting location to a destination location, and a vehicle system may wish to join the convoy at an intermediate location to benefit from the fuel savings resulting in less wind drag. As one example, a truck wishing to join the convoy can communicate with the convoy management system to determine whether the truck can join the convoy. The convoy management system can communicate instructions with the truck to inform the truck how to join the convoy. For example, the convoy management system can identify a mile marker, a highway on-ramp, a time, and/or the like, where and when the truck is to join the convoy. The truck can then travel to the designated location at the designated time, and join the convoy as the convoy arrives or travels past the location.

The joining vehicle system may have experience less wind drag by joining the convoy than if the joining vehicle system completed a trip without joining the convoy. The joining vehicle system or the convoy management system can weigh the benefit in joining the convoy versus any delay in starting the trip of the joining vehicle system. For example, the joining vehicle system may consume less fuel by joining the convoy, but the departure of the joining vehicle system may be delayed. If the benefit of the increased fuel savings outweighs the delayed departure, then the joining vehicle system may delay leaving on its trip to join the convoy as the convoy passes the location of the joining vehicle system. The joining vehicle system need not complete the trip of the convoy with the convoy. Instead, the joining vehicle system may only join the convoy for part of the convoy trip, and may leave the convoy before the convoy trip is completed or may continue moving without the convoy after the convoy completes the convoy trip.

The convoy management system can coordinate the formation and changes to convoys that are formed from vehicle systems owned by different entities. The entity that owns a vehicle system may be a person, company, government agency, or the like, holding title or license to the vehicle system. Some convoys may be formed from vehicle systems owned by the same entity, while other convoys may include vehicle systems owned by two or more different entities. For example, different entities can subscribe to a service provided by the convoy management system that identifies convoys in which vehicle systems can join. The convoy management system can communicate with vehicle systems to inform the vehicle systems of convoys that the vehicle systems can join based on scheduled trips of the vehicle systems. For example, the convoy management system can identify convoys that are traveling to or toward a scheduled destination location of another vehicle system, and can instruct the vehicle system where and when to join the convoy.

The vehicle systems that join convoys can be directed by the convoy management system to logically couple with the convoys. This can involve the vehicle systems traveling ahead of the convoy, behind the convoy, or between vehicle systems already in the convoy, and having the controllers of the vehicle systems communicate with each other to form communication links, communication paths, or a network (e.g., a mesh network). The establishment of communication links logically couples the vehicle systems with each other in the convoy, so that the controllers can communicate with each other to ensure that the vehicle systems coordinate their movements with each other.

Figure 26:
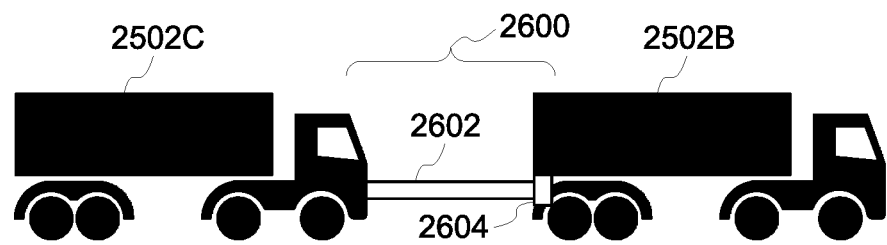
FIG. 26 illustrates one embodiment of a mechanical coupling system for vehicle systems in the convoy shown in FIG. 25.

Optionally, two or more vehicle systems in the convoy can mechanically couple with each other. FIG. 26 illustrates one embodiment of a mechanical coupling system 2600 for vehicle systems 2502B, 2502C in the convoy shown in FIG. 25. The mechanical coupling system is not limited to use on the semi-trailer trucks shown in FIG. 25. Instead, the automobile or rigid trailer truck can use the mechanical coupling system. The mechanical coupling system includes couplers 2602 on one vehicle system, such as elongated arms with hooks and/or pins, that mate and connect with corresponding receptacles 2604 on another vehicle system. A motor can extend the couplers toward the receptacles to mate the couplers with the receptacles. The vehicle systems can mechanically couple with each other to allow the leading vehicle system to help pull the trailing vehicle system up an incline to reduce the fuel consumed by the trailing vehicle system. Optionally, the trailing vehicle system can apply its brakes to help slow or stop movement of the leading vehicle system using the couplers and receptacles. The motor can extend the couplers while the vehicle systems are moving to allow the vehicle systems to mechanically couple with each other during movement of the convoy (and to avoid delays caused by otherwise having to stop and couple the vehicle systems with each other).

Figure 27:
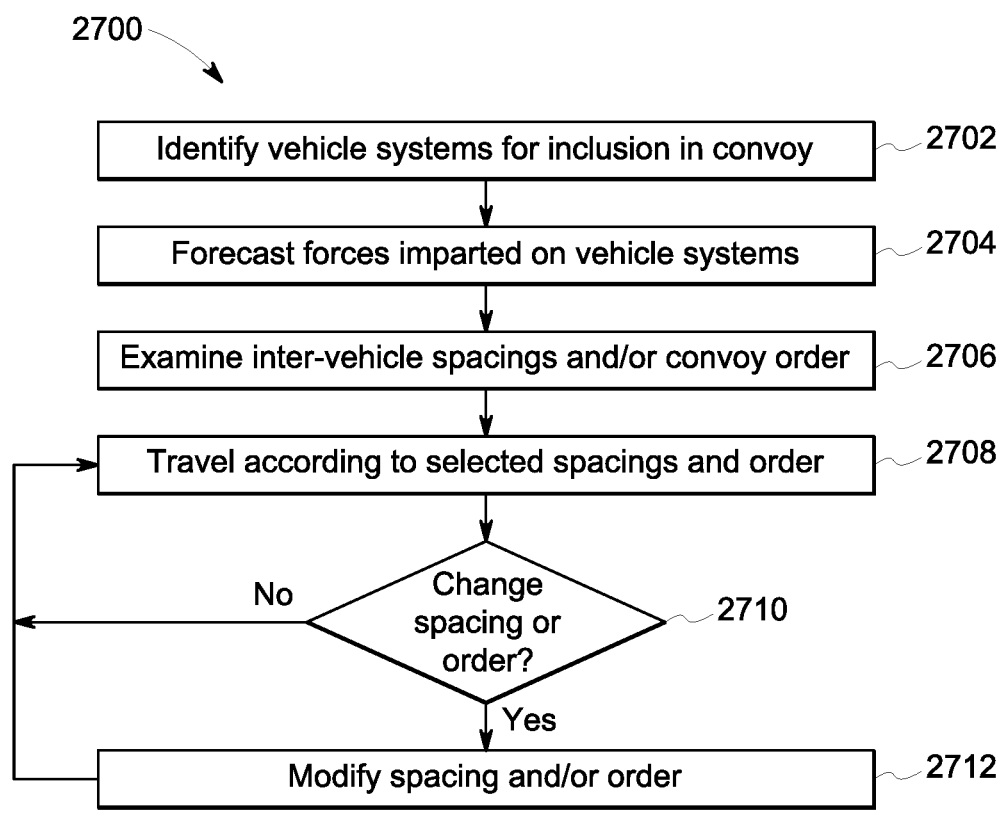
FIG. 27 illustrates a flowchart of one embodiment of a method for determining dynamically changing inter-vehicle spacings in a convoy.

FIG. 27 illustrates a flowchart of one embodiment of a method 2700 for determining dynamically changing inter-vehicle spacings in a convoy. The method 2700 can represent at least some of the operations performed by the convoy management system and/or controllers onboard the vehicle systems. At 2702, vehicle systems that are to form a convoy are identified. The vehicle systems can be identified based on current locations of the vehicle systems, destination locations of where the vehicle systems are traveling toward, and/or when the vehicle systems are traveling toward the destination locations. The convoy management system can determine if two or more of the vehicle systems are traveling on the same or nearby routes (e.g., within a designated distance of each other, such as fifty kilometers). The convoy management system can select the vehicle systems that are near each other, that are heading toward a common location, and/or that will be traveling by each other for inclusion in the convoy.

At 2704, forces imparted on the vehicle systems to be joined in the convoy are forecasted. These forces can be calculated by the convoy management system based on environmental conditions (e.g., wind speed and direction), route characteristics (e.g., route grades, curvatures, and speed limits), and/or vehicle system characteristics (e.g., vehicle system weights and/or sizes). The convoy management system can calculate the wind drag forces that will be or are likely to be imparted on the vehicle systems using this information. In one embodiment, the convoy management system can use models or equations such as the drag equation (to calculate Raleigh drag on a vehicle system) to forecast the wind drag forces that will be imparted on a vehicle system.

At 2706, different combinations of inter-vehicle spacings and/or orders of the vehicle system are examined to determine which combination of spacings and/or orders decrease the fuel consumption by one or more (or all) of the vehicle systems in the convoy. The convoy management system can simulate travel of different combinations of inter-vehicle spacings and convoy orders to determine which combination results in the least amount of fuel being consumed (or that results in less fuel being consumed by one or more, but not all, other combinations). The convoy management system can simulate travels of different combinations by changing the inter-vehicle spacings and/or convoy orders at different locations to select the combination of spacings and orders to use. The inter-vehicle spacings and/or convoy orders can be communicated to the vehicle systems.

At 2708, the vehicle systems automatically travel using the inter-vehicle spacings and convoy orders. The controllers of the vehicle systems can repeatedly check the distance to other vehicle systems in the convoy, and can automatically change speeds to maintain the inter-vehicle spacings and convoy order designated by the convoy management system.

At 2710, a determination is made as to whether an inter-vehicle spacing or convoy order needs to be changed. The forecasted conditions used to determine the inter-vehicle spacings and convoy order may differ from the actual conditions in which the convoy travels. For example, the wind may be faster or in another direction, traffic congestion may be worse or better than expected, fewer or more vehicles may be available to join the convoy, etc. As another example, one or more of the vehicle systems in the convoy may experience system failure or damage that changes the propulsion and/or braking capability of the vehicle systems. In another example, a vehicle system may wish to join or leave the convoy. If the actual conditions differ from the forecasted conditions, then flow of the method 2700 can proceed to 2712. Otherwise, flow of the method 2700 can return toward 2708.

At 2712, the inter-vehicle spacing and/or convoy order is changed. For example, the convoy management system can communicate with the vehicle system controllers to increase or decrease how far apart the vehicles are from each other, and/or to change the order of the vehicle systems in the convoy. Optionally, the convoy management system can communicate with the controllers to add a vehicle system to the convoy or remove a vehicle system from the convoy, as described herein.

In one embodiment, a method includes determining an inter-truck spacing in a convoy formed from two or more trucks traveling together along one or more routes, changing movement of at least one of the trucks in the convoy to maintain the inter-truck spacing, and dynamically changing the inter-truck spacing during movement of the convoy along the one or more routes.

Optionally, the inter-truck spacing changes with respect to time during a trip of the convoy. The inter-truck spacing can be based on one or more characteristics of the trucks. The one or more characteristics of the trucks can include one or more of a size of at least one of the trucks, a weight of at least one of the trucks, a number of the trucks in the convoy, an engine rating of at least one of the trucks, a type of fuel consumed by at least one of the trucks, a type of powertrain of at least one of the trucks, and/ro a presence of a drag-altering device on at least one of the trucks.

The inter-truck spacing can be based on one or more of a wind speed or a wind direction. Optionally, the inter-truck spacing can be based on one or more planned speeds at which the convoy is to move along the one or more routes. The one or more planned speeds can be speed limits of the one or more routes. As another example, the one or more planned speeds can be determined by an energy management system as the one or more planned speeds at which travel of the convoy will consume less fuel than the convoy traveling at one or more other speeds.

Optionally, the inter-truck spacing can be based on one or more terrain characteristics of the one or more routes on which the convoy moves. The one or more terrain characteristics can include one or more of grades or curvatures of the one or more routes.

As another example, the inter-truck spacing can be based on an amount of traffic congestion on the one or more routes, or can be based on a presence of one or more non-convoyed vehicles within a designated distance of the convoy.

The inter-truck spacing can be different for different pairs of the trucks in the convoy.

Optionally, the method also includes changing an order of the trucks in the convoy during the movement of the convoy along the one or more routes. The order of the trucks can be changed based on a comparison of fuel savings for the trucks during travel of the trucks in the order and during travel of the trucks after the order of the trucks is changed. The order of the trucks can be changed based on one or more of an elapsed time that a first truck has been a leading truck of the convoy, an elapsed time that a second truck has been a trailing truck of the convoy, and/or amounts of fuel consumed by the trucks in the convoy. Optionally, the order of the trucks can be changed based on one or more of a wind speed or a wind direction.

The method also can include automatically and individually controlling movements of the trucks to maintain the inter-truck spacing during the movement of the convoy. Two or more of the trucks in the convoy can be owned by different entities and/or can be traveling toward different locations.

The inter-truck spacing can be changed to reduce one or more upcoming accelerations or upcoming decelerations of one or more of the trucks in the convoy relative to the inter-truck spacing remaining unchanged.

Optionally, the method also includes identifying an additional truck to be added to the convoy after the convoy has departed from a first location, identifying a second location of the additional truck, and scheduling a logical coupling of the additional truck to the convoy based on the second location of the additional truck.

As another example, the method also can include adding one or more additional trucks to the convoy during travel of the convoy.

The trucks in the convoy may not be mechanically coupled with each other. Alternatively, at least two of the trucks in the convoy are mechanically coupled with each other. The trucks in the convoy that are mechanically coupled with each other can be coupled with each other after departure of the convoy from a starting location.

In one embodiment, a convoy management system includes one or more processors configured to determine determining an inter-truck spacing in a convoy formed from two or more trucks traveling together along one or more routes. The one or more processors are configured to instruct controllers onboard the two or more trucks to automatically change movement of at least one of the trucks in the convoy to maintain the inter-truck spacing. The one or more processors are configured to dynamically change the inter-truck spacing during movement of the convoy along the one or more routes.

Optionally, the one or more processors are configured to change the inter-truck spacing with respect to time during a trip of the convoy. The one or more processors can be configured to determine the inter-truck spacing based on one or more terrain characteristics of the one or more routes on which the convoy moves. The one or more processors can be configured to determine the inter-truck spacing based on an amount of traffic congestion on the one or more routes. The one or more processors can be configured to direct the controllers of the trucks in the convoy to change an order of the trucks in the convoy during the movement of the convoy along the one or more routes.

In one embodiment, a method includes determining inter-vehicle spacings in a convoy formed from two or more vehicle systems traveling together along one or more routes. The inter-vehicle spacings are based on forecasted forces to be imparted on the vehicle systems during travel of the convoy. The method also includes directing controllers of the vehicle systems to automatically change movement of the vehicle systems to maintain the inter-vehicle spacings in the convoy, directing the controllers of the vehicle systems to automatically change the movement of the vehicle systems to change an order of the vehicle systems in the convoy during the movement of the vehicle systems, and dynamically changing the inter-vehicle spacings during the movement of the convoy along the one or more routes.

Optionally, two or more of the vehicle systems in the convoy are traveling toward different locations. The inter-vehicle spacings can be changed to reduce one or more upcoming accelerations or upcoming decelerations of one or more of the vehicle systems in the convoy relative to the inter-vehicle spacing remaining unchanged.

Optionally, the method also includes identifying an additional vehicle system to be added to the convoy after the convoy has departed from a first location, identifying a second location of the additional vehicle system, and scheduling a logical coupling of the additional vehicle system to the convoy based on the second location of the additional vehicle system.

At least two of the vehicle systems in the convoy can be mechanically coupled with each other. These vehicle systems in the convoy can be mechanically coupled with each other after departure of the convoy from a starting location. Optionally, two or more of the vehicle systems in the convoy are different types of vehicle systems.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all the subject matter of the above description or shown in the accompanying drawings shall be interpreted merely as examples illustrating the inventive concept herein and shall not be construed as limiting the inventive subject matter.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

What is claimed is:

1. A method comprising:
   determining an inter-truck spacing in a convoy formed from two or more trucks traveling together along one or more routes, the inter-truck spacing determined based on an amount of traffic congestion on the one or more routes;
   changing movement of at least one of the trucks in the convoy to maintain the inter-truck spacing; and
   dynamically changing the inter-truck spacing during movement of the convoy along the one or more routes.

2. The method of claim 1, wherein the inter-truck spacing changes with respect to time during a trip of the convoy.

3. The method of claim 1, wherein the inter-truck spacing also is based on one or more of a size of at least one of the trucks, a weight of at least one of the trucks, a number of the trucks in the convoy, an engine rating of at least one of the trucks, a type of fuel consumed by at least one of the trucks, a type of powertrain of at least one of the trucks, a presence of a drag-altering device on at least one of the trucks, a wind speed, or a wind direction.

4. The method of claim 1, wherein the inter-truck spacing also is based on one or more planned speeds at which the convoy is to move along the one or more routes.

5. The method of claim 1, wherein the inter-truck spacing also is based on one or more terrain characteristics of the one or more routes on which the convoy moves.

6. The method of claim 1, wherein the inter-truck spacing also is based on a presence of one or more non-convoyed vehicles within a designated distance of the convoy.

7. The method of claim 1, further comprising:
   changing an order of the trucks in the convoy during the movement of the convoy along the one or more routes.

8. A convoy management system comprising:
   one or more processors configured to determine an inter-truck spacing in a convoy formed from two or more trucks traveling together along one or more routes, the inter-truck spacing determined based on one or more of a presence of a drag-altering device on at least one of the trucks, a wind speed, or a wind direction, the one or more processors configured to instruct controllers onboard the two or more trucks to automatically change movement of at least one of the trucks in the convoy to maintain the inter-truck spacing,
   wherein the one or more processors are configured to dynamically change the inter-truck spacing during movement of the convoy along the one or more routes.

9. The convoy management system of claim 8, wherein the one or more processors are configured to change the inter-truck spacing with respect to time during a trip of the convoy.

10. The convoy management system of claim 8, wherein the one or more processors are configured to determine the inter-truck spacing also based on one or more terrain characteristics of the one or more routes on which the convoy moves.

11. The convoy management system of claim 8, wherein the one or more processors are configured to determine the inter-truck spacing based also on an amount of traffic congestion on the one or more routes.

12. The convoy management system of claim 8, wherein the one or more processors are configured to direct the controllers of the trucks in the convoy to change an order of the trucks in the convoy during the movement of the convoy along the one or more routes.

13. A method comprising:
- determining inter-vehicle spacings in a convoy formed from two or more vehicle systems traveling together along one or more routes, at least two of the vehicle systems in the convoy mechanically coupled with each other, the inter-vehicle spacings based on forecasted forces to be imparted on the vehicle systems during travel of the convoy;
- directing controllers of the vehicle systems to automatically change movement of the vehicle systems to maintain the inter-vehicle spacings in the convoy;
- directing the controllers of the vehicle systems to automatically change the movement of the vehicle systems to change an order of the vehicle systems in the convoy during the movement of the vehicle systems; and
- dynamically changing the inter-vehicle spacings during the movement of the convoy along the one or more routes.

14. The method of claim 13, wherein two or more of the vehicle systems in the convoy are traveling toward different locations.

15. The method of claim 13, wherein the inter-vehicle spacings are changed to reduce one or more upcoming accelerations or upcoming decelerations of one or more of the vehicle systems in the convoy relative to the inter-vehicle spacing remaining unchanged.

16. The method of claim 13, further comprising:
- identifying an additional vehicle system to be added to the convoy after the convoy has departed from a first location;
- identifying a second location of the additional vehicle system; and
- scheduling a logical coupling of the additional vehicle system to the convoy based on the second location of the additional vehicle system.

17. The method of claim 13, wherein the at least two vehicle systems in the convoy are mechanically coupled with each other after departure of the convoy from a starting location.

18. The method of claim 13, wherein two or more of the vehicle systems in the convoy are different types of vehicle systems.

* * * * *